(12) United States Patent
Brenner et al.

(10) Patent No.: US 9,963,836 B1
(45) Date of Patent: May 8, 2018

(54) METHOD FOR OPERATING PAVING TRAIN MACHINES

(71) Applicant: GOMACO Corporation, Ida Grove, IA (US)

(72) Inventors: Mark W. Brenner, Ida Grove, IA (US); Raymond J. Bumann, III, Ida Grove, IA (US)

(73) Assignee: GOMACO Corporation, Ida Grove, IA (US)

( * ) Notice: Subject to any disclaimer, the term of this patent is extended or adjusted under 35 U.S.C. 154(b) by 812 days.

(21) Appl. No.: 14/172,444

(22) Filed: Feb. 4, 2014

Related U.S. Application Data

(63) Continuation-in-part of application No. 12/942,382, filed on Nov. 9, 2010, now Pat. No. 8,682,622, which is a continuation of application No. 11/360,464, filed on Feb. 23, 2006, now Pat. No. 7,850,395, application No. 14/172,444, which is a continuation-in-part of application No. 13/748,647, filed on Jan. 24, 2013, now Pat. No. 9,200,414, which is a continuation-in-part of application No. 13/287,163, filed on Nov. 2, 2011, now Pat. No. 8,855,967.

(60) Provisional application No. 61/760,416, filed on Feb. 4, 2013, provisional application No. 60/655,278, filed on Feb. 23, 2005.

(51) Int. Cl.
*G06F 7/60* (2006.01)
*E01C 19/00* (2006.01)

(52) U.S. Cl.
CPC .................................... *E01C 19/00* (2013.01)

(58) Field of Classification Search
CPC ....................................................... E01C 19/00

USPC ............................................................ 703/2
See application file for complete search history.

(56) References Cited

U.S. PATENT DOCUMENTS 6,176,643 B1 * 1/2001 Guntert, Jr. ............. E01C 23/04
404/100
7,850,395 B1 * 12/2010 Brenner ................... E01C 23/01
404/72

(Continued)

OTHER PUBLICATIONS

Chapter_4_2012 (Chapter 4 State of Florida Final "as-built" Plans Process, Topic No. 700-050-010, Preparation and Documentation Manual, Edition Date: Aug. 1, 1999, Revision Date: Jun. 6, 2012).*

(Continued)

*Primary Examiner* — Brian S Cook
(74) *Attorney, Agent, or Firm* — Suiter Swantz pc llo

(57) ABSTRACT

A method for operating construction machines of a paving train includes receiving at least one design file. The method includes receiving, by the computing device of the first construction machine of the paving train, a plurality of other machine data inputs from the at least one computing device of the at least one other construction machine of the paving train. The method includes receiving, by the computing device of the first construction machine of the paving train, a plurality of first machine data inputs. The method includes updating a paving work state file based upon the plurality of other machine data inputs and the plurality of first machine data inputs. The method includes controlling the first construction machine of the paving train based upon the plurality of other machine data inputs, the plurality of first machine data inputs, the at least one design file, and the paving work state file.

15 Claims, 61 Drawing Sheets

(56) References Cited

U.S. PATENT DOCUMENTS

| | | | | |
|---|---|---|---|---|
| 2004/0255266 | A1* | 12/2004 | Dement | G06Q 10/10 |
| | | | | 717/101 |
| 2010/0215433 | A1* | 8/2010 | Fritz | E01C 19/006 |
| | | | | 404/84.5 |
| 2010/0279736 | A1* | 11/2010 | Ruotolo | G06F 17/5095 |
| | | | | 455/557 |
| 2012/0263532 | A1* | 10/2012 | Rutz | E01C 19/00 |
| | | | | 404/75 |
| 2017/0248406 | A1* | 8/2017 | Shadmehri | G01B 11/002 |

OTHER PUBLICATIONS

Caltrans_2008 (English CADD User's Manual, Apr. 11, 2008).*
Roe_2003 (Automation Takes Root in Civil Construction, Cadalyst, Oct. 1, 2003).*
Civil_3D_2012 (Road Design with AutoCAD Civil 3D, Autodesk, Inc., 2012).*
ACPA_2013 (Dowel Bar Alignment and Location for Placement by Mechanical Dowel Bar Insertion, ACPA Guide Specification, Aug. 14, 2013).*
Castro_Lacouture_2007 (Concrete Paving Productivity Improvement Using a Multi-task Autonomous Robot, 24th International Symposium on Automation & Robotics in Construction (ISARC 2007).*
Shatnawi_2009 (Automated Pavement Condition Survey, Caltrans Pavement Management System, Interim version: Oct. 2009).*
Ong_2009 (Automated Pavement Condition Data Collection Quality Control, Quality Assurance and Reliability, FHWA/IN/JTRP-2009/Jan. 17, 2010).*

* cited by examiner

FIG. 34

METHOD FOR OPERATING PAVING TRAIN MACHINES

CROSS-REFERENCE TO RELATED APPLICATIONS

The present application claims the benefit under:
(1) 35 U.S.C. § 120 as a continuation-in-part of:
  (a) U.S. patent application Ser. No. 12/942,382, filed Nov. 9, 2010 further claims the benefit under 35 U.S.C. § 120 of U.S. patent application Ser. No. 11/360,464, filed Feb. 23, 2006, which claims the benefit under 35 U.S.C. § 119(e) of U.S. Provisional Application Ser. No. 60/655,278, filed Feb. 23, 2005; and
  (b) U.S. patent application Ser. No. 13/748,647, filed Jan. 24, 2013, which claims the benefit under 35 U.S.C. § 120 of U.S. patent application Ser. No. 13/287,163, filed Nov. 2, 2011; and
(2) 35 U.S.C. § 119(e) of U.S. Provisional Application Ser. No. 61/760,416, filed Feb. 4, 2013.

U.S. patent application Ser. Nos. 12/942,382, 11/360,464, 13/748,647, and 13/287,163 and U.S. Provisional Application Ser. Nos. 60/655,278 and 61/760,416 are herein incorporated by reference in their entirety.

FIELD OF THE INVENTION

The present disclosure generally relates to the field of control systems for machines of a paving train, and more particularly to concurrently or non-concurrently operate components for precision paving.

BACKGROUND

Current paving machines fail to adequately integrate automation controls with design specifications and sensor data of other paving train machines. Additionally, currently, paving projects require significant efforts to efficiently use material while assuring that paving specifications are met. Thus, it would be desirable to provide a method, system, and apparatus which solve these problems.

SUMMARY

Accordingly, an embodiment of the invention is directed to a method for operating construction machines of a paving train over a construction site network. The construction site network includes a computing device of a first construction machine of the paving train, at least one computing device of at least one other construction machine of the paving train, and at least one other computing device. The method includes receiving at least one design file, each design file comprising a file including information of a paving project design for a paving project. The method further includes receiving, by the computing device of the first construction machine of the paving train, a plurality of other machine data inputs from the at least one computing device of the at least one other construction machine of the paving train, wherein the plurality of other machine data inputs includes sensor data and position data associated with one or more particular construction machines of the at least one other construction machine. Also, the method includes receiving, by the computing device of the first construction machine of the paving train, a plurality of first machine data inputs, wherein the plurality of first machine data inputs includes sensor data of sensors of the first construction machine and position data of the first construction machine. The method further includes updating a paving work state file based upon the plurality of other machine data inputs and the plurality of first machine data inputs, wherein the paving work state file includes as-the-project-is-built information associated with the paving project. Additionally, the method includes controlling the first construction machine of the paving train based upon the plurality of other machine data inputs, the plurality of first machine data inputs, the at least one design file, and the paving work state file.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE DRAWINGS

Other embodiments of the invention will become apparent by reference to the accompanying figures in which:

FIG. 34 illustrates an exemplary report screen for the main graphic user interface shown in FIG. 33;

DETAILED DESCRIPTION

Figure 1:
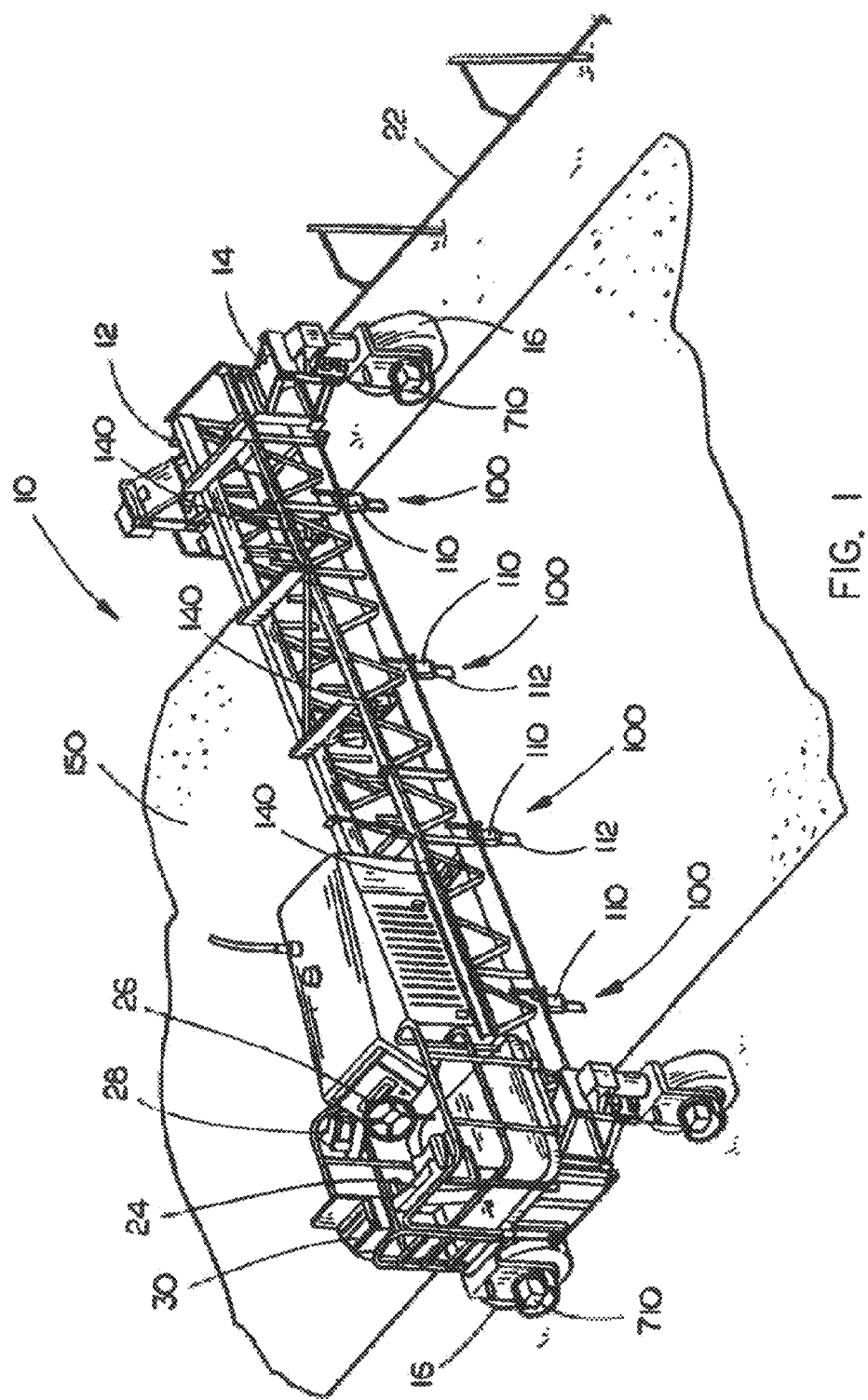
FIG. 1 is an isometric view illustrating a smoothness indicator in accordance with an exemplary embodiment.
Figure 2:
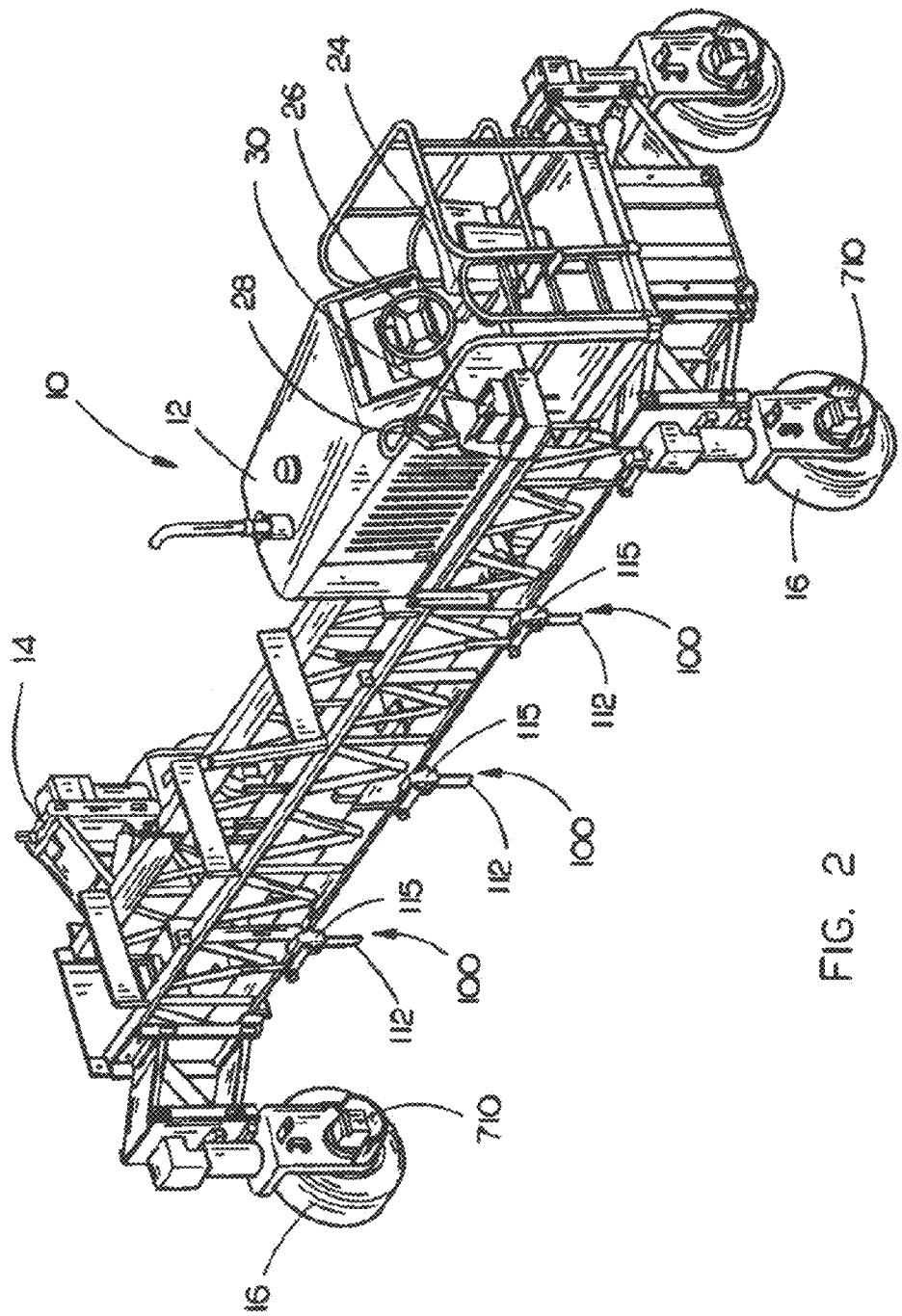
FIG. 2 is an isometric view of the smoothness indicator illustrated in FIG. 1.
Figure 3:
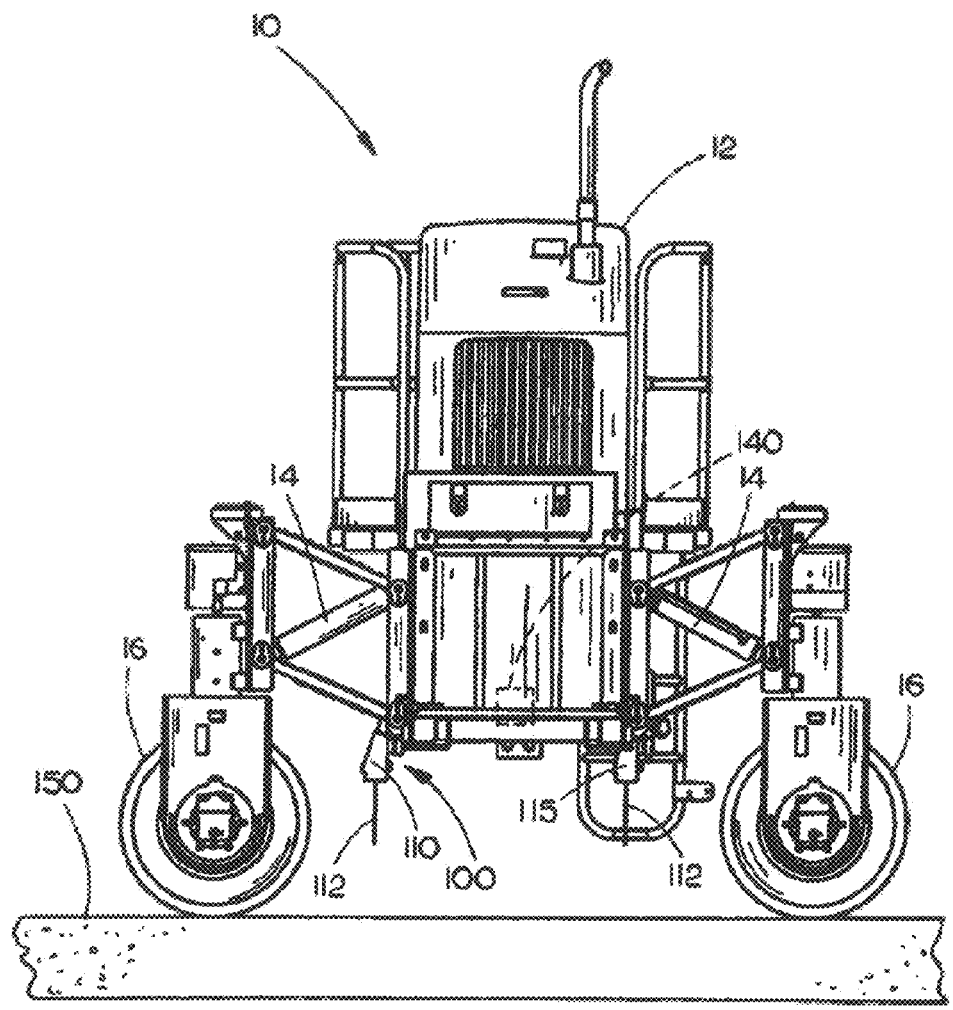
FIG. 3 is a side elevation view of the smoothness indicator illustrated in FIG. 1, wherein a side of the smoothness indicator is illustrated on a paved surface.
Figure 4:
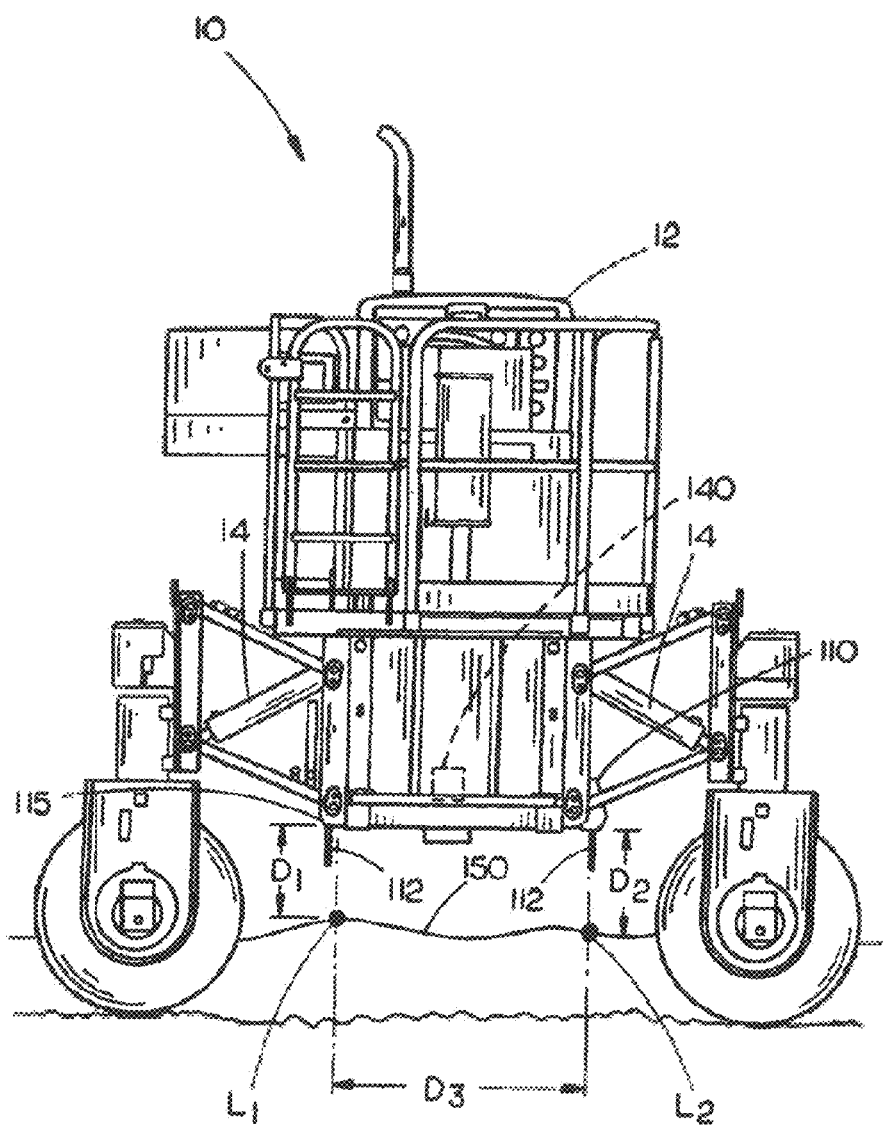
FIG. 4 is another side elevation view of the smoothness indicator illustrated in FIG. 1, wherein the smoothness indicator is illustrated straddling a paved surface.
Figure 5:
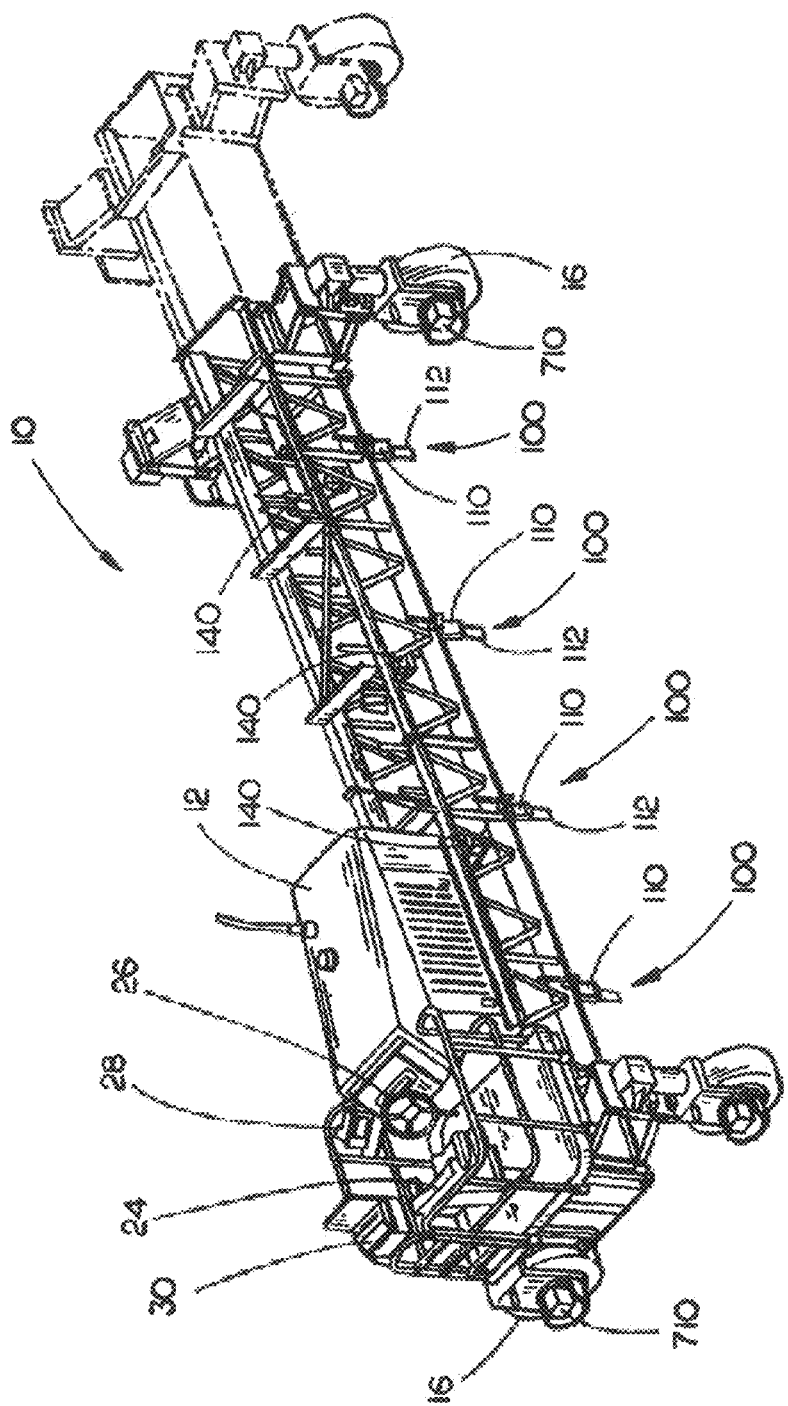
FIG. 5 is an isometric view illustrating a smoothness indicator in accordance with another exemplary embodiment, wherein the smoothness indicator is capable of extension and retraction.
Figure 6:
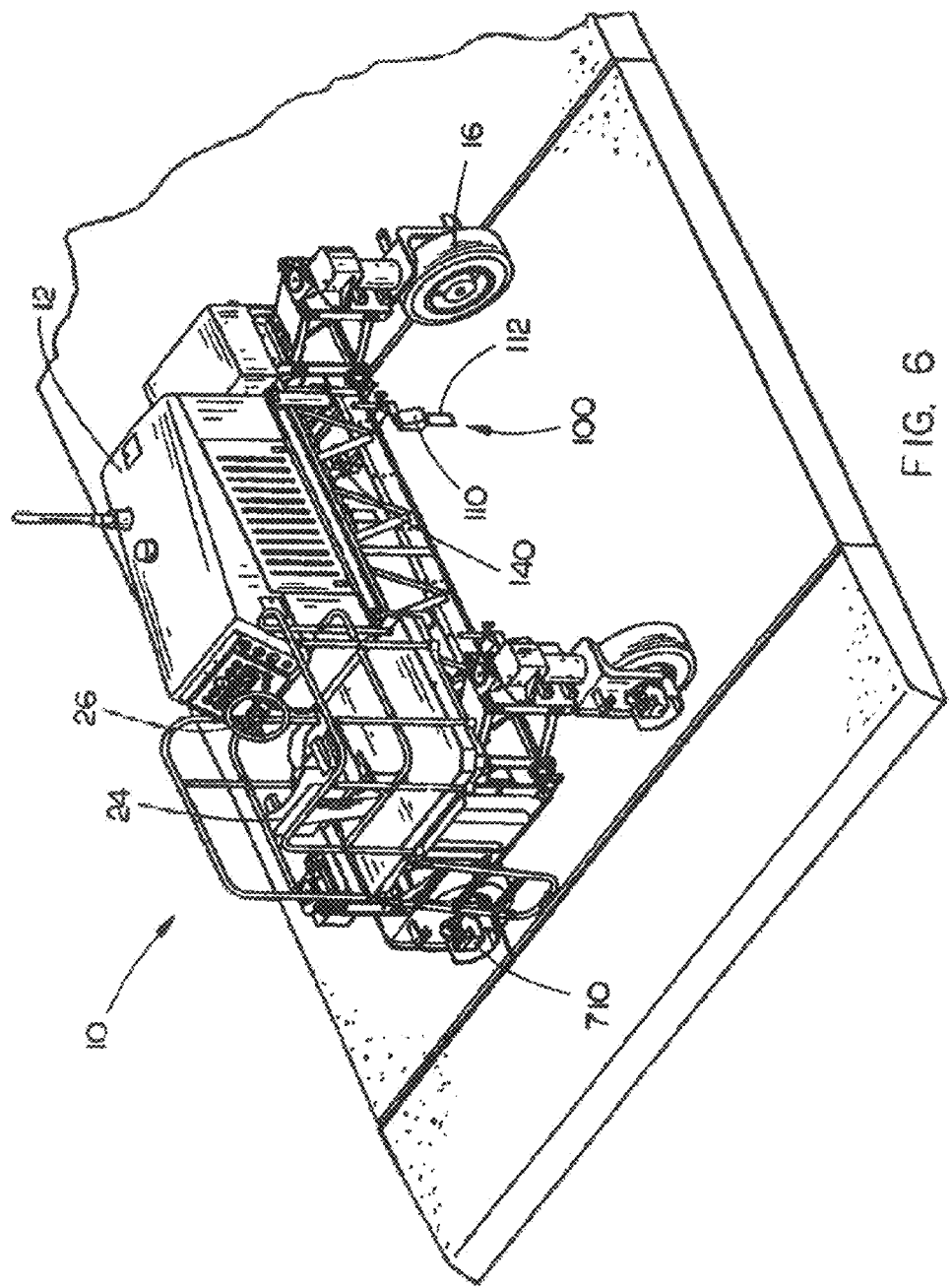
FIG. 6 is an isometric view illustrating a smoothness indicator in accordance with a further exemplary embodiment.
Figure 7:
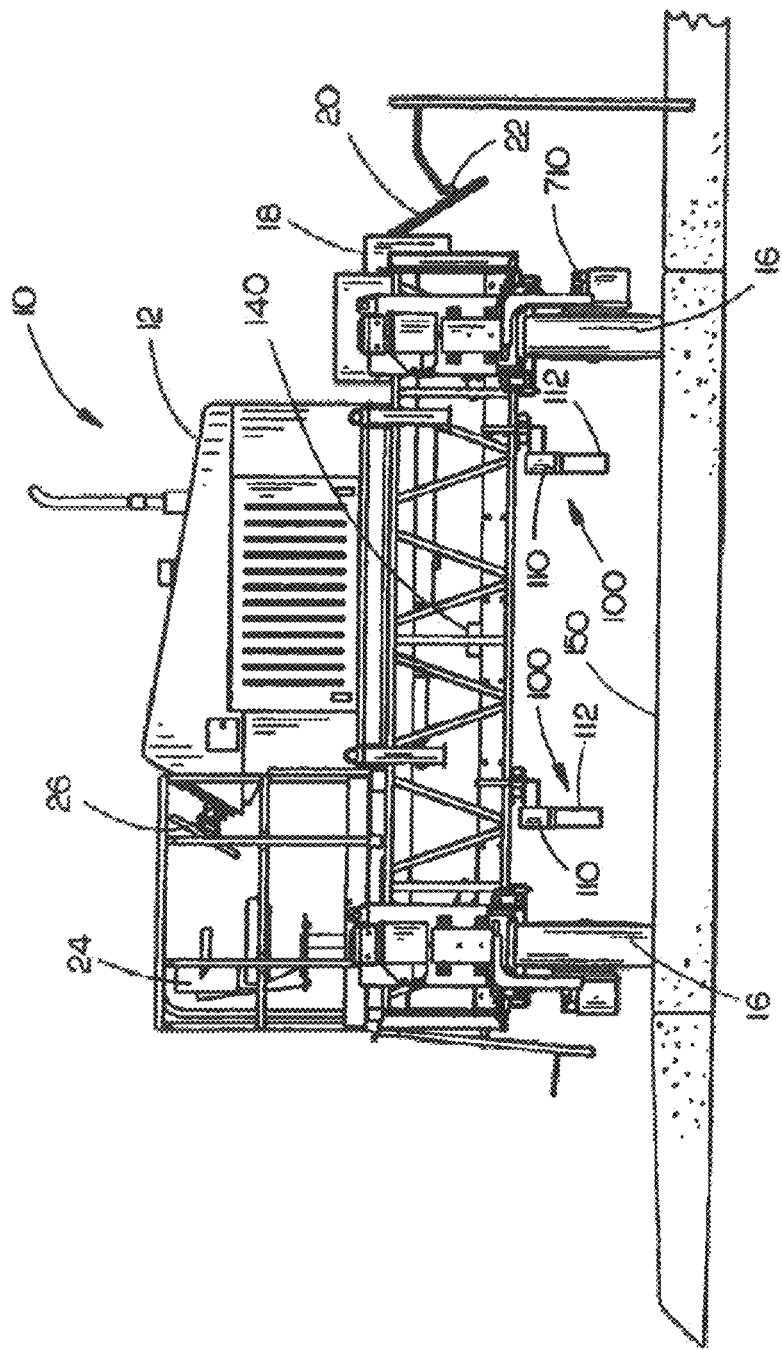
FIG. 7 is an end elevation view of the smoothness indicator illustrated in FIG. 6.
Figure 8:
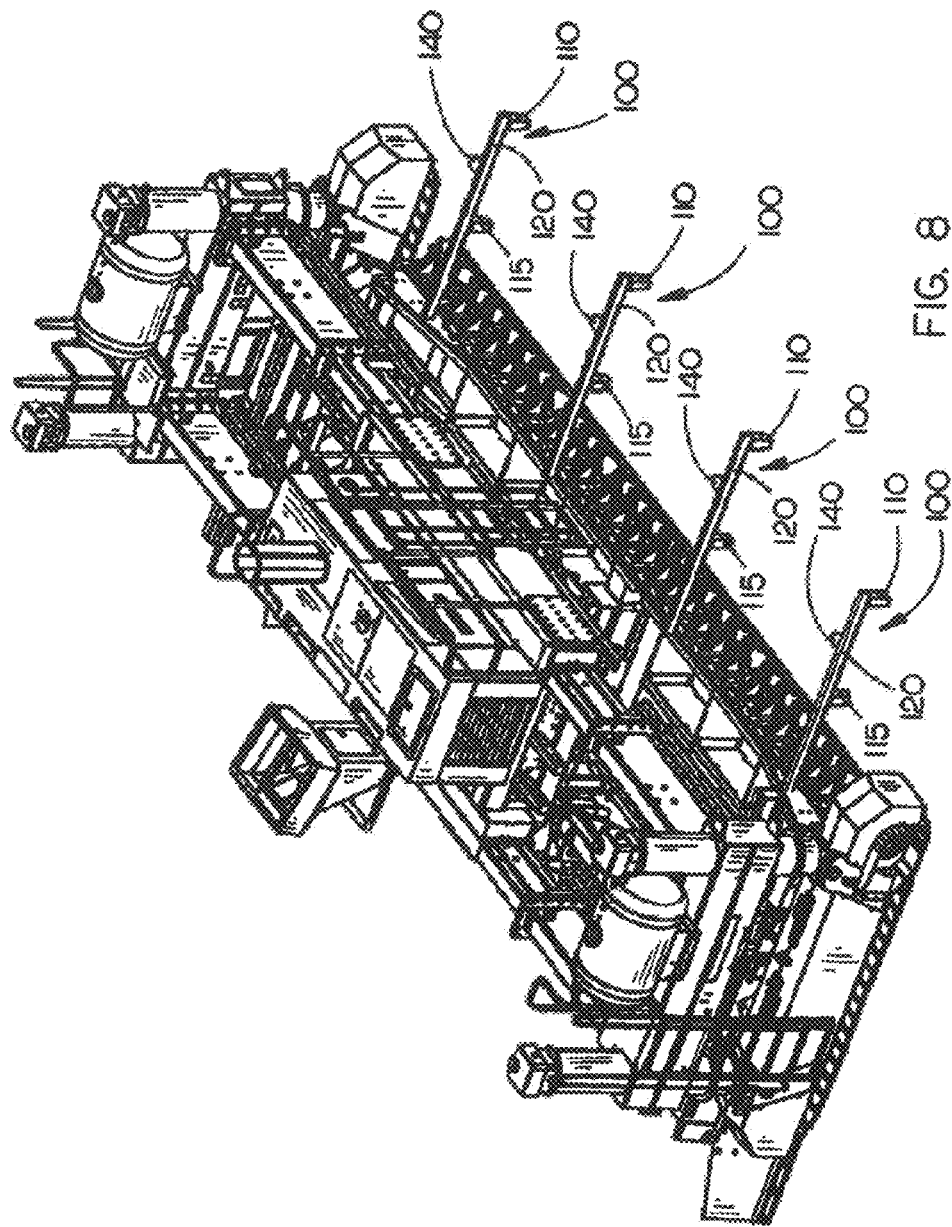
FIG. 8 is an isometric view illustrating a slip form paver including a smoothness indicator in accordance with another exemplary embodiment.
Figure 9:
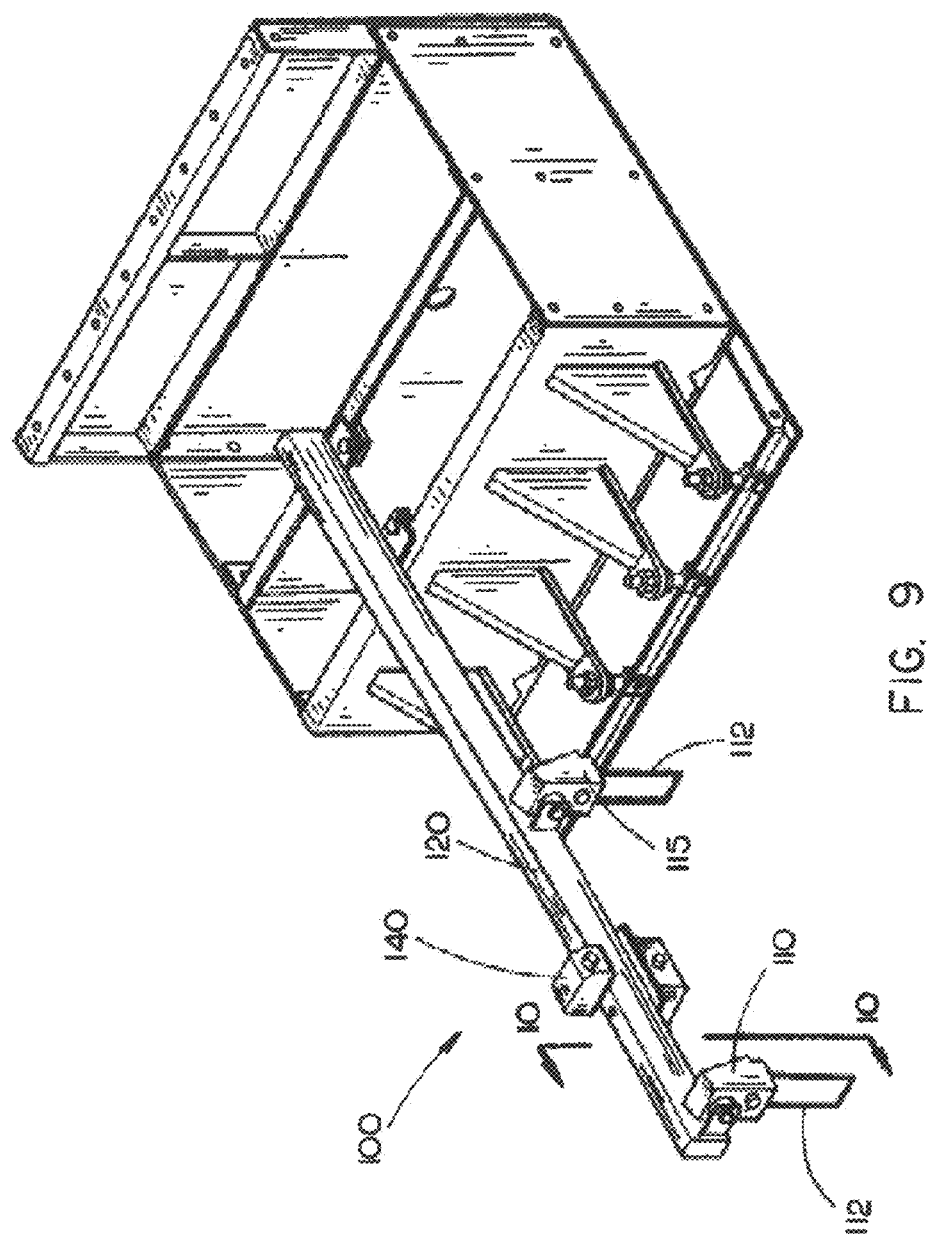
FIG. 9 is a partial isometric view of the slip form paver illustrated in FIG. 8.
Figure 10:
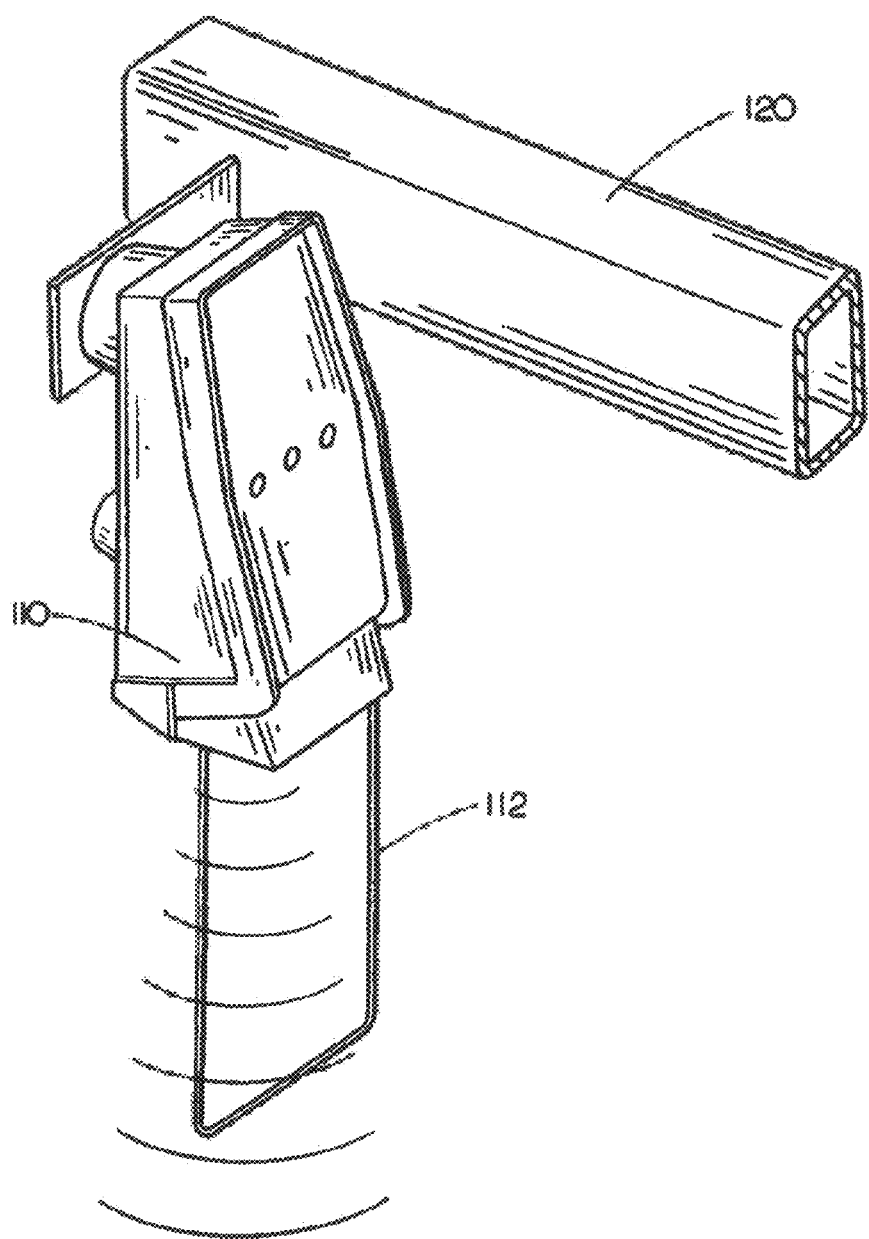
FIG. 10 is a partial cross-sectional isometric view of the smoothness indicator illustrated in FIG. 8, further illustrating an ultrasonic sensor assembly.
Figure 11:
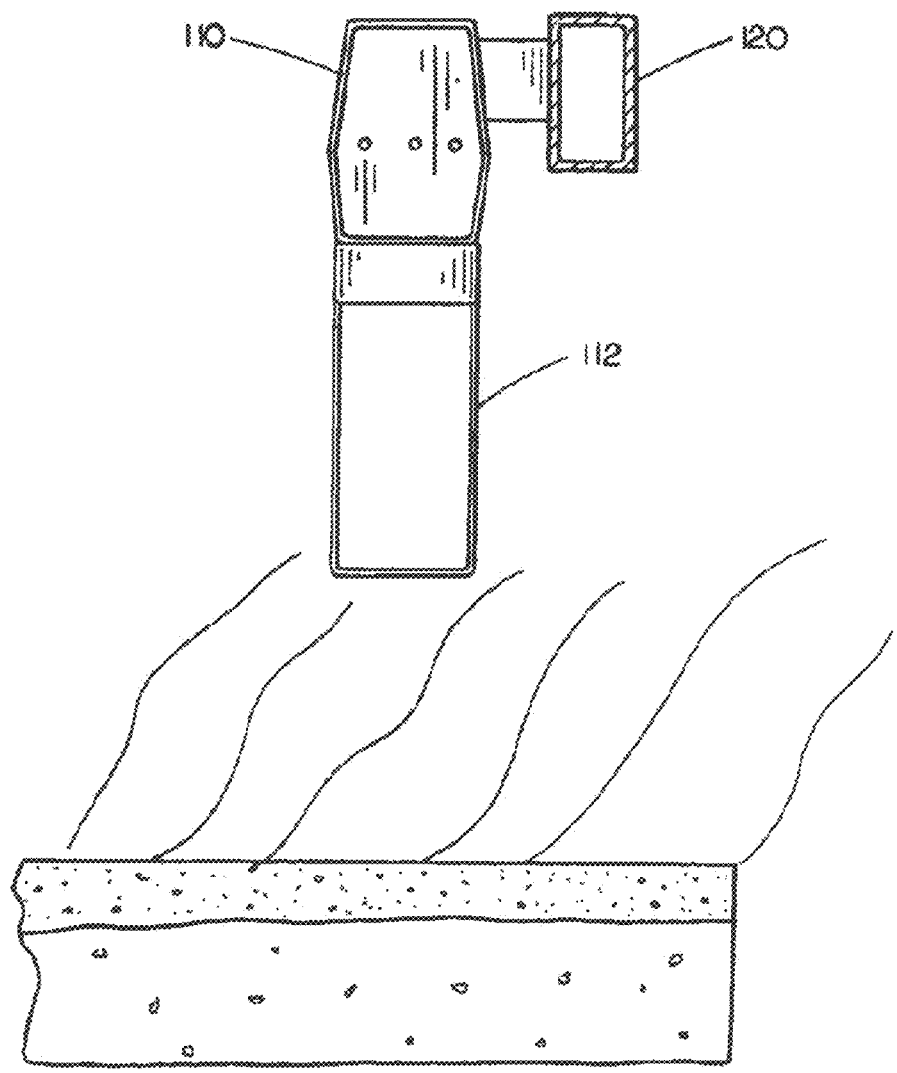
FIG. 11 is a partial cross-sectional end elevation view of the smoothness indicator illustrated in FIG. 8, wherein an ultrasonic sensor assembly includes a temperature gauge assembly.

Reference will now be made in detail to the subject matter disclosed, which is illustrated in the accompanying drawings. The scope of embodiments of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Referring generally to FIGS. 1 through 40, a smoothness indicator analysis system in accordance with exemplary embodiments is described. A smoothness indicator 10 may be used for measuring a profile of a paved surface such as concrete; a base course including cement treated base (CTB), lean concrete base, crushed stone, asphalt, and crushed slag; a subbase, such as subgrade soil or aggregate; a subgrade upon which a subbase, a base, a base course, or pavement is constructed; and other graded surfaces including sand, rock, and gravel. The smoothness indicator 10 may also be used for measuring a profile of a surface which has not been graded.

The smoothness indicator 10 includes one or more sensor assemblies each having two elevation distance sensors. In exemplary embodiments, the elevation distance sensors comprise non-contact sensors, such as ultrasonic sensors, laser sensors, or the like. In this manner, the smoothness indicator 10 may be used to measure profiles for surfaces which have not cured, such as freshly paved concrete in a plastic state. Each non-contact elevation distance sensor has a footprint over which a distance measurement is taken. In this manner, measurements taken by a non-contact elevation distance sensor reflect a portion of the surface included within the bounds of the sensor's footprint. This may have a smoothing/averaging effect for providing a more characteristic representation of the surface. Preferably, the footprint of a non-contact elevation distance sensor is of sufficient diameter for smoothing the effect of measurement of minor imperfections in the paved road surface, such as texture on the surface (e.g. skid surface texture), cracks, seams, pebbles, and the like, which may be disposed upon the road surface. Further, in exemplary embodiments, the footprint of a non-contact elevation distance sensor approximates the footprint of a typical automobile tire (i.e. the surface space occupied by the tire), for providing a surface profile characteristic of travel of the automobile tire upon the surface. In the exemplary embodiment illustrated, for example, each non-contact elevation distance sensor has a circular footprint with approximately a 6-inch diameter. However, it will be appreciated that sensors may provide footprints of greater or smaller diameters without departing from the scope of embodiments. Those of skill in the art will appreciate that various surfaces may be profiled by the smoothness indicator 10. Additionally, while two elevation distance sensors are shown in the accompanying figures, those of skill in the art will appreciate that more than two elevation distance sensors may also be utilized without departing from the scope of the disclosure.

Preferably an independent vehicle or rig is utilized for increased versatility. For instance, when a road is paved in concrete using a slip form paving machine or the like, a contractor may be graded on meeting smoothness requirements for the road surface. Utilizing an independent rig including the smoothness indicator, the smoothness of the road may be determined as the road is paved. For example, the rig may be driven along behind the paver, while the smoothness indicator generates a surface profile of the freshly paved road. When a surface irregularity, such as a must-grind bump or a low spot, is encountered, personnel are alerted and work to correct the irregularity, such as utilizing a bull float, a troweling machine, a roller, or the like, while the concrete is still in a plastic state. Then, the rig may be driven over the area of the irregularity to verify that the corrected road surface meets smoothness requirements. Additionally, the smoothness indicator may be used to gauge the effectiveness of paving machine settings. In a further example, a paver is connected to the smoothness indicator via a wireless connection for providing smoothness data to the paving machine supervisor/operator or for making automatic updates/changes to the paver.

Referring to FIGS. 1 through 7, a smoothness indicator 10 in accordance with an exemplary embodiment is described. Preferably, the smoothness indicator 10 includes an extensible and retractable bridge rig assembly 12 having one or more sensor assemblies 100. For example, the bridge rig 12 may be extended over a four-lane road and retracted for a two-lane road. The sensor assemblies 100 are positioned for measuring locations upon a road surface 150, such as where automobile tires travel upon the road. In a first embodiment, the sensor assemblies 100 may be manually positioned, and a setscrew may be provided for locking a sensor assembly 100 in place. Alternatively, a drive assembly may be utilized for automatically adjusting the sensor assembly 100 to a pre-selected position.

In the present example, the bridge rig 12 includes a height adjustment assembly 14, such as an assembly including a hydraulic piston, a mechanical linkage, or the like, for adjusting the height of the bridge rig and positioning a sensor assembly 100 a distance from the road surface 150. This may be desirable for maintaining the sensor assembly in an optimal range while profiling the surface. For example, an operator may wish to maintain a sensor assembly 100 a distance between 18 and 24 inches from the road surface 150. It is contemplated that the operator may position the bridge rig 12 at a median height (the median height being relative to the distance between a sensor assembly and the road surface), such as to account for a banked turn. In further embodiments, the smoothness indicator 10 transmits a command to the height adjustment assembly 14 to position a sensor assembly 100 at a specified distance from the road surface 150. For instance, the operator may specify a distance at which the sensor assembly should be located from the road surface. The smoothness indicator may then transmit a command to the height adjustment assembly. Those of skill in the art will appreciate that the command to the height adjustment assembly 14 may be transmitted electronically, mechanically, or the like without departing from the scope of the discosure.

The bridge rig assembly 12 includes at least one travel distance sensor 710 connected to a wheel 16 of the bridge rig. The travel distance sensor 710 measures distances traveled by the wheel of the rig to determine distances traveled by a sensor assembly 100. In embodiments, two or more travel distance sensors are included for determining distances over non-linear terrain, such as distances around a sweeping highway curve. For instance, in the embodiment illustrated, two encoders and/or two pulse pickups may be utilized to measure longitudinal distances traveled by two wheels of the bridge rig assembly 12 (one encoder and/or one pulse pickup for each wheel). For example, if first and second travel distance sensors 710 are included with wheels 16 on both sides of the bridge rig 12, a weighted average of distance measurements from the travel distance sensors may be utilized to calculate a distance traveled by a sensor assembly between them. For instance, an average distance may be used for a sensor assembly 100 located in the center of the bridge rig 12. Alternatively, a distance traveled by a sensor assembly one-fourth a distance from the first travel distance sensor to the second travel distance sensor may be calculated by taking 25 percent of a distance measured by the first travel distance sensor and adding 75 percent of a distance measured by the second travel distance sensor. In a further example, a distance measuring wheel may be included with the smoothness indicator 10 for determining distances traveled by a sensor assembly 100.

In further embodiments, the smoothness indicator 10 includes one or more contact sensors 18. A contact 20 is included for measuring a distance between the bridge rig 12 and a guide, such as a string line positioned for guiding a paver, or the like. For example, a contact sensor 18 may follow a string line 22 for automatically directing the bridge rig 12 when measuring a surface profile. The contact 20 follows the string line as the bridge rig advances over the road surface 150. By analyzing movement of the contact 20, the smoothness indicator positions the bridge rig 12 for travel in a direction following the direction of the road. In another embodiment, an elevation distance sensor assembly is utilized to guide the bridge rig by tracking a line, which may be rope or another type of line detectable by the elevation distance sensor.

A feedback and actuator assembly may be utilized to control the wheel 16 of the bridge rig 12. The feedback and actuator assembly may include a feedback sensor (such as a rotary potentiometer, or the like, for sensing an angle of the wheel 16), an actuator, and/or a control assembly, for guiding the angle of the wheel 16, controlling its rotational velocity, and/or directing another characteristic of the wheel's movement. For example, a computer assembly or an integrated circuit utilizing control logic senses a characteristic of the wheel's movement via the feedback sensor and guides the wheel 16 via the actuator. The feedback and actuator assembly may be coupled with the contact sensor 18 (or the elevation distance sensor) for controlling the direction of travel of the bridge rig 12. Alternatively, the bridge rig and/or the wheel are controlled by a Global Positioning System (GPS) directing the rig. In this manner, the bridge rig 12 may travel a predetermined course.

The smoothness indicator 10 is capable of profiling a surface in either a forward or a reverse direction. For example, the bridge rig 12 may travel in a forward direction behind a paver. Upon detection of a surface irregularity, such as a must-grind bump or a low spot, the smoothness indicator 10 may emit an audible alarm, a visual alarm, or the like, to notify personnel to correct the irregularity. An operator may then drive the bridge rig assembly 12 backward and forward over the area of the surface irregularity, repeatedly (if necessary) measuring the surface until proper correction and/or minimization of the irregularity has been achieved. Various options may be provided for identifying surface irregularities, such as parameters for must-grind bump size, and other surface criteria.

In one embodiment, previous elevation measurements for locations measured along the road surface 150 are replaced with more recent elevation measurements for the same locations. For example, elevations measured for locations along the road surface before the bridge rig 12 is driven backwards over an area are replaced by elevations measured when the bridge rig assembly is driven forward over the area. This has the advantage of reflecting the corrected profile of the road surface 150 when measuring is resumed.

The smoothness indicator 10 may be utilized for profiling a variety of surfaces. Different intervals may be used for averaging measured elevations when profiling the surfaces, minimizing the elevations associated with a profile. For instance, a two-inch interval may be utilized when measuring a concrete surface, while a one-fourth inch interval may be utilized for a subgrade. The smaller interval may allow for the detection of rocks, glass, and the like. In still a further embodiment, an averaging ski may be used with the sensor assembly 100 for measuring a subgrade. In this instance, two averaging skis may be used with the sensor assembly 100: a leading averaging ski, and a trailing averaging ski. It should be noted that various contacting and non-contacting sensors may be used with the smoothness indicator 10 to optimize detection for a particular surface without departing from the scope thereof. An example of the various contacting sensors may include a wand sensor, or the like. It is to be noted that there are various vendors who produce wand sensors suitable for the smoothness indicator 10. For example, wand sensors (e.g., sensors with part number 1035073) produced by TSD Integrated Controls (a joint venture of Topcon Positioning Systems, Inc. of Livermore, Calif. and Sauer-Danfoss Inc. of Ames, Iowa) may be suitable as the contacting sensors utilized by the smoothness indicator 10.

In embodiments, the bridge rig assembly 12 includes a seat 24 for supporting an operator. The seat may be adjustable for allowing the operator a less obstructed view of the road surface 150 or for purposes of comfort. Additionally, the bridge rig 12 includes a steering wheel 26 for manually controlling the position of the bridge rig, such as when driving the rig to a job-site. (Preferably, the bridge rig is oriented longitudinally with a road when driving to a job-site, occupying one lane of the road.) The steering wheel 26 may be used to override directional commands, while a lockout feature may be provided for preventing inadvertent direction changes. Preferably, a graphical user interface assembly 28 is included for setting parameters, entering information, viewing data, and controlling the smoothness indicator 10. A printer 30 may be provided for generating a hard copy, such as a surface profile measured by the smoothness indicator 10, or related data.

In order to generate a surface profile, the smoothness indicator 10 utilizes a trailing (first) non-contact elevation distance sensor 110 and a leading (second) non-contact elevation distance sensor 115 to measure a distance $D_1$ and a distance $D_2$ from a road surface 150. By measuring angles of incidence of the sensors 110 and 115, and utilizing a known/pre-selected distance $D_3$ between the sensors, an elevation for a first location $L_1$ may be calculated using an elevation assigned to a second location $L_2$. It will be appreciated that the terms trailing/first and leading/second are used to describe non-contacts sensors 110 and 115 in relation to the direction of travel of the smoothness indicator 10. In exemplary embodiments, the bridge rig 12 may travel in two directions. Thus, a trailing/first non-contact elevation distance sensor may become a leading/second non-contact elevation distance sensor if the direction of travel is reversed. Alternatively, a leading/second non-contact elevation distance sensor may become a trailing/first non-contact elevation distance sensor in the same manner. For the following description, let the x axis be oriented in a direction parallel to motor vehicle travel on the road surface.

For some embodiments, an elevation profile of the road surface is constructed using a method called the "Incremental Slope Method" (ISM). ISM constructs a road-surface elevation profile by measuring the slope between successive pairs of points, such as locations $(x_0, y_0)$ and $(x_1, y_1)$, (oriented such that a line drawn between these points and the x axis define a plane) on the road surface, which are separated by a known distance. Using an elevation/benchmark assigned to one point, it is possible to calculate an elevation for the other point as $$y_1 = y_0 + m d_x$$

where $y_0$ and $y_1$ are the elevations of the points at $x_0$ and $x_1$, respectively; m is the slope between points 0 and 1; and $d_x$ is the known horizontal distance between the two points.

By moving the sensors in the x-direction a known distance less than $d_x$, the process can be repeated and a surface elevation profile constructed in desired increments. Thus, a priori knowledge or an estimate of the profile for the road surface in the region, $x_0 \leq x \leq x_0 + d_x$ is needed. Then, for $x_0 + d_x < x$, elevations may be calculated, and the road-surface profile constructed as desired (within tolerances of the sensors and other equipment).

For the following analysis, the following definitions are used (see FIG. 13):

x is the coordinate on the abscissa, lying in a horizontal orientation longitudinally along a road. This coordinate will curve with the road, but always lies in a horizontal plane.

y is the coordinate used on the ordinate, oriented in the vertical direction.

Referring now to FIGS. 8 through 18, in a further embodiment, the smoothness indicator 10 includes a first ultrasonic sensor 110 and a second ultrasonic sensor 115, separated by a pre-selected distanced 130. The first and second ultrasonic sensors 110 and 115 use active ultrasonic ranging for measuring the distance to the surface, e.g. from a sensor to the road surface 150. By comparing distance measurements obtained by the first and second ultrasonic sensors 110 and 115, an elevation difference between locations on the road surface 150 is computed. For instance, by measuring a first distance $h_1$ from the first ultrasonic sensor 110 to a first location $(x_1, y_1)$ on the road surface 150 and a second distance $h_2$ from the second ultrasonic sensor 115 to a second location $(x_2, y_2)$ on the road surface 150, an elevation difference $h_3$ between the first and second locations is computed.

Those of skill in the art will appreciate that the smoothness indicator 10 may not travel a level course, due to uneven terrain, thus causing the first and second ultrasonic sensors 110 and 115 to assume various angles of incidence relative to a horizontal plane. Electronic circuitry, mathematical formulae, or other techniques may be used to calculate the elevation difference $h_3$ between the first location $(x_1, y_1)$ and the second location $(x_2, y_2)$, such as by noting the various angles of the first and second ultrasonic sensors relative to the horizontal.

The first and second ultrasonic sensors 110 and 115 are oriented along a line having a slope $\theta$ from the horizontal. In embodiments, the ultrasonic sensors are positioned such that the sensors face the road surface substantially perpendicular to the line having slope $\theta$ from the horizontal. This places the first and second ultrasonic sensors 110 and 115 at the same angle of incidence relative to the horizontal, namely slope $\theta$. The elevation difference $h_3$ between the first location $(x_1, y_1)$ measured by the first ultrasonic sensor 110 and the second location $(x_2, y_2)$ measured by the second ultrasonic sensor 115 relative to the road surface 150 is computed using the pre-selected distance d 130, the first and second distances ($h_1$ and $h_2$), and the slope $\theta$. The following formula may be used to compute the elevation difference $h_3$ between the first and second locations $(x_1, y_1)$ and $(x_2, y_2)$ on the road surface 150 measured by the ultrasonic sensors:

$$h_3 = (h_1 - h_2)\cos\theta + d\sin\theta.$$

In exemplary embodiments, the first ultrasonic sensor 110 and the second ultrasonic sensor 115 are connected to a paver such as a concrete paver; a slip form machine; a form-riding machine; a bridge deck machine; a tow paver, such as a tow-type paver, a tow-behind paver, or a box paver; one or more machines in a paving train, including a spreader or belt placer, a slip form paver, and a curing and texturing machine; a canal lining paver; a cold planar; a road reclaimer; a road trimmer; as well as other vehicles and machines. The first and second ultrasonic sensors 110 and 115 may be adjustably mounted on a paver for identifying surface irregularities without disrupting paving operations. Preferably, the ultrasonic sensors are mounted on a separate vehicle, such as a bridge rig assembly, thus allowing for repeated surface profiles and rapid profiling of a subgrade. Those of skill in the art will appreciate that the sensors may be connected to a variety of vehicles/machines such as an all terrain vehicle (ATV) (see FIG. 31).

In exemplary embodiments, the first ultrasonic sensor 110 and the second ultrasonic sensor 115 are connected to a mounting assembly, such as a beam 120. A slope sensor 140 may be connected to the beam, for measuring the slope $\theta$ from the horizontal of the line along which the ultrasonic sensors are oriented. The ultrasonic sensors are placed facing the road surface 150, such that they are oriented perpendicular to the beam 120 and have the same angle of incidence relative to the horizontal, slope $\theta$. In this manner, the elevation difference $h_3$ between the first and second locations $(x_1, y_1)$ and $(x_2, y_2)$ on the road surface 150 measured by the ultrasonic sensors is computed as described above. Those of skill in the art will appreciate that the first and second ultrasonic sensors 110 and 115 may each have a separate slope sensor and/or utilize various sensors for determining an angle of incidence relative to the horizontal, to account for uneven terrain or the like. Electronic circuitry, mathematical formulae, and techniques may be used to calculate an elevation difference between the first and second locations measured by the ultrasonic sensors using the various angles of incidence.

In a present embodiment, the slope sensor 140 includes a fluid chamber having a gas bubble. By determining a position of the gas bubble with respect to the chamber at a given instant, the slope $\theta$ may be determined. However, when a jarring bump is encountered by the smoothness indicator 10, the gas bubble's position may fluctuate and thus not accurately reflect the slope of the beam 120. In embodiments, the rate of change in the position of the gas bubble is measured (for a time period) to ascertain whether the slope determined is accurate.

For example, measurements obtained during a bump may instead utilize a slope determined before or after the bump. In another example, intermediate slope measurements are calculated over the time interval of the bump from slope measurements obtained before and after the bump. These measurements are utilized to calculate intermediate slope measurements, such as by interpolating the various slope measurements. In this manner, slope measurements may more accurately reflect the slope of the beam 120 at a given instant. Other techniques may be used to account for jarring, such as the use of an accelerometer coupled with the beam 120, or the like, for rapidly measuring beam movement.

In one embodiment, the beam 120 connecting the ultrasonic sensors is affixed/secured to a vehicle, which travels over a surface from a first position $P_1$ to a second position $P_2$. In another embodiment, the beam 120 is longitudinally positioned by the vehicle between the first and second positions. For instance, the beam 120 is mounted to a vehicle such that it is translatable from the first position to the second position relative to the vehicle. By using a first elevation difference between a first pair of locations $(x_1^{n-1}, y_1^{n-1})$ and $(x_2^{n-1}, y_2^{n-1})$, measured by the first and second ultrasonic sensors 110 and 115 at the first position $P_1$, and a second elevation difference between a second pair of locations $(x_1^n, y_1^n)$ and $(x_2^n, y_2^n)$, measured by the first and second ultrasonic sensors 110 and 115 at the second position $P_2$, a profile of the surface is generated through successive measurements n−1 and n. In this manner, the beam 120 may be moved from the first position to the second position for measuring the profile of the surface.

Figure 12:
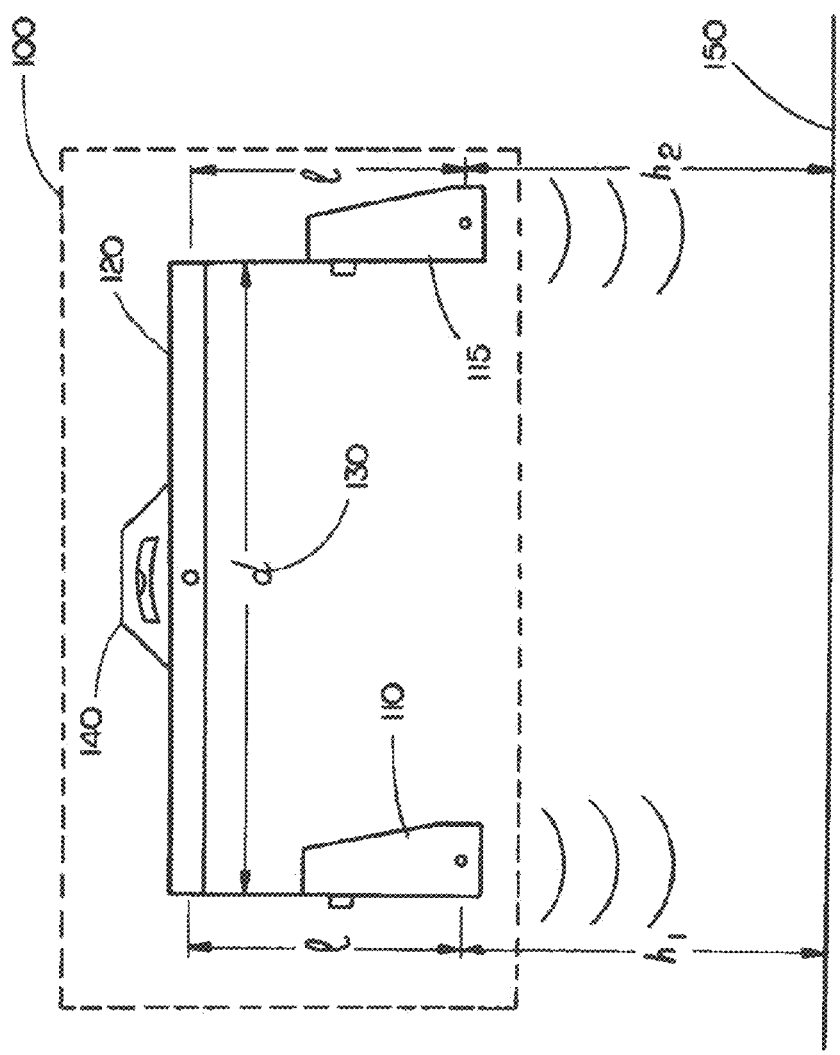
FIG. 12 is a side elevation view illustrating a sensor assembly for use with a smoothness indicator in accordance with an exemplary embodiment.

The incremental slope method is used to construct a surface profile by measuring the slope between successive pairs of points on the surface (e.g. road surface 150) which are separated by a calculable increment. FIG. 12 provides a schematic of the sensor assembly 100, which comprises two sets of non-contacting elevation distance sensors 110 and 115 (for example, Topcon Positioning Systems, Inc. sells a model called "Sonic Tracker II" 9142-0000) mounted on a beam 120 a fixed distance, d 130 apart, along with a slope sensor 140 which measures the slope of the beam in the direction of travel. (For example, the slope sensor might be a "System Four Plus Slope Sensor" 9150P/9152P from Topcon Positioning Systems, Inc.) The elevation distance sensors may be any non-contacting detector such as ultrasonic or laser sensors. Elevation distance sensor 115 is ahead of elevation distance sensor 110 in a direction of travel the assembly will travel. The elevation profile of road surface 150 to the left (as oriented in FIG. 12) of elevation distance sensor 115 would be known (or estimated).

In the present example, the first and second ultrasonic sensors 110 and 115 use active ultrasonic ranging for measuring distances to a surface, such as distances from the ultrasonic sensors to the road surface 150. Preferably, the ultrasonic sensors have an operating range of 14 to 55 inches, such as to account for a banked curve. However, the first and second ultrasonic sensors 110 and 115 are preferably disposed in a range of 18 to 24 inches to minimize atmospheric impact and the like. Those of skill in the art will appreciate that the sensors should be disposed to minimize atmospheric effects while accommodating lateral height differences.

Preferably, the first and second ultrasonic sensors 110 and 115 are positioned to remain within the desired operating range. An auditory signal such as an audible alarm, a visual indicator such as a flashing light, and/or a mechanical flag may be utilized to alert an operator if a sensor is out of range or nearing a range limit. For instance, various combinations of alerts may be utilized to provide differing levels of warnings. Additionally, a mechanical actuator or the like may be provided for maintaining the beam 120 and/or the first and second ultrasonic sensors 110 and 115 in a desired range. In a further example, a mechanical actuator includes a measuring device for determining translational movement of the beam relative to the vertical direction, and adjusts measurements taken by the first and second ultrasonic sensors 110 and 115 accordingly. In another embodiment, vertical translation of the beam may be controlled by an elevation distance sensor coupled with the smoothness indicator 10 for measuring the height of a string line (which typically correlates to a road surface). Those of ordinary skill in the art will appreciate that various other techniques may be used for maintaining the ultrasonic sensors in a desired range.

Preferably, environmental conditions (such as temperature, etc.) are taken into account during operation. When taking ultrasonic measurements over hot asphalt, for instance, correction and/or adjustment of the data gathered by the first and second ultrasonic sensors 110 and 115 is required to account for temperature variations in hot, localized air through which the distance measurements are taken. For example, a temperature gauge assembly 112, a hydrometer, or the like, may be used to correct measurements to account for the speed of sound through the localized air.

Various methods of determining or estimating the speed of sound through the air between the first and second ultrasonic sensors 110 and 115, and a surface to be profiled, may be utilized as well. For example, measurements of a known distance may be taken periodically and used to calibrate the ultrasonic sensor. Alternatively, the smoothness indicator 10 may include optional/required settings for inputting conditions, such as the type of surface being profiled, the ambient air temperature, and the like. These settings may then be utilized to adjust and/or correct measurements taken by the sensors.

After the elevation difference $h_3$ between a pair of locations $(x_1, y_1)$ and $(x_2, y_2)$ measured by the first and second ultrasonic sensors 110 and 115 has been calculated, the elevation difference $h_3$ may be added to or subtracted from a known elevation assigned to one or the other of the pair of locations. For example, if a first elevation $y_1$ has been assigned to the first location $(x_1, y_1)$ measured by the first ultrasonic sensor 110, the elevation difference $h_3$ is added to the first elevation $y_1$ for calculating a second elevation $y_2$ for the second location $(x_2, y_2)$ measured by the second ultrasonic sensor 115. If a third elevation $y_2'$ has been assigned to the second location $(x_2, y_2)$ measured by the second ultrasonic sensor 115, the elevation difference $h_3$ is subtracted from the third elevation $y_2'$ for calculating a fourth elevation $y_1'$ for the first location $(x_1, y_1)$ measured by the first ultrasonic sensor 110. Thus, by utilizing a known elevation assigned to a location measured by one of the first and second ultrasonic sensors 110 and 115, an elevation for another location measured by the other sensor is calculated. Those of skill in the art will appreciate that the elevations measured and/or calculated for the pair of locations $(x_1, y_1)$ and $(x_2, y_2)$ measured by the first and second sensors may be relative to a pre-selected elevation (e.g. a benchmark), related to an absolute elevation, or the like. For example, a GPS measurement may be used as a benchmark, or an elevation input by a user may be assigned to one of the locations $(x_1, y_1)$ and $(x_2, y_2)$.

Figure 13:
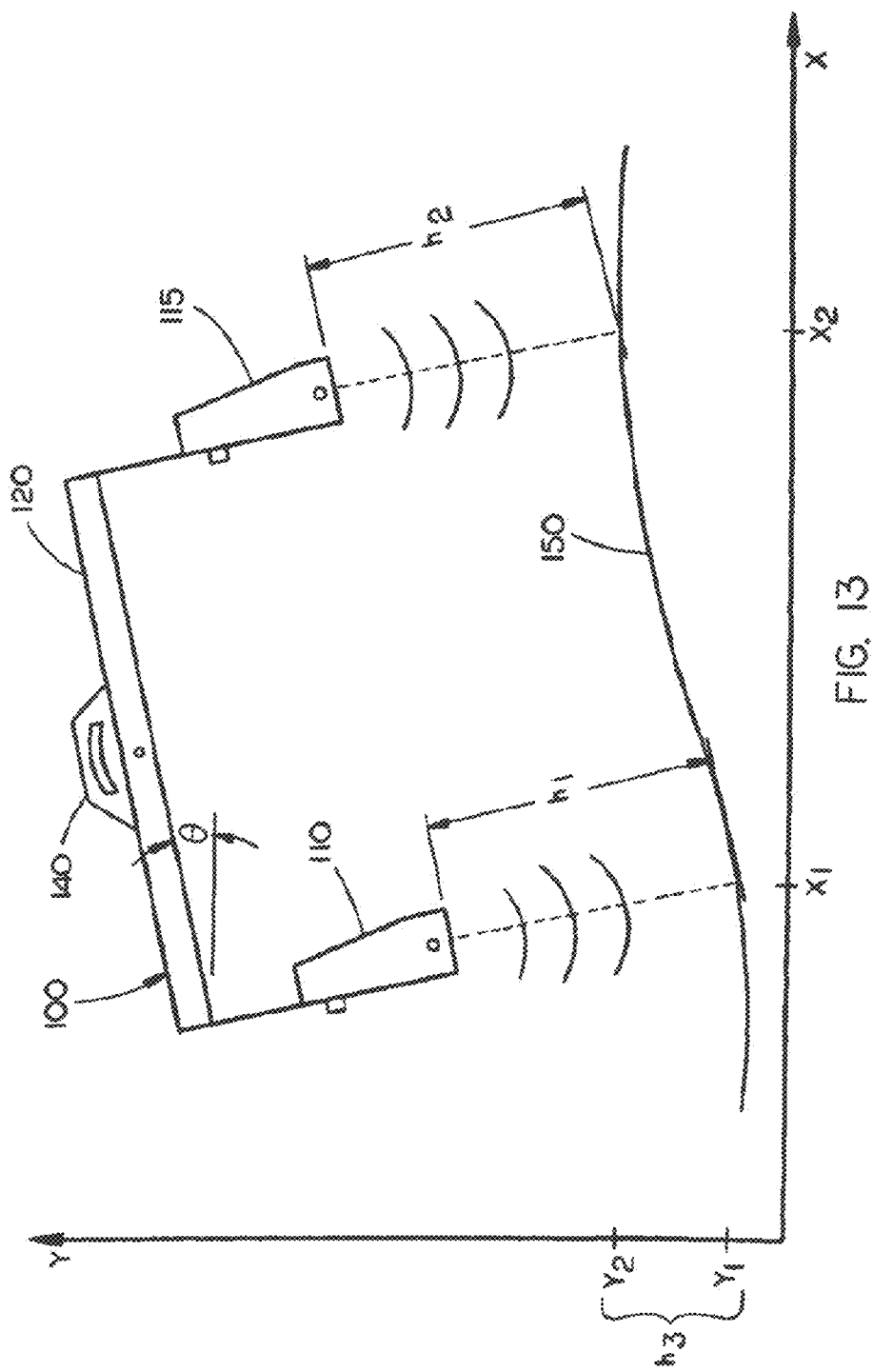
FIG. 13 is a side elevation view of the sensor assembly illustrated in FIG. 12, wherein the sensor assembly is shown in operation at an angle θ.

The elevation of the road surface 150 as determined by the forward elevation distance sensor 115 is calculated utilizing the known elevation at the point sensed by rear elevation distance sensor 110. The method is carried out by calculating the vertical distance from the road surface to the rear end of beam 120, then the distance from the rear end of beam 120 to the forward end, then the vertical distance from the forward end of beam 120 to the road surface sensed by the forward sensor 115. The orientation of the sensing apparatus is shown in FIG. 13. In practice, the calculation is as follows:

$$y_2 = y_1 \pm (h_1 - h_2)\cos\theta \pm d\sin\theta$$

where the subscript 1 is for the rear sensor, and the subscript 2 is for the forward sensor. The x (horizontal) coordinate for the forward sensor is also required for later reference. This is found by:

$$x_2 = x_1 + (h_2 - h_1)\sin\theta + d\cos\theta$$

The coordinates $(x_1, y_1)$ and $(x_2, y_2)$ are depicted in FIG. 13. However, the instantaneous x coordinate of the rear sensor is not immediately known. This may be calculated according to the equation below:

$$x_1^n = x_1^{n-1} + \Delta s^n \cos\left[\frac{1}{2}(\theta^{n-1} + \theta^n)\right] - (h_1^{n-1} + l)\sin\theta^{n-1} + (h_1^n + l)\sin\theta^n + \frac{1}{2}d(\cos\theta^{n-1} - \cos^{n-1})$$

where the superscript n−1 refers to the previous location of beam 120, while superscript n is for the present location of beam 120.

The coordinates ($x_2$, $y_2$) are recorded, the beam 120 translated another increment, Δs 170, and the process repeated until the end of the surface of interest is reached. Interpolation, such as a polynomial spline fit of the data, may be performed to estimate the coordinates of the road surface 150 between the measured points. From the data, roughness indices may be calculated/output. The data may be displayed as a trace or profile.

Figure 15:
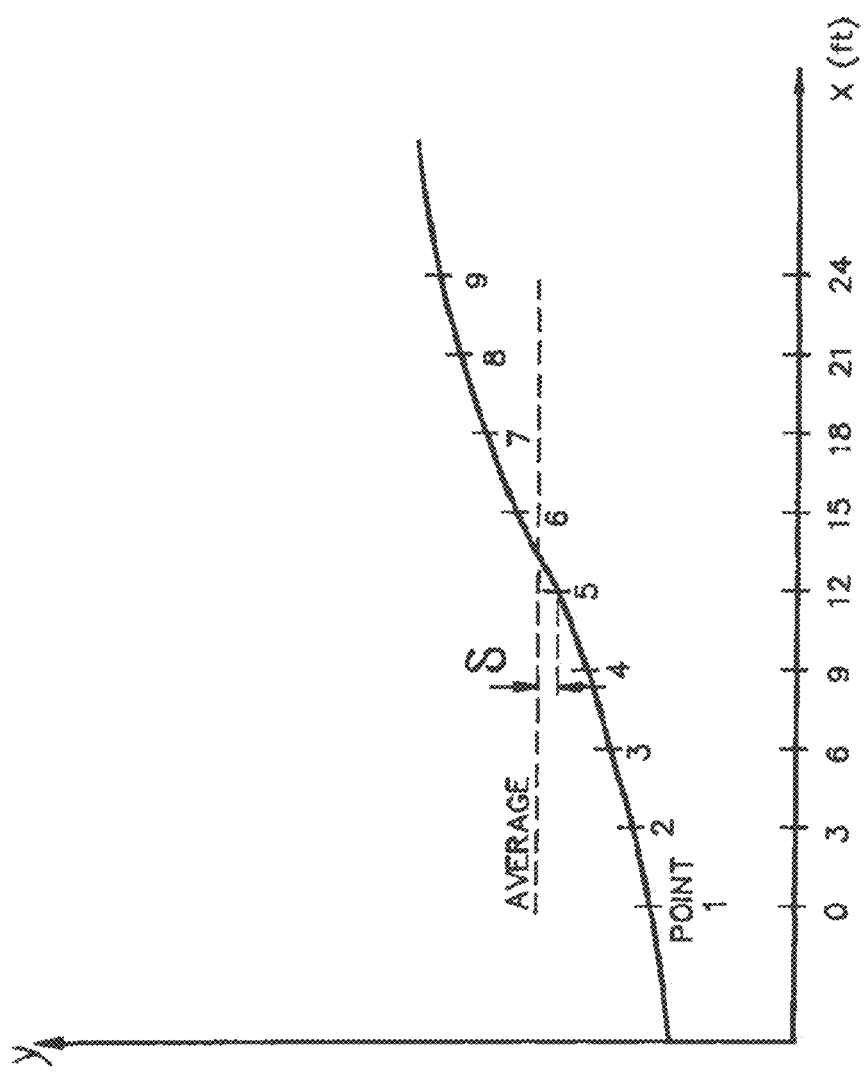
FIG. 15 is a side elevation view illustrating a profile of a road surface in accordance with an exemplary embodiment, wherein the road surface is marked off in a series of horizontal increments, and an average elevation between the increments, δ, is shown.

A result may be calculated, in a fashion analogous to the measurement made by a twenty five foot, eight wheeled profilograph (see FIG. 15). Using the recorded (x, y) data, nine points three feet apart (for instance) are selected or calculated by interpolation. An arithmetic average is taken of eight of the elevations (y values)—all except the elevation for point 5 ($y_5$). Then the vertical distance between point 5 and the average is taken as the profilograph output for point 5 (at $x_5$). A continuous profilograph output may be interpolated between discrete measurement points.

To determine the road surface elevation profile, we begin with a known or estimated road surface elevation profile throughout an initial increment, $x_0 \leq x < x_0 + d\cos\theta°$ where $x_0$ is an arbitrary starting coordinate, and d 130 is the beam length, and θ° is the initial angle of the beam 120 measured from the horizontal as shown in FIG. 13. Initial angle θ° is as measured by slope sensor 140.

In the present example, the smoothness indicator 10 measures a surface profile by interleaving a series of discrete profiles measured by the sensor assembly 100. For example, at the start of an elevation profile, the first and second ultrasonic sensors 110 and 115 measure an elevation difference at a first position $P_1$ relative to the road surface 150. A first elevation measurement $y_1^{n-1}$ is assigned to the first location ($x_1^{n-1}$, $y_1^{n-1}$) on the road surface 150, measured by the first ultrasonic sensor 110 (in this case, the trailing sensor relative to the direction of travel); and an elevation difference between the first location ($x_1^{n-1}$, $y_1^{n-1}$) and the second location ($x_2^{n-1}$, $y_2^{n-1}$) on the road surface, measured by the second ultrasonic sensor 115 (in this case, the leading sensor), is added to the first elevation $y_1^{n-1}$ to calculate a second elevation measurement $y_2^{n-1}$ for the second location ($x_2^{n-1}$, $y_2^{n-1}$) on the road surface 150. In embodiments, the first elevation measurement $y_1^{n-1}$ assigned to the first location ($x_1^{n-1}$, $y_1^{n-1}$) measured by the trailing sensor is zero, and it is assumed that the sensor assembly 100 is starting on a level surface. In other embodiments, the smoothness indicator 10 allows the user to enter initial elevation data for the location measured by the trailing sensor. Additionally, GPS data or the like may be utilized to assign an elevation to an initial location measured by the trailing sensor.

Figure 14:
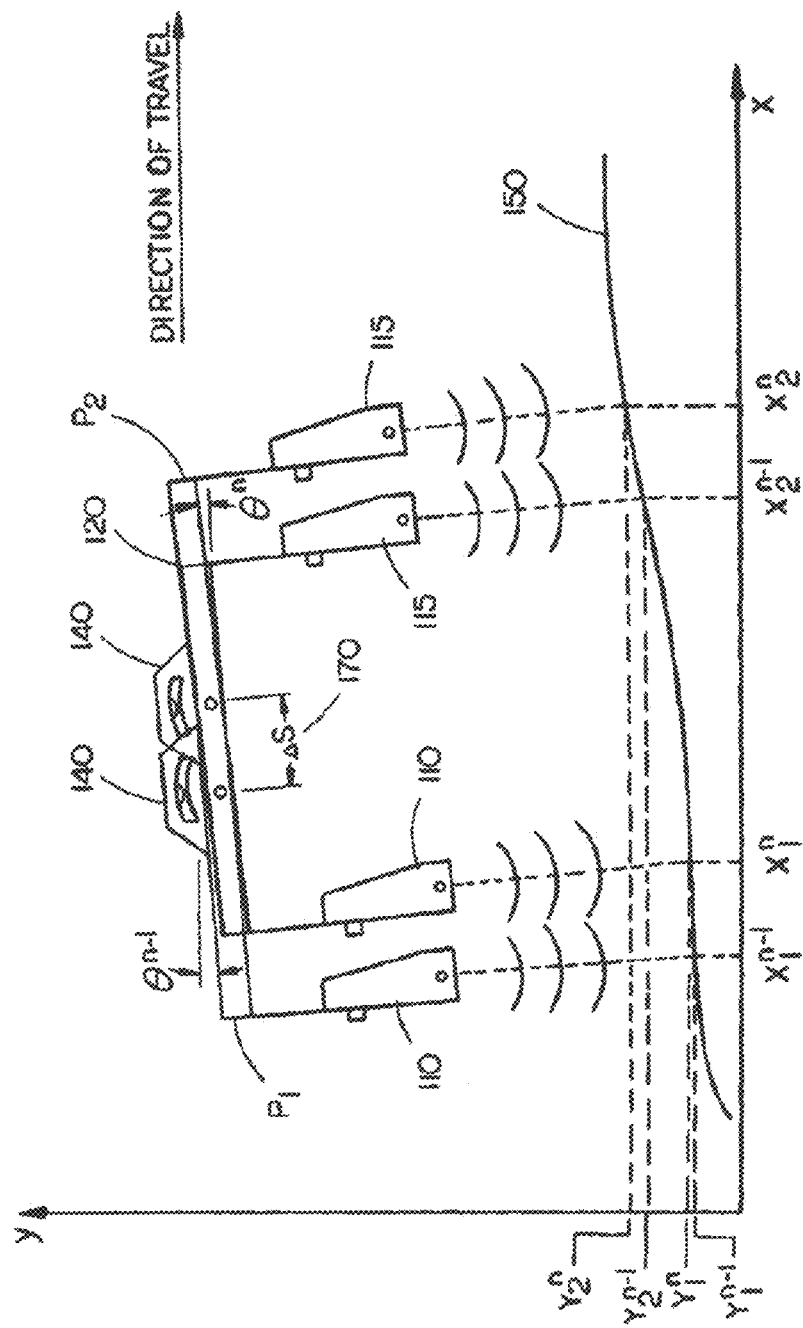
FIG. 14 is a side elevation view of the sensor assembly illustrated in FIG. 12, wherein the sensor assembly is shown in operation at a first position $P_1$ and a second position $P_2$.

The sensor assembly 100 is moved in the direction of travel (e.g. from left to right with respect to FIGS. 12 and 13) an incremental horizontal distance less than or equal to $d\cos\theta°$. This increment is denoted Δs 170 as shown in FIG. 14. A travel distance sensor (such as 710, FIG. 1) is utilized to measure the distance traveled by the sensor assembly 100. At this point, rear elevation distance sensor 110 senses the road surface 150 at a location for which the elevation is known (or assumed). Forward elevation distance sensor 115 senses the surface 150 at a new location—one for which the elevation has not yet been calculated.

In order to generate a profile for a surface, the elevation differences are correlated to distances between measurement positions. For example, elevation differences are measured by the first and second ultrasonic sensors 110 and 115 between pairs of locations at first and second positions $P_1$ and $P_2$, along the direction traveled by the sensor assembly 100. In order to determine distances between these positions, an elevation distance sensor is used. For instance, a pulse pickup (PPU) embedded in a drive motor is utilized to measure longitudinal distances between the first and second positions $P_1$ and $P_2$. Alternatively, a separate distance wheel may be included for determining distances between the positions. Those of skill in the art will appreciate that various techniques may be used for determining distances between the first and second positions $P_1$ and $P_2$ as desired.

The first and second ultrasonic sensors 110 and 115 travel longitudinally along a path (e.g. the road) to the second position $P_2$, for generating the surface profile. Upon reaching the second position $P_2$, another set of measurements are obtained. An initial elevation measurement $y_1''$ is again assigned to a third location ($x_1''$, $y_1''$) on the road surface 150, measured by the first ultrasonic sensor 110 at the second position $P_2$; and an elevation difference between the third location ($x_1''$, $y_1''$) and a fourth location ($x_2''$, $y_2''$) on the road surface, measured by the second ultrasonic sensor 115 at the second position $P_2$, is added to the initial elevation measurement $y_1''$, as described above, for determining an elevation measurement $y_2''$ for the fourth location ($x_2''$, $y_2''$) on the road surface 150. This process is repeated until the sensor assembly 100 has traveled the pre-selected distance d 130, at which point elevation measurements assigned to locations measured by the trailing sensor comprise elevation measurements made by the leading sensor. In further embodiments, the elevation measurements are averaged over distance intervals, and an average elevation measurement for each interval is stored. For example, the elevation measurements are averaged over 2-inch intervals and stored. In this manner, data storage may be minimized. Additionally, the use of elevation measurements averaged over distance intervals may provide a smoothing and filtering effect.

Figure 16:
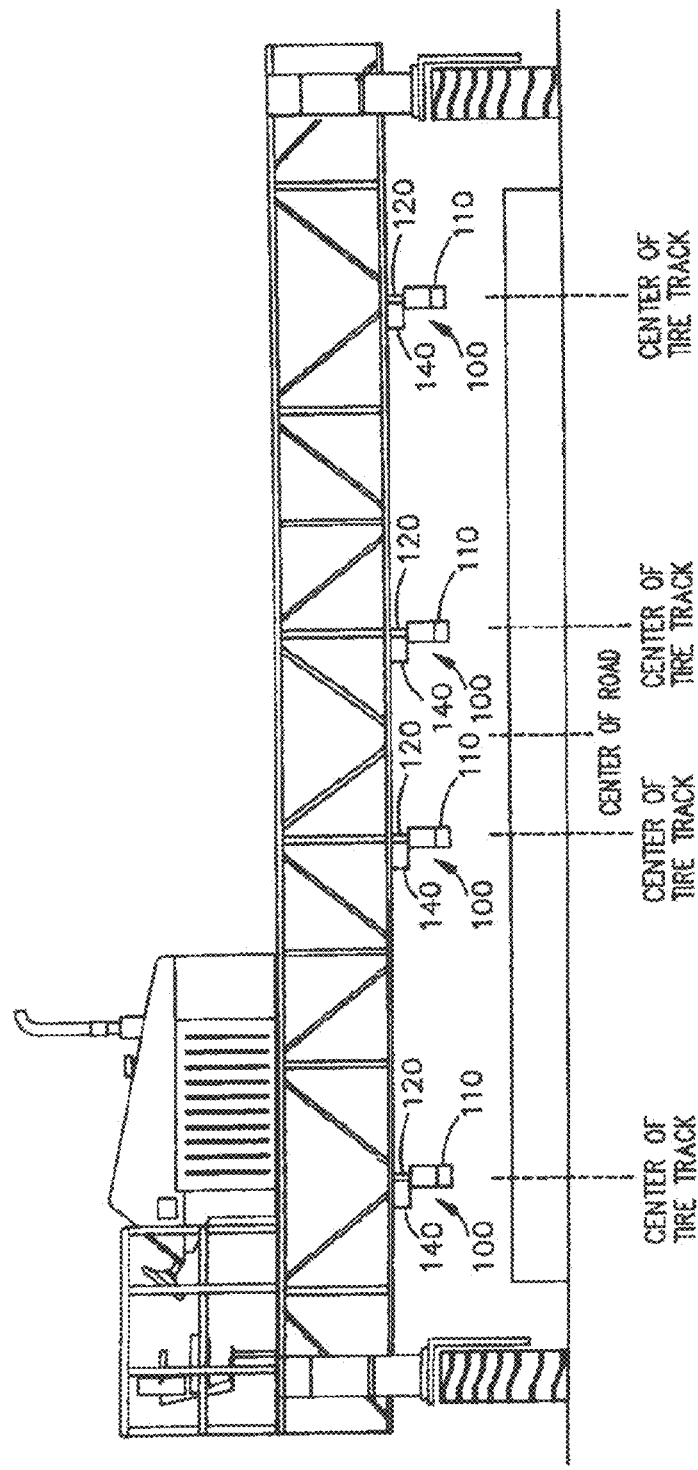
FIG. 16 is an end elevation view illustrating a smoothness indicator in accordance with a further exemplary embodiment, wherein the smoothness indicator includes a series of sensor assemblies positioned over tire track locations on a road surface.

The translating of the sensor assembly 100 may be carried out in several ways, and embodiments are not to be limited to a particular mode of translation. For example, a plurality of sensor assemblies 100 are mounted on the rear of a road paving machine. This permits adjustment of the paving machine as surface variations are detected. Also, variations may be corrected while the concrete is in a plastic state. Referring to FIG. 16, a dedicated rig is employed. Again, a plurality of sensor assemblies 100 are utilized to provide a profile of the road surface, such as the expected lanes traveled by a vehicle's tires.

As discussed, the elevation profile for an initial portion of the surface may be known, estimated, or assumed, such as by utilizing a generally flat section, on the interval $x_0 \leq x < x_0 + d\cos\theta°$.

One of the ways the surface can be obtained in this region is to assume the surface is flat for a distance equal to the distance between the first and second sensors. The difference between the actual elevation at each point and the assumed surface will reappear as errors in the elevation (y values) on each interval following the initial one. There are two options for improving the resulting surface estimate:

1. Remove the resulting errors with a low-pass filter by passing the entire elevation profile through a low-pass filter algorithm with a cutoff wavelength longer than d—thus diminishing the error.
2. Attempt to remove the error by determining a Taylor Series or Fourier Series most highly correlated to the y(x) values in every interval of the surface profile.

In additional examples, the initial surface is obtained by laying a known flat plate having a length greater than d 130 such that it lies under both elevation distance sensors at the initial location. Deviations from this flat plate are measured.

Figure 17:
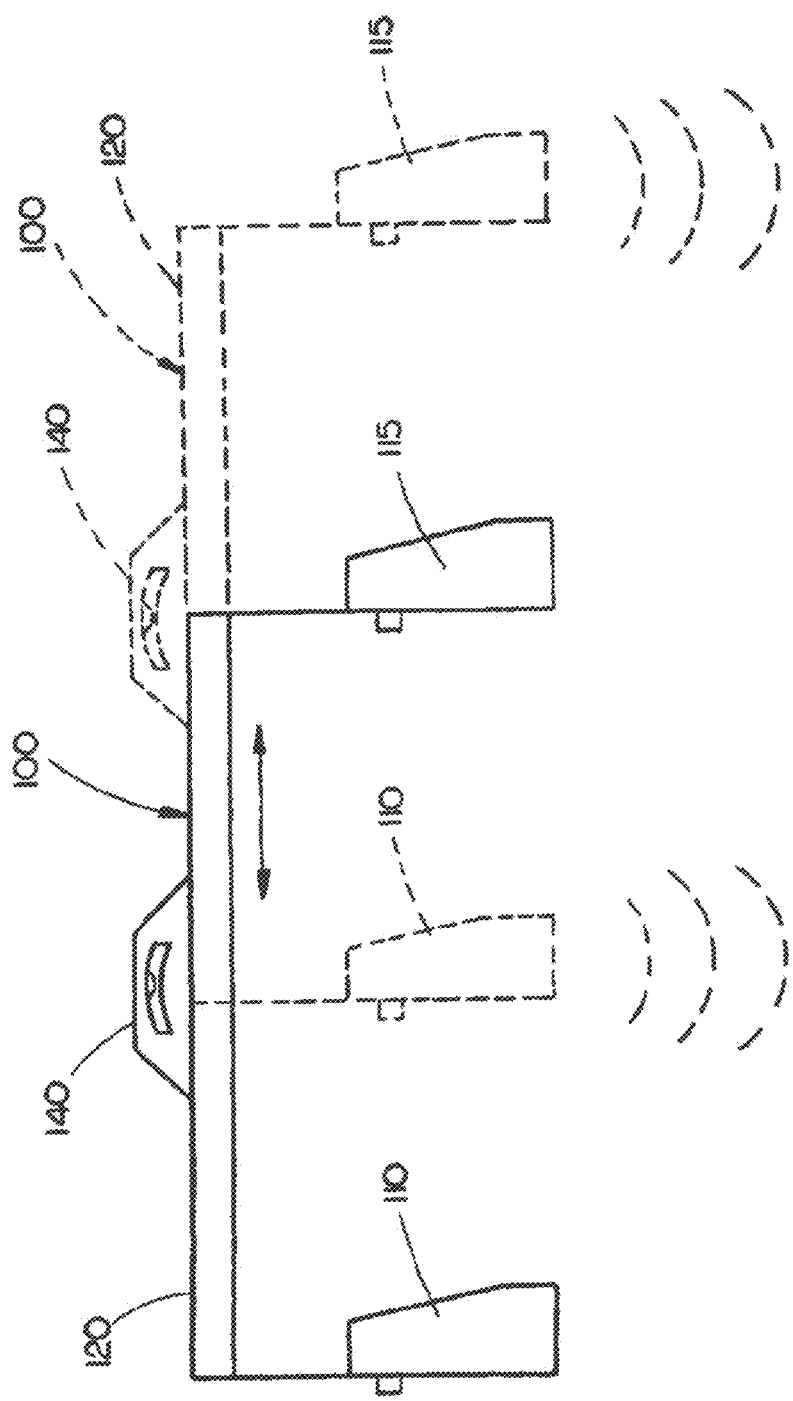
FIG. 17 is a side elevation view illustrating translation of a sensor assembly for use with a smoothness indicator in accordance with an exemplary embodiment.

Obtaining an initial surface elevation profile is depicted in FIG. 17. In this alternative, translation of the sensor assembly occurs over a distance of at least d cos θ° without movement of the vehicle on which the assembly is mounted, such as by a mechanical actuator/carriage assembly. In this manner, the angle, θ, is unchanging throughout the process. An additional translation sensor (710 of FIG. 1, for instance) to measure the distance traversed must be included in the apparatus. For this approach, the required distance of translation would only be ½ d cos θ° because both sensors may be utilized. The coordinates of the rear sensor are calculated as follows $$x_1^n = x_1^{n-1} + \Delta s^n \cos \theta$$

$$y_1^n = y_1^{n-1} + \Delta s^n \sin \theta + (h_1^n - h_2^n) \cos \theta$$

where Δs is measured by the additional translation sensor. The superscripts are defined as above. The coordinates for the front sensor are given as $$x_2^n = x_1^n + d \cos \theta$$

$$y_2^n = y_1^n + (h_1^n - h_2^n) \cos \theta + d \sin \theta$$

Figure 18:
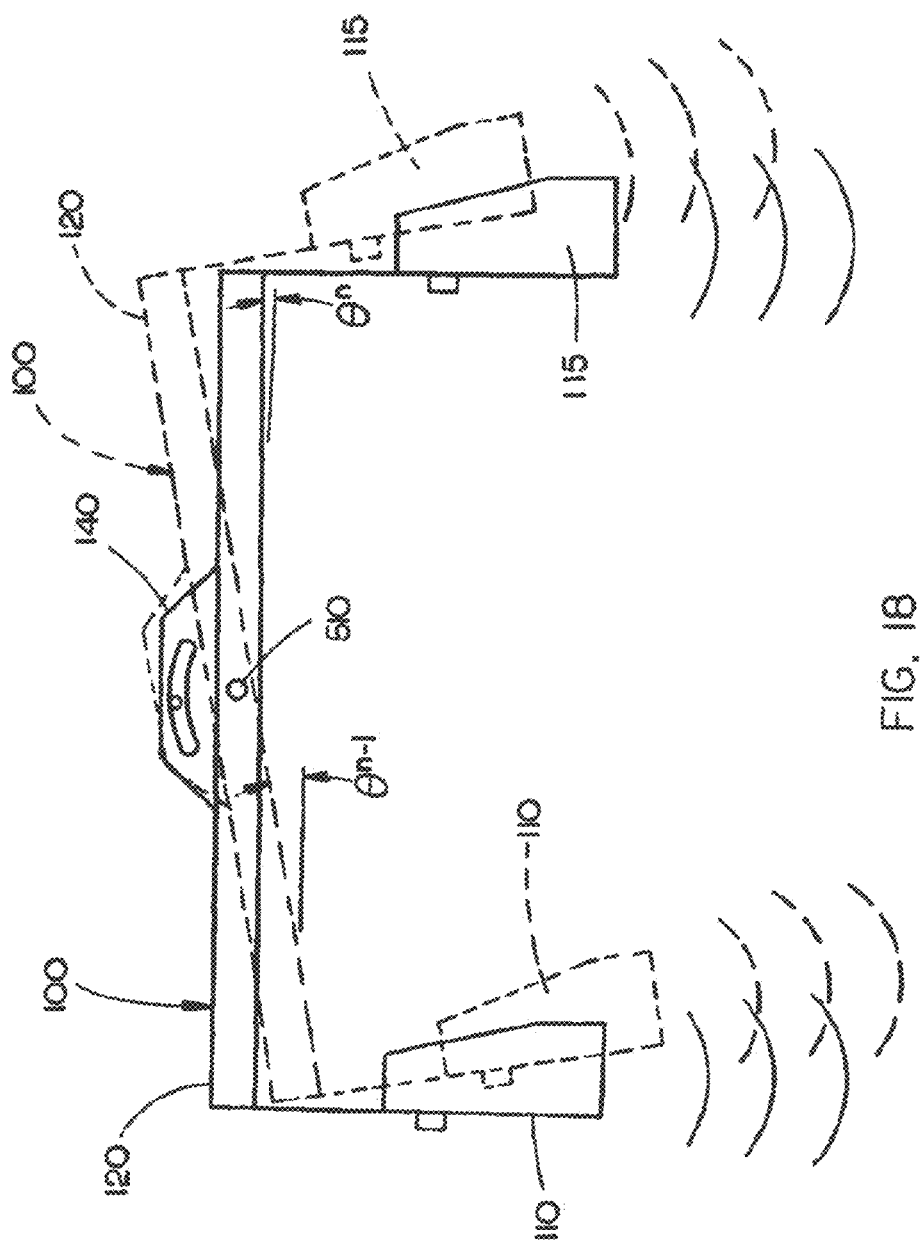
FIG. 18 is a side elevation view illustrating rotation of a sensor assembly for use with a smoothness indicator in accordance with a further exemplary embodiment.

Finally, the beam 120 can be rotated parallel to a (roughly) vertical plane about its center (the actual point of rotation is arbitrary, but for the following analysis, the center is the assumed point of rotation). No translation is to take place during this process. FIG. 18 is a depiction of this method. Let 0 be the initial orientation of the beam, and 1, 2, . . . , n−1, n, . . . , N be successive angles at which discrete measurements are taken.

To determine the rear elevation distance sensor's final location, $x_1^1$, relative to its initial location $x_1^0$ the horizontal distance from the initial location to the beam's center, then back to the final location, is calculated. Referring to FIG. 18 for nomenclature, the location of $x_1^1$ is calculated as:

$$x_1^1 + x_1^0 - (h_1^0 + l)\sin\theta^0 + (h_1^1 + l)\sin\theta^1 + \frac{1}{2}d(\cos\theta^0 - \cos\theta^1)$$

The corresponding y location, $y_1^1$, relative to the initial y location, $y_1^0$, is determined calculating the vertical distance from the initial location to the beam's center, then back to the final location, thus:

$$y_1^1 + y_1^0 - (h_1^0 + l)\sin\theta^0 + (h_1^1 + l)\sin\theta^1 + \frac{1}{2}d(\cos\theta^0 - \cos\theta^1)$$

At the same time, the rear sensor 110 can be measuring the road surface as the beam is rotated. The coordinates when 0=0° are calculated thus:

$$x_2^0 = x_1^0 + (h_2^0 - h_1^0)\sin\theta^0 + d\cos\theta^0$$

$$y_2^0 = y_1^0 + (h_1^0 - h_2^0)\cos\theta^0 + d\sin\theta^0$$

Then, as the beam is rotated, the coordinates from both sensors are calculated as:

$$x_1^n = x_1^{n-1} + (h_1^{n-1} + l)\sin\theta^{n-1} + (h_1^n + l)\sin\theta^n + \frac{1}{2}d(\cos\theta^{n-1} - \cos\theta^n)$$

$$x_2^n = x_1^n + (h_2^n - h_1^n)\sin\theta^n + d\cos\theta^n$$

$$y_1^n = y_1^{n-1} + (h_1^{n-1} + l)\cos\theta^{n-1} + (h_1^n + l)\cos\theta^n + \frac{1}{2}d(\sin\theta^{n-1} - \sin\theta^n)$$

$$y_2^n = y_1^n + (h_1^n - h_2^n)\cos\theta^n + d\sin\theta^n$$

In the foregoing manner, an elevation profile is an interleaved series of discrete profiles. For instance, if elevation measurements are determined for pairs of locations at two-inch intervals, and the ultrasonic sensors are spaced three feet apart, 18 discrete profiles will be generated and interleaved together. Thus, elevation measurements for any two locations spaced two inches apart will be independent of each other. Those of skill in the art will appreciate that the spacing of the first and second ultrasonic sensors 110 and 115, the distance between measurements taken by the sensors, and the number of discrete profiles generated may vary as desired.

Because the surface profile generated by the smoothness indicator 10 is an interleaved series of discrete profiles, it will be appreciated that random errors introduced in the course of measuring elevation differences between series of locations will propagate, accumulating to form errors for the interleaved series of discrete profiles which may exceed errors for the elevation measurements of a single profile. Those of ordinary skill in the art will appreciate that this may generate an error band for the interleaved series of measurements larger than that for a single profile.

In exemplary embodiments, an incremental spatial filter is applied when generating a surface profile. For example, a single-pole low-pass spatial filter is utilized to generate a filtered profile of the surface (such as a spatial filter utilizing a nine-inch length constant). For example, a series of elevation differences are measured by the first ultrasonic sensor 110 and the second ultrasonic sensor 115, and the elevation differences are used to calculate an average elevation measurement over an initial two-inch interval. The average elevation measurement for the initial two-inch interval is then filtered, such as by comparing it to an elevation measurement for a second two-inch interval adjacent to the initial interval. In the current example, a surface profile is post-filtered, or filtered upon completion of the profile's elevation measurements; while in another embodiment, the surface profile is incrementally filtered, wherein each new elevation measurement for the profile is filtered before being stored. Those of skill in the art will appreciate that other filters may be used to alter, correct, and/or modify elevation measurements, for increasing the relative accuracy of the measurements, without departing from the scope and intent of the embodiments of the invention.

Surface profile data measured by the smoothness indicator 10 may be used for deriving information about a surface. In exemplary embodiments, the surface profile data is used to identify a must-grind bump, a bump which must be reduced and/or eliminated from the surface (e.g. to meet construction specifications). For example, the smoothness indicator 10 may use hardware and/or software installed in an information handling system device, such as a portable computer assembly, to identify a must-grind bump. In embodiments, the smoothness indicator 10 includes a mechanical assembly for marking or identifying the must-grind bump, such as by painting a mark at the location of the bump. Other techniques may be used to identify a must-grind bump as desired. Additionally, other surface irregularities may be noted, such as low spots.

An advantage of the present system is that a surface irregularity may be indicated and corrected while the road surface 150 is still in a plastic state. It will be appreciated that a dedicated smoothness indicator 10 may be used to identify a surface irregularity, such as a must grind bump; and the bridge rig assembly 12 may be reversed to allow for smoothing of the road surface 150. Upon smoothing and/or elimination of the irregularity, the smoothness indicator 10 may be moved over the feature to verify that it has been reduced and/or eliminated and to provide a profile of the corrected segment. This process may be repeated as required. In exemplary embodiments, surface profile data acquired for the surface irregularity before it has been reduced and/or eliminated is replaced by data from a second pass, a third pass, or another pass over the irregularity. In this manner, data stored by the smoothness indicator reflects the actual surface profile of the road surface 150, such as for a $1/10$ mile road segment. However, it is contemplated that initial measurement data for the feature may be retained by the smoothness indicator 10 for measuring the effectiveness of the corrective operation, for personnel training or the like.

In another embodiment, a surface profile is taken of the road surface 150, and elevation measurements determined for the surface are stored by the smoothness indicator, such as by a Random Access Memory (RAM), a Read-Only Memory (ROM), a magnetic diskette, and/or removable media, such as a floppy disk. These elevation measurements may be utilized to determine must-grind bumps or other surface irregularities upon completion of the elevation profile. In combination with station marker data, which may be stored along with elevation measurements, the stored data may be retrieved and examined, such as by hardware or software, to identify must-grind bumps. An operator may identify the bumps via station marker data, location data, or other data stored as part of the surface profile, for identifying the location of the surface irregularity. Those of skill in the art will appreciate that other information may be determined upon completion of the profile, such as low spots, Profile Index data, International Roughness Index data, Gomaco Smoothness Indicator Index data, or the like.

The surface profile data is analyzed to provide data in various formats. In embodiments, surface profile measurements are utilized to produce a simulated profilograph output (FIG. 15). For example, a California Profilograph output may be generated. Additionally, Profile Index values may be calculated. Measurements may also be utilized to calculate International Roughness Index values, which simulate travel of a theoretical "golden car" over the road surface 150. Typically, index values such as Profile Index values and International Roughness Index values are computed for set intervals, such as between station markers. Another advantage of the smoothness indicator 10 is that it allows for the calculation of index values, such as Gomaco Smoothness Indicator Index values, over a user-defined interval, such as an interval of one-tenth of a mile, for instance. Additionally, the user-defined interval may be centered on any point within the profile. Those of skill in the art will appreciate that surface profile measurements may be formatted in a wide variety of ways.

Figure 19:
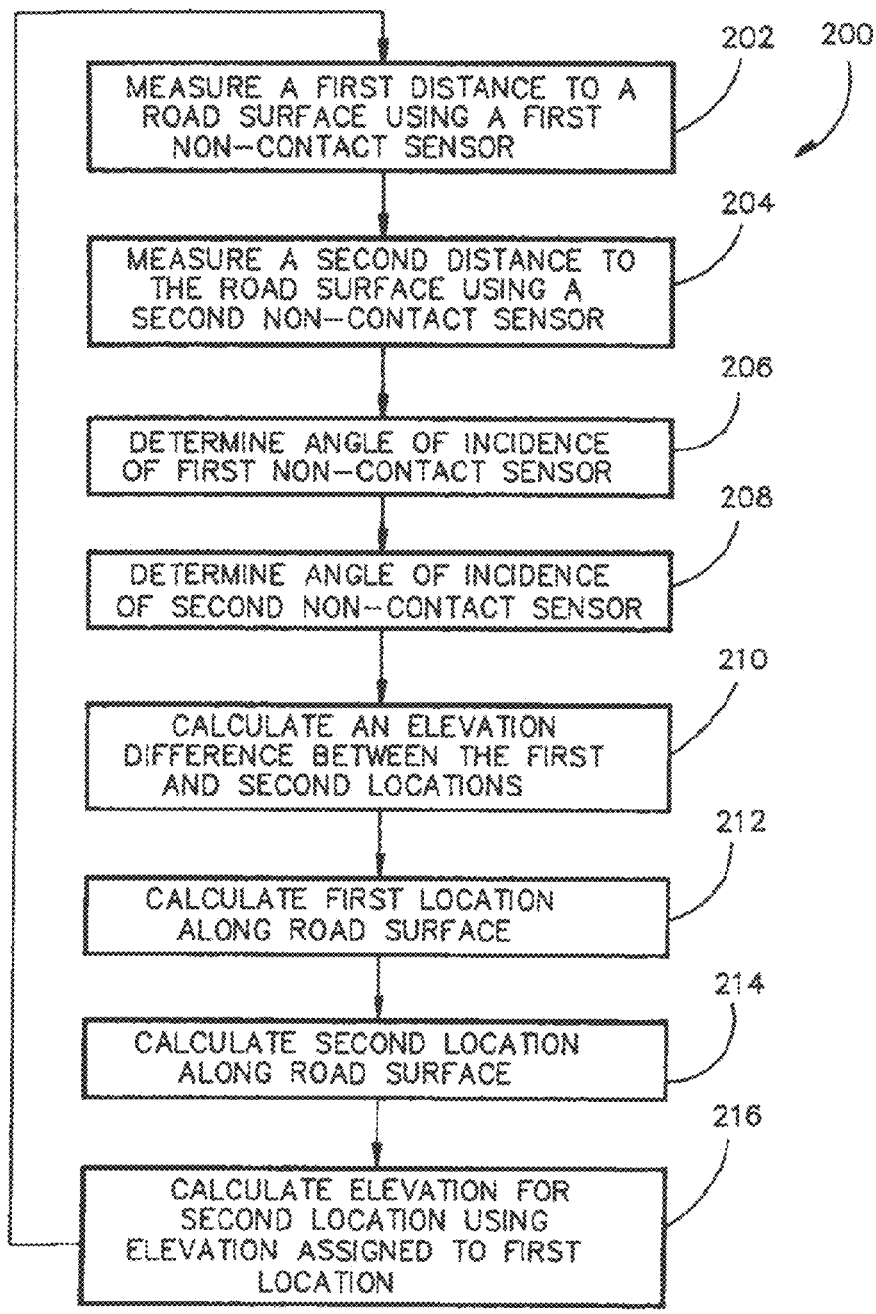
FIG. 19 is a flow diagram illustrating a method for profiling a surface in accordance with an exemplary embodiment.

Referring now to FIG. 19, a method 200 for determining an elevation profile in accordance with an embodiment is described. In step 202, a first non-contact elevation distance sensor, such as the first ultrasonic sensor 110, measures a first distance to a surface, such as the distance $h_1$ to the road surface 150, at a first location, such as the location $(x_1, y_1)$. In step 204, a second non-contact elevation distance sensor, such as the second ultrasonic sensor 115, measures a second distance to the surface, such as the distance $h_2$ to the road surface 150, at a second location, such as the location $(x_2, y_2)$. In step 206, a first angle of incidence for the first ultrasonic sensor 110 relative to a horizontal plane is determined, such as by measuring angle $\theta$ using slope sensor 140. Then, in step 208, a second angle of incidence for the second ultrasonic sensor 115 relative to the horizontal is determined (such as by measuring angle $\theta$ using slope sensor 140). In step 210, an elevation difference, such as elevation difference $h_3$, is calculated between the first and second locations, using the first and second distances and the first and second angles of incidence. Next, in step 212, the first location $(x_1, y_1)$ along the road surface 150 is calculated using the first distance and the first angle of incidence. Likewise, in step 214, the second location $(x_2, y_2)$ along the road surface 150 is calculated using the second distance and the second angle of incidence. Finally, in step 216, the elevation of the second location $(x_2, y_2)$ is calculated using an elevation assigned to the first location $(x_1, y_1)$, for generating an elevation profile of the road surface.

Figure 20:
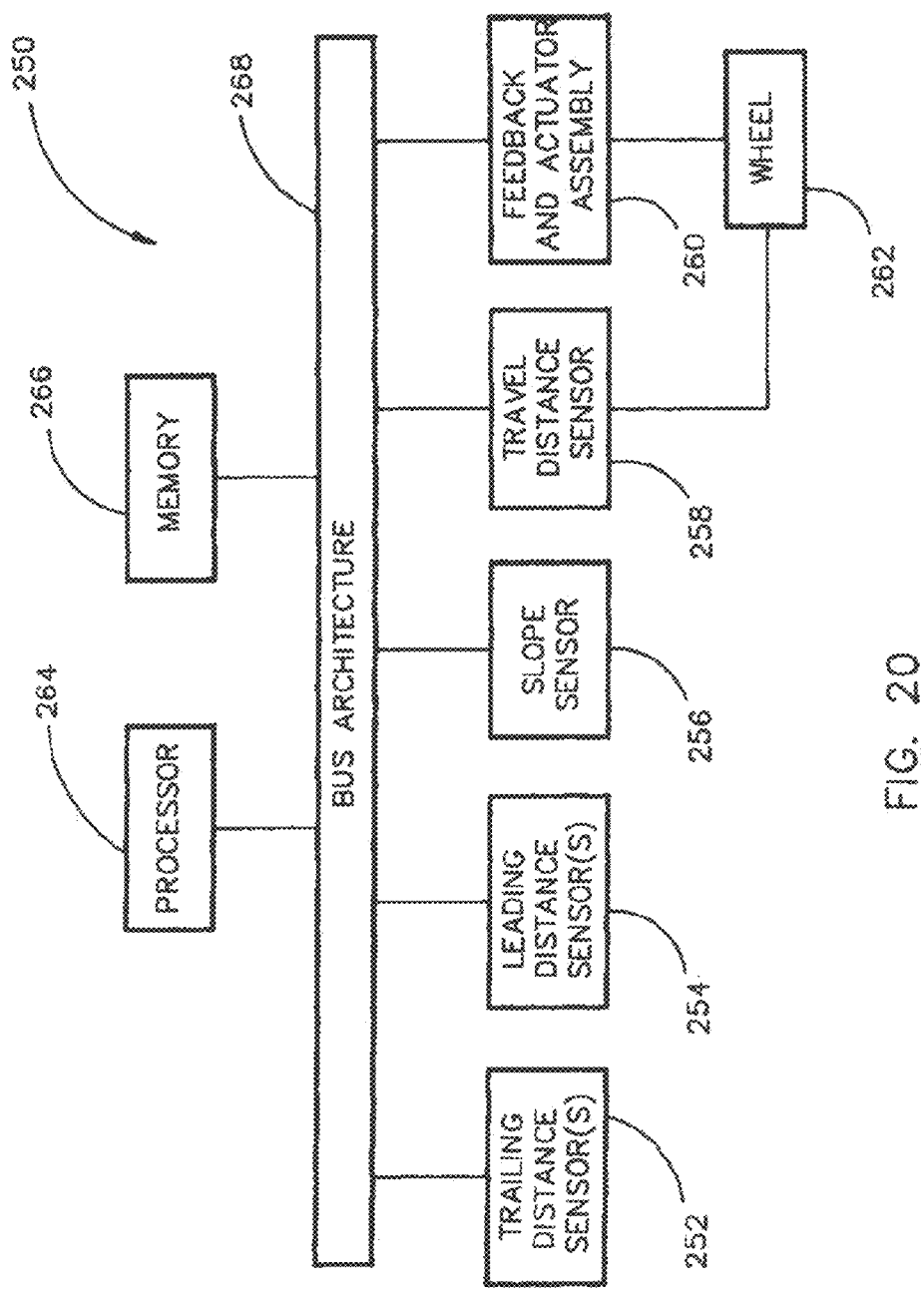
FIG. 20 is a system diagram illustrating a smoothness indicator in accordance with another exemplary embodiment.

Referring to FIG. 20, a smoothness indicator 250 in accordance with an exemplary embodiment is described. The smoothness indicator 250 includes a first elevation distance sensor 252, a second elevation distance sensor 254, a slope sensor 256, a travel distance sensor 258, a feedback and actuator assembly 260 coupled with a wheel 262, and a processor 264 coupled with a memory 266, interconnected in a bus architecture 268. The first and second elevation distance sensors 252 and 254 are non-contact sensors, such as ultrasonic sensors, laser sensors, or the like. In one embodiment, the first and second elevation distance sensors are ultrasonic sensors, and they communicate measurements to the processor forty times per second. The slope sensor 256 is for measuring a slope from a horizontal plane of a line along which the ultrasonic sensors 252 and 254 are oriented. The travel distance sensor 258 is for measuring distances traveled, such as distances traveled by the wheel 262. The feedback and actuator assembly 260 uses control logic for controlling the wheel 262 via an actuator assembly. The processor 264 uses distance measurements taken by the first and second elevation distance sensors 252 and 254, in combination with slope measurements taken by the slope sensor 256, to calculate elevation differences between locations on a surface, such as the road surface 150 (FIG. 1). Additionally, the processor 264 communicates with the memory 266, storing and retrieving elevation measurements for calculating smoothness index values, Profile Index (PI) values, International Roughness Index (IRI) values, and other elevation measurements and indices. The processor 264 may also provide input to the feedback and actuator assembly 260. For example, the processor may be coupled with a contact sensor or an elevation distance sensor for tracking the location of a string line and moving the smoothness indicator 250 accordingly. Those of ordinary skill in the art will appreciate that a smoothness indicator may use various components without departing from the scope and intent of the disclosure.

Referring generally to FIGS. 21 through 29, a graphical user interface 300 for the smoothness indicator 10 is described. The graphical user interface 300 may be displayed on a portable information handling system device, such as a personal computer, a dedicated processing assembly, or another similar machine.

Figure 21:
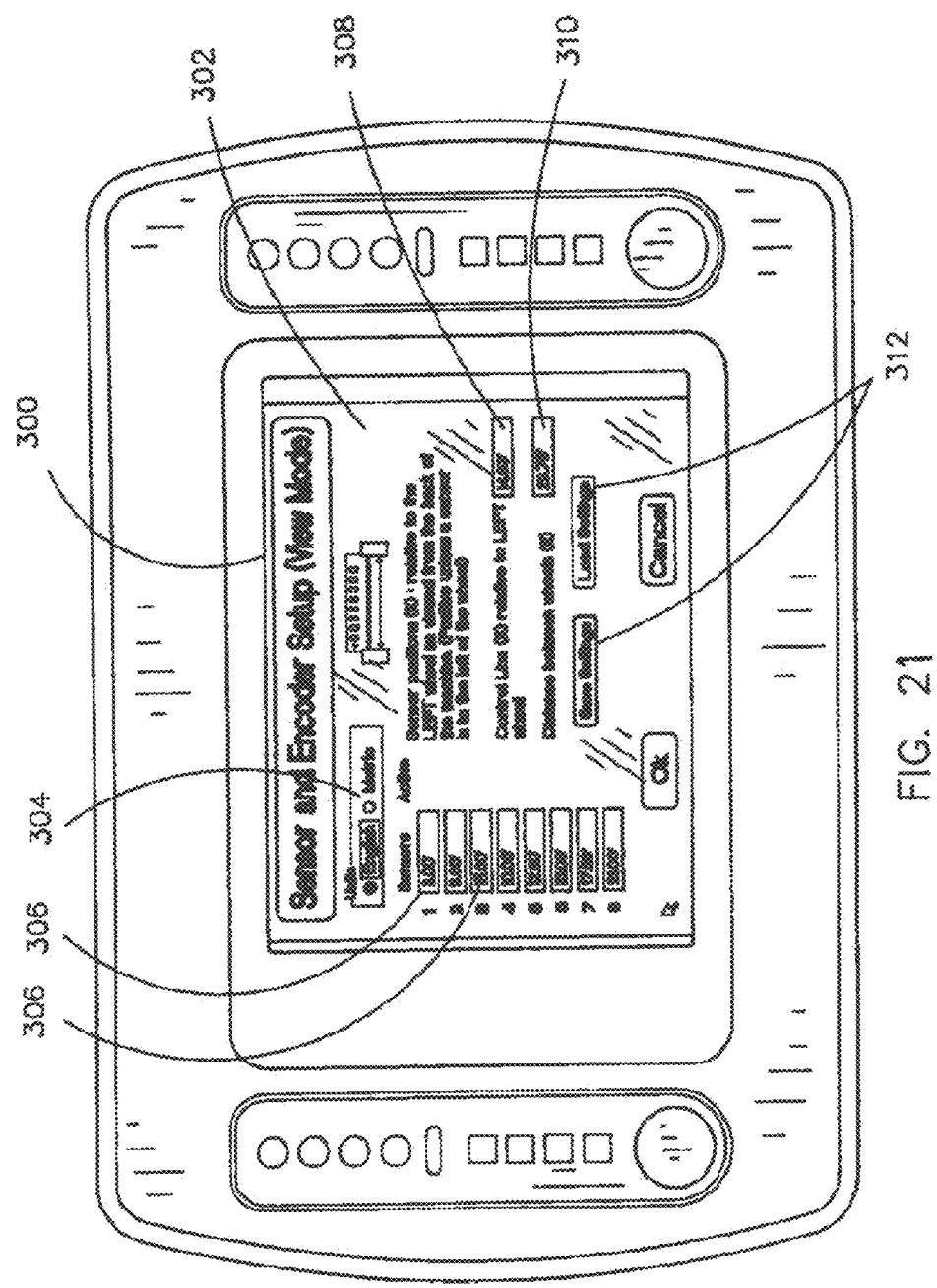
FIG. 21 illustrates a setup screen for a smoothness indicator graphical user interface in accordance with an exemplary embodiment.

Referring to FIG. 21, a sensor and encoder setup screen 302 is described. The sensor and encoder setup screen 302 includes radio/selection buttons 304 for selecting English and/or metric units. A number of text entry boxes 306 may be included for allowing an operator to input the distances of sensor assemblies 100 relative to a wheel of the bridge rig assembly 12, such as a wheel 16 (FIG. 1), or the like. A second text entry box 308 is provided for entering the position of a control line relative to the wheel. A third text entry box 310 is provided for inputting the distance between wheels of the bridge rig assembly 12. Load and save buttons 312 are also included for recording and/or recalling information entered in the text boxes 306, 308, and 310. Other text entry boxes may be included for recording parameters for the smoothness indicator 10 and the like.

Figure 22:
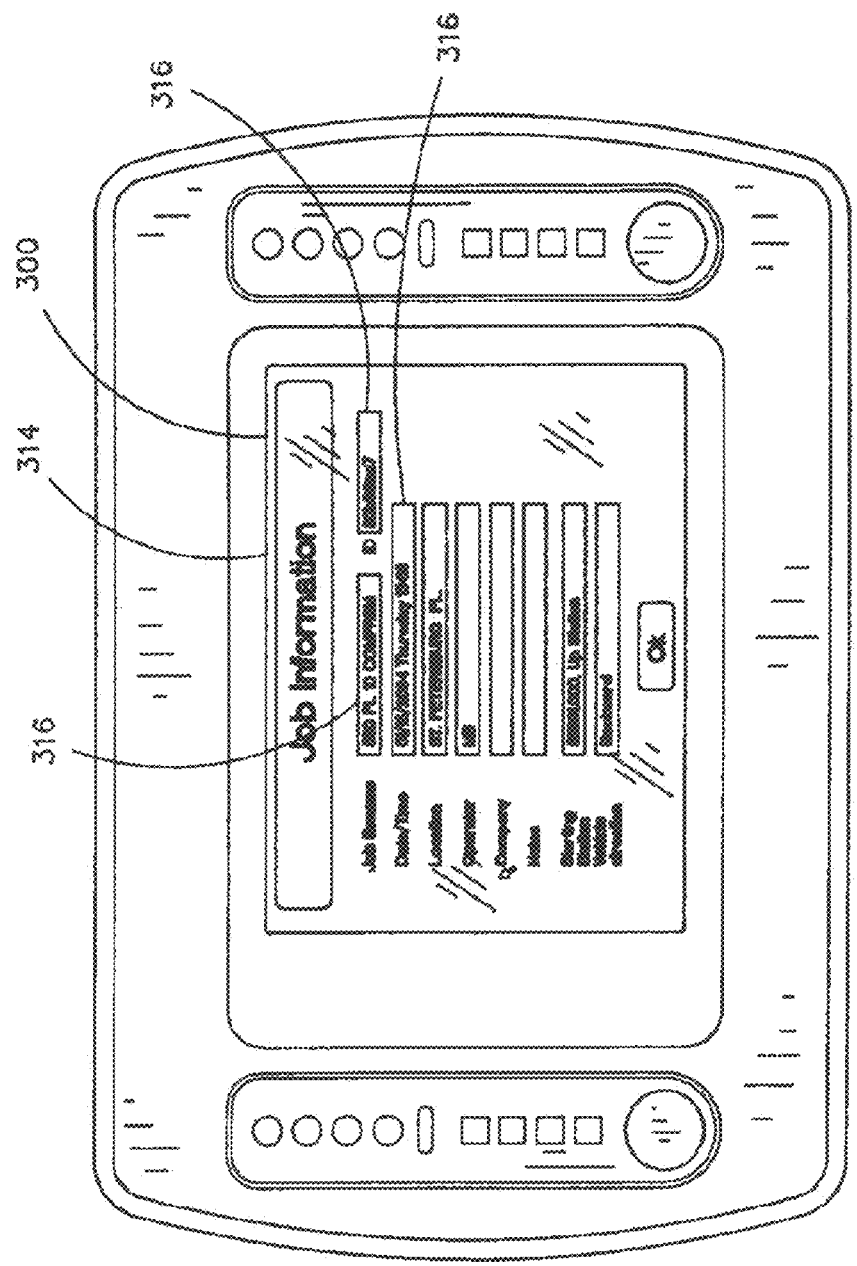
FIG. 22 illustrates a job information screen for the smoothness indicator graphical user interface shown in FIG. 21.

Referring now to FIG. 22, a job information screen 314 is described in accordance with an exemplary embodiment. The job information screen 314 may include text entry boxes 316 for entering information about a particular profile, a particular job for which a profile is to be generated, and other information as desired. Information entered in the job information screen 314, may be stored and/or recorded with a surface profile to aid identification.

Figure 23:
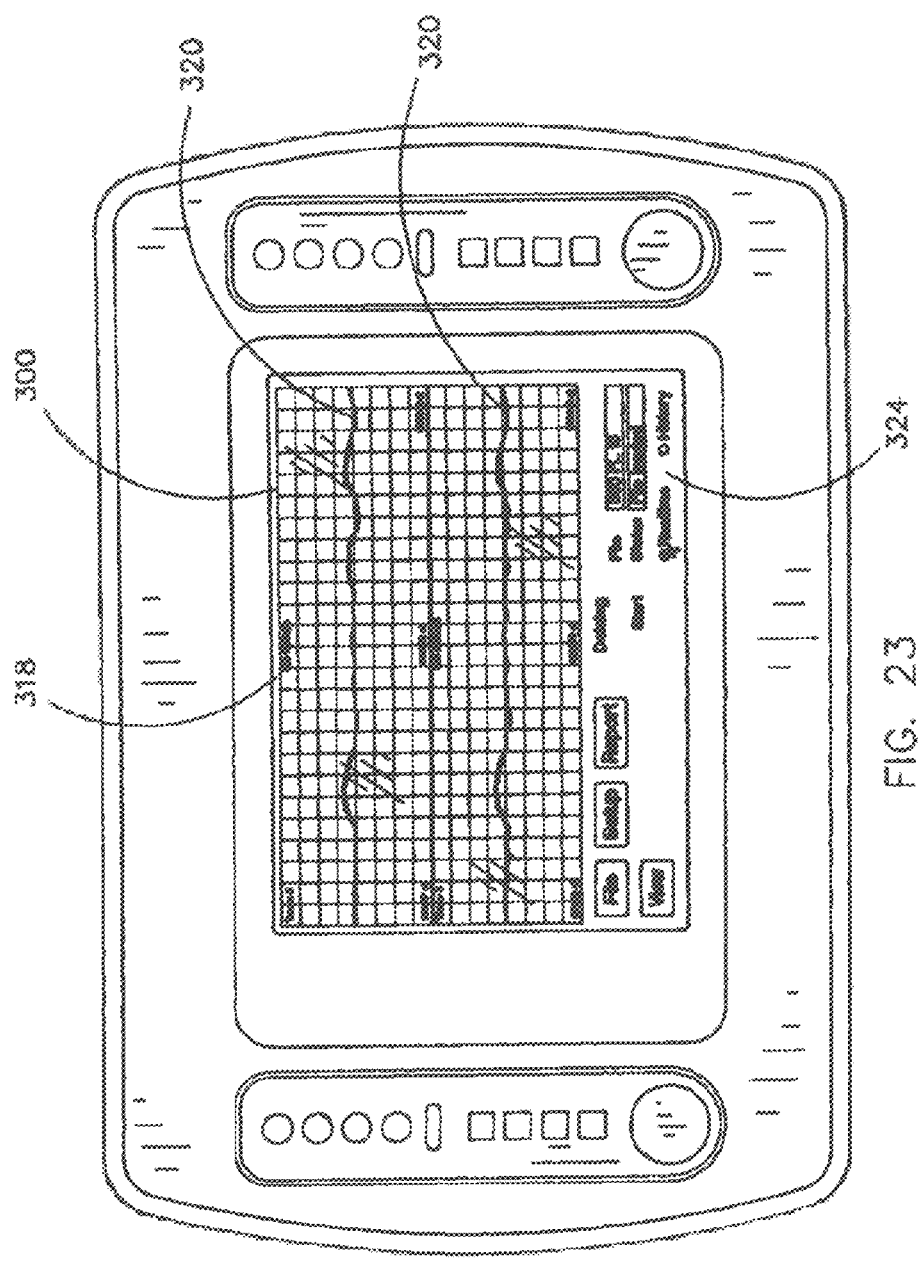
FIG. 23 illustrates two real time traces of a measured surface profile for the smoothness indicator graphical user interface shown in FIG. 21.
Figure 24:
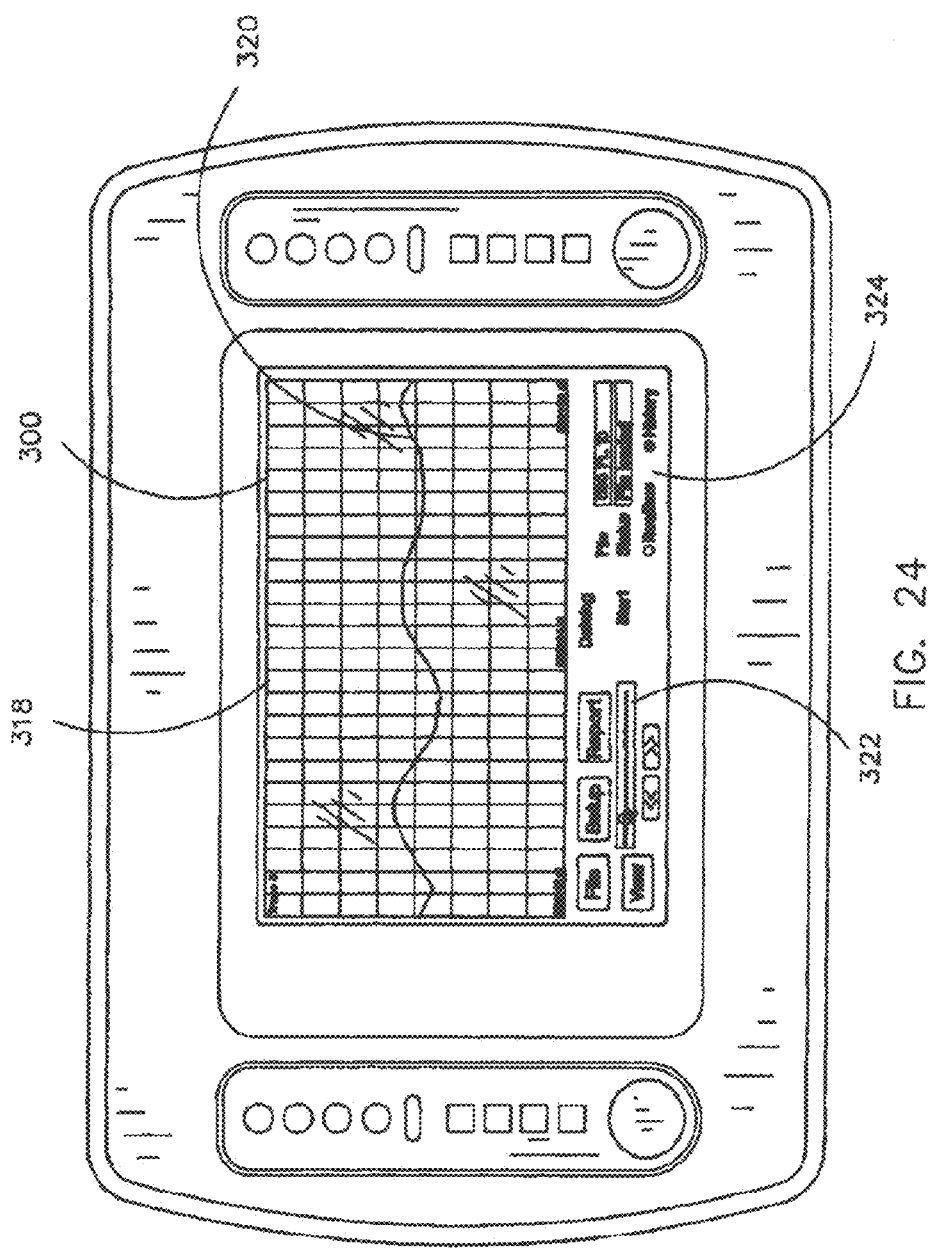
FIG. 24 illustrates a single trace of the measured surface profile for the smoothness indicator graphical user interface shown in FIG. 21, wherein a user of the smoothness indicator may view the single trace at a specified location.
Figure 25:
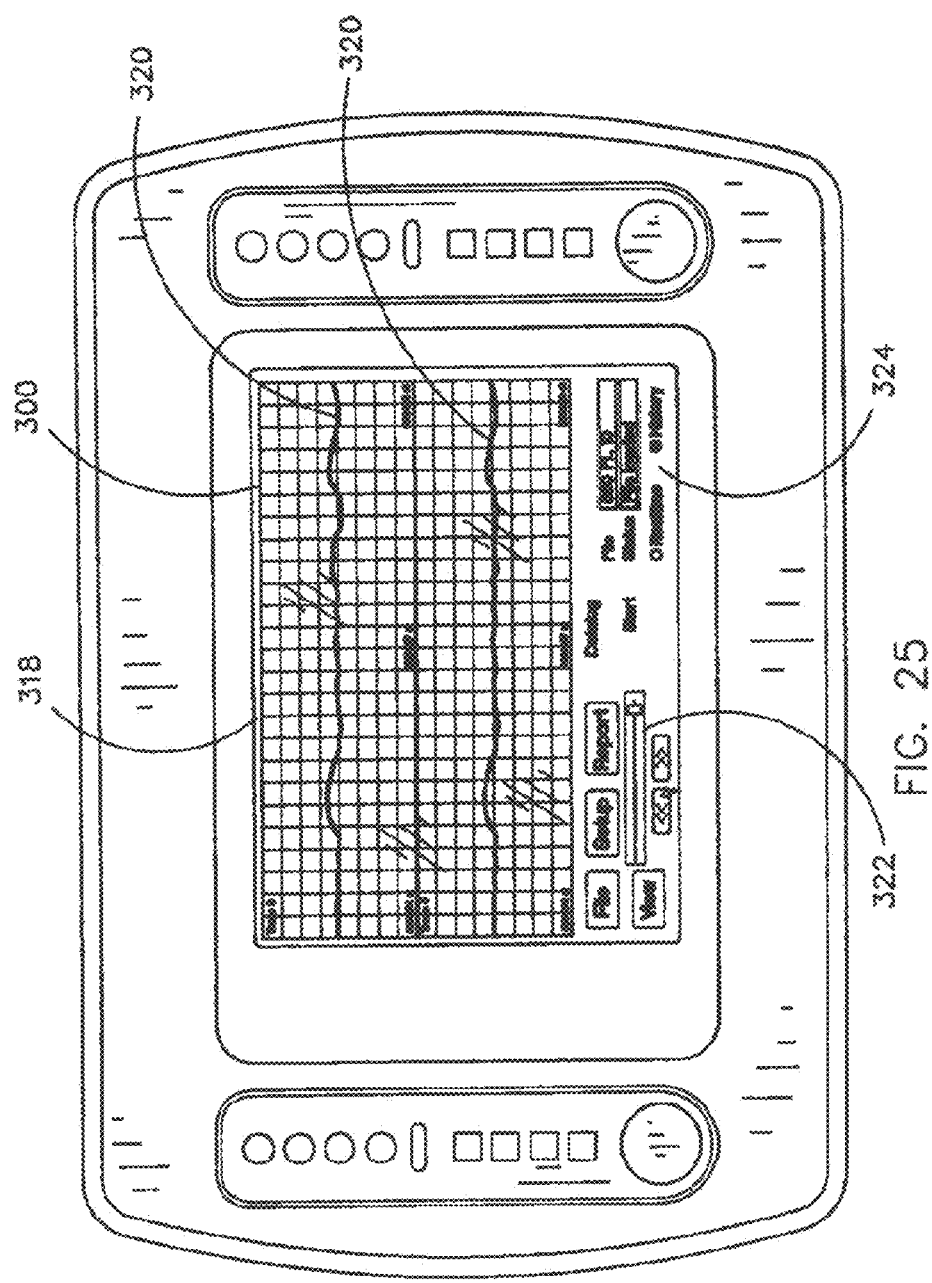
FIG. 25 illustrates two traces of the measured surface profile for the smoothness indicator graphical user interface shown in FIG. 21, wherein the user may view the traces at a specified location.

Referring to FIGS. 23 through 25, exemplary trace displays 318 are described. In embodiments, the trace displays 318 allow a user to dynamically view surface profile information from one or more elevation profiles. The trace displays 318 display surface profile data in graphical form such as by placing the data on a scale or the like. Indicators such as dashed lines may be superimposed on a trace 320, for indicating station markers relative to points on the trace 320. The trace displays 318 may include a slider bar 322, forward and reverse buttons, or similar functionality, for allowing an operator of the smoothness indicator 10 to observe surface profile data as desired. In this case, radio/selection buttons 324 are provided for selecting a real time display of a surface profile or allowing the operator to view the history of the surface profile. Other information such as a file name, a job description, or other identifying information may be included for identifying a surface profile. Two or more traces 320 may be displayed on the trace displays 318 at one time. For example, a first trace 320 may be located above a second trace 320 for comparison purposes. Alternatively, the first trace 320 may be superimposed in front of, or behind, the second trace 320. The traces 320 may be displayed in various formats without departing from the scope of the disclosure.

Figure 26:
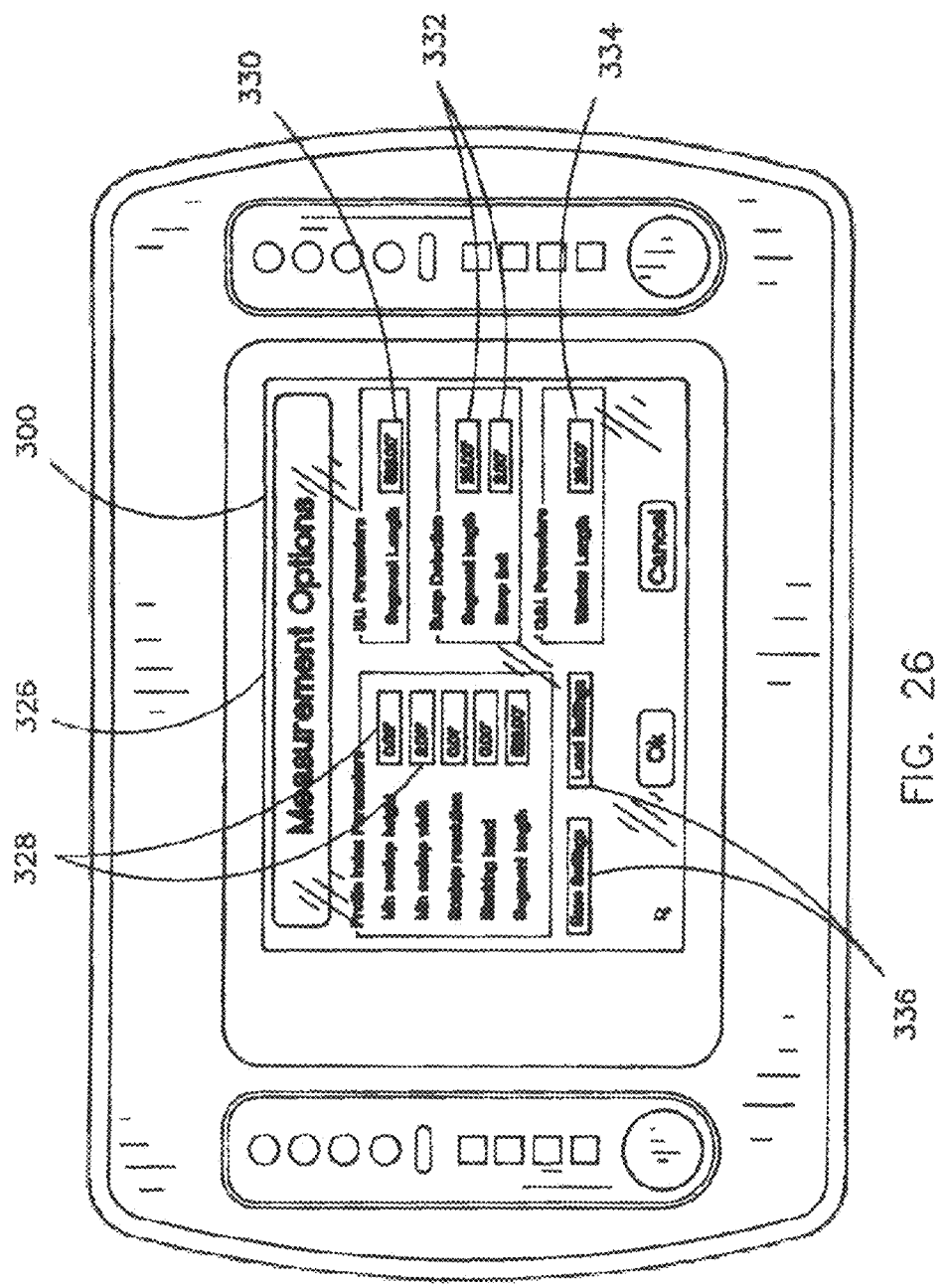
FIG. 26 illustrates a measurement options screen for the smoothness indicator graphical user interface shown in FIG. 21.

Referring now to FIG. 26, a measurement options screen 326 in accordance with an exemplary embodiment is described. The measurement options screen 326 includes text entry boxes 328 for entering Profile Index parameters, text entry boxes 330 for entering International Roughness Index parameters, text entry boxes 332 for entering bump detection parameters, and text entry box 334 for entering smoothness index parameters. The text boxes 328, 330, 332, and 334, may be used to enter relevant measurement information for calculating Profile Index data, International Roughness Index data, and smoothness index data. Additionally, these text boxes may be used for defining parameters for activating a bump alarm or another similar indication of a bump. Those of skill in the art will appreciate that various other parameters may be included on the measurement options screen 326 without departing from the scope and intent of embodiments. Load and save buttons 336 are also included for recording and/or recalling information entered in the text boxes 328, 330, 332, and 334.

Figure 27:
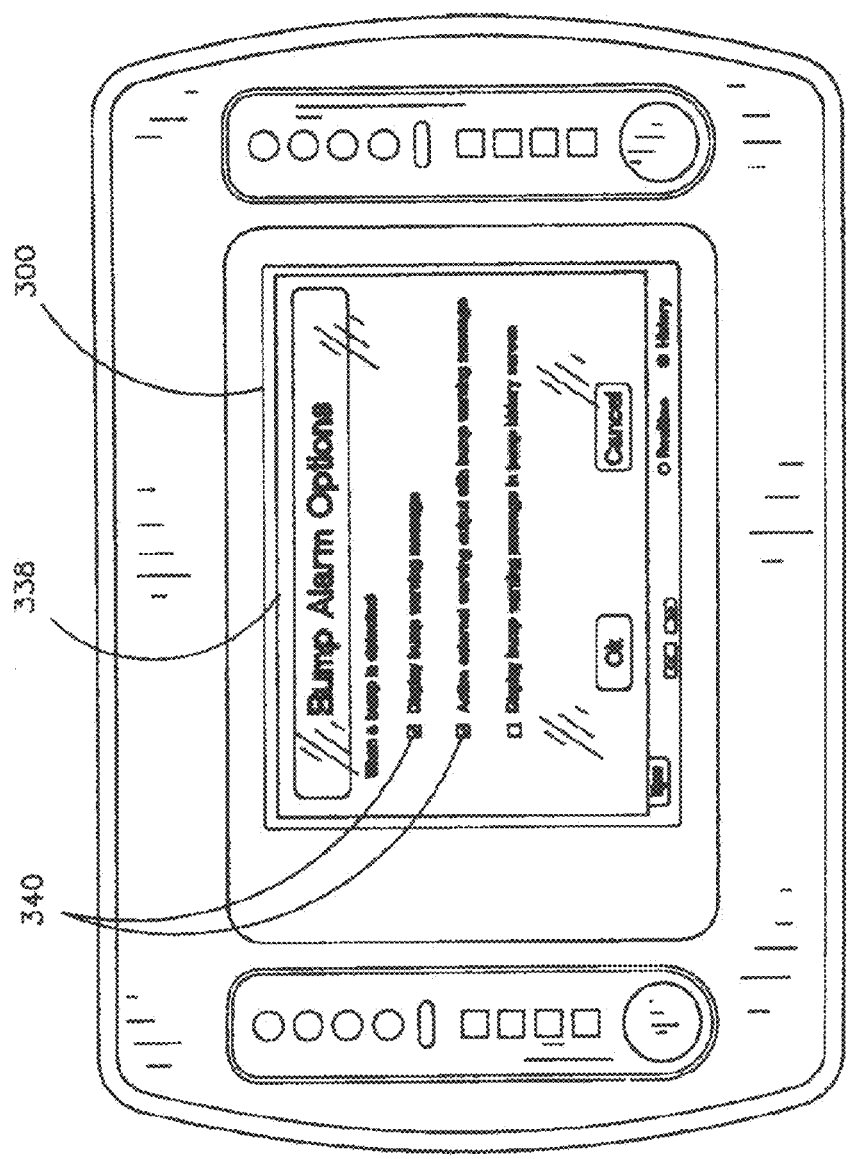
FIG. 27 illustrates a bump alarm options screen for the smoothness indicator graphical user interface shown in FIG. 21.

Referring to FIG. 27, a bump alarms options screen 338 is described in accordance with exemplary embodiments. Check boxes 340 are provided for allowing an operator of the smoothness indicator 10 to selectively determine the functionality of an alarm/series of alarms. Various options may be provided for different types of alarms. Additionally, options for controlling a marking (e.g. a visual cue such as a paint sprayer) may be included on the bump alarm options screen 338.

Figure 28:
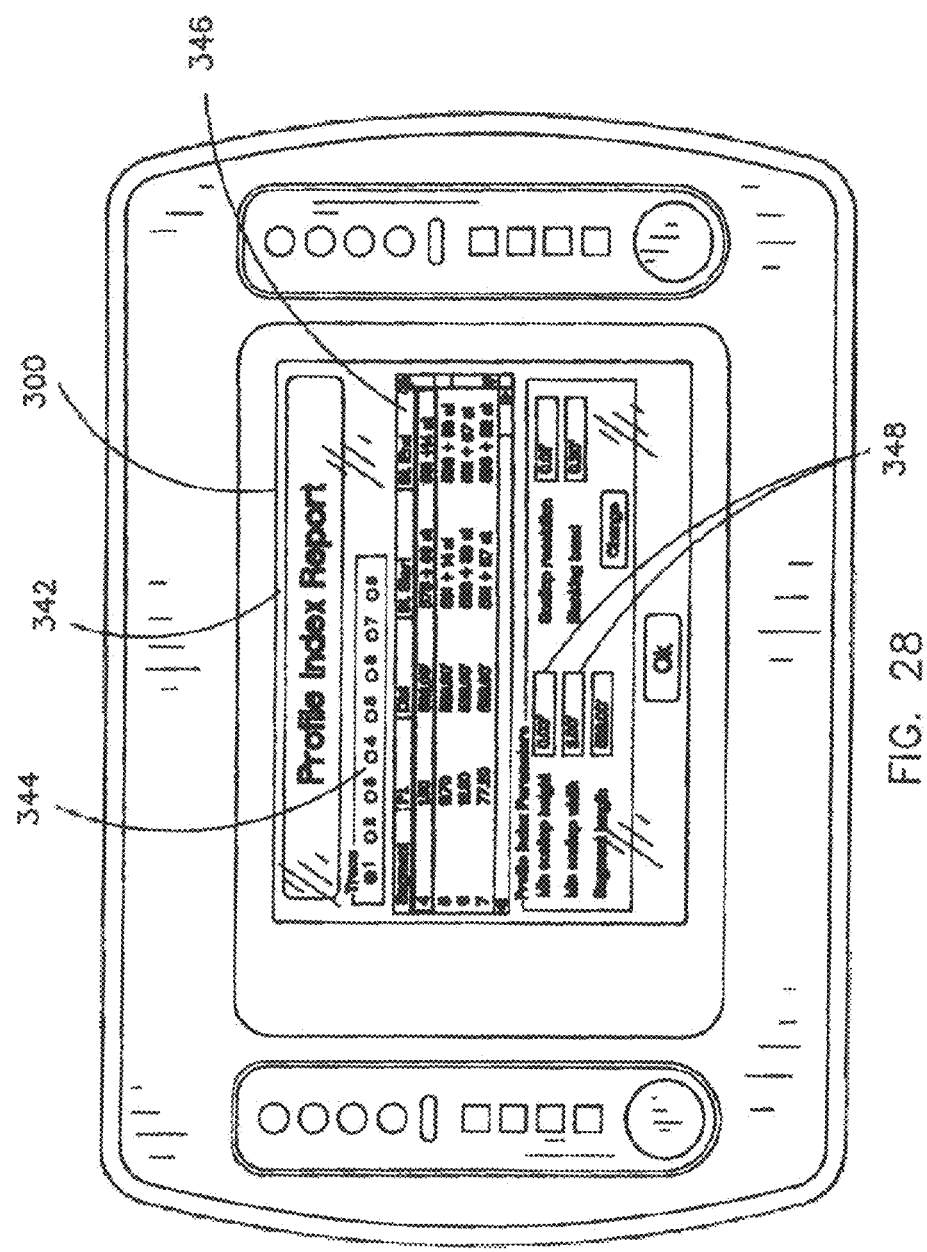
FIG. 28 illustrates a Profile Index report screen for the smoothness indicator graphical user interface shown in FIG. 21.

Referring now to FIG. 28, a Profile Index report screen 342 is described. The Profile Index report screen 342 includes radio/selection buttons 344 for allowing an operator of the smoothness indicator 10 to view Profile Index report information 346. The Profile Index report information 346 is calculated by the smoothness indicator 10, and displayed according to a radio/selection button 344 selected by the user. Additionally, text boxes 348 are included for entering parameters for calculating the Profile Index report information 346. These text boxes 348 may allow entry for information such as minimum scallop height, minimum scallop width, segment length, scallop resolution, blanking band, and the like. Those of ordinary skill in the art will appreciate that other various parameters for calculating the Profile Index report information 346 may be included without departing from the scope and intent of the disclosure.

Figure 29:
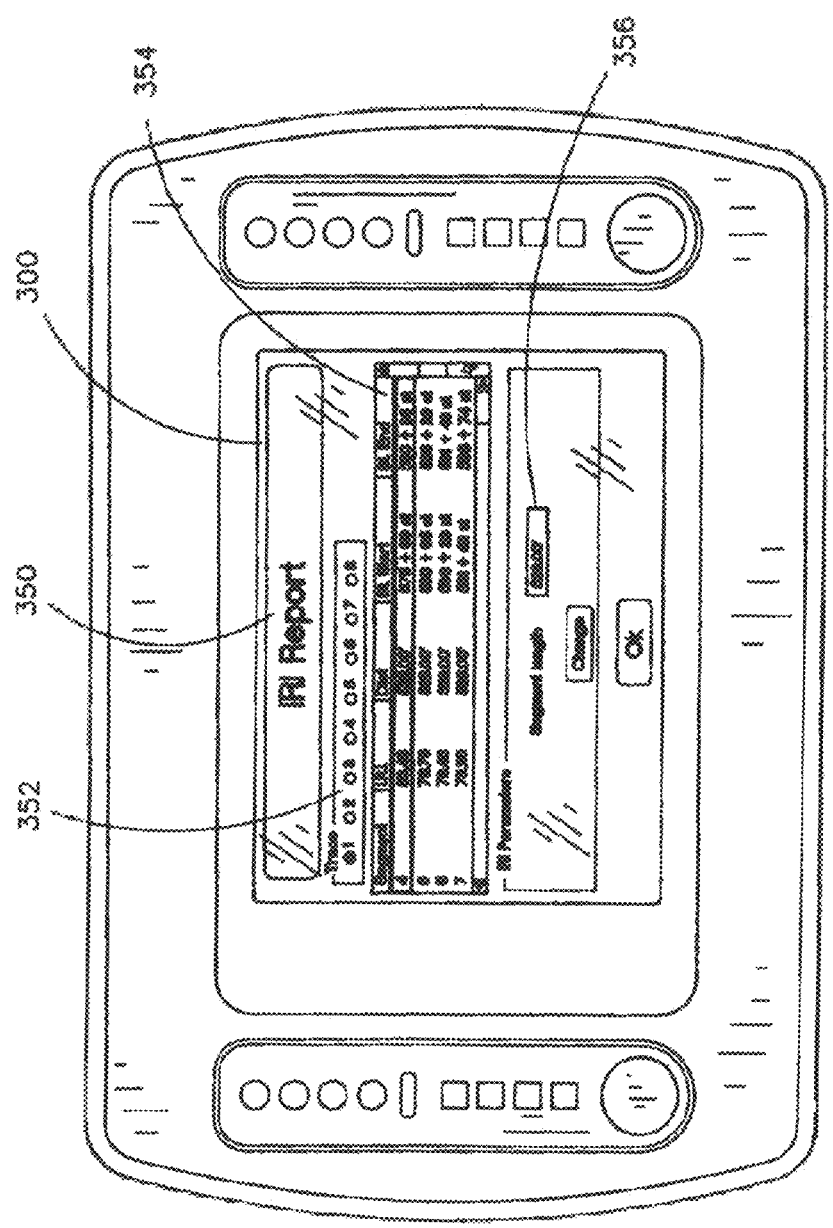
FIG. 29 illustrates an International Roughness Index report screen for the smoothness indicator graphical user interface shown in FIG. 21.

Referring now to FIG. 29, an International Roughness Index report screen 350 is described in accordance with exemplary embodiments. The International Roughness Index report screen 350 includes radio/selection buttons 352 for allowing an operator of the smoothness indicator 10 to view International Roughness Index report information 354. The International Roughness Index report information 354 is calculated by the smoothness indicator 10, and displayed according to a radio/selection button 352 selected by the user. Additionally, a text box 356 is included for entering parameters for calculating the International Roughness Index report information 354. The text box 356 may be provided along with other text boxes for entry of information such as segment length, and the like. Various parameters for calculating the International Roughness Index report information 354 may be included without departing from the scope and spirit of embodiments of the invention.

Figure 30:
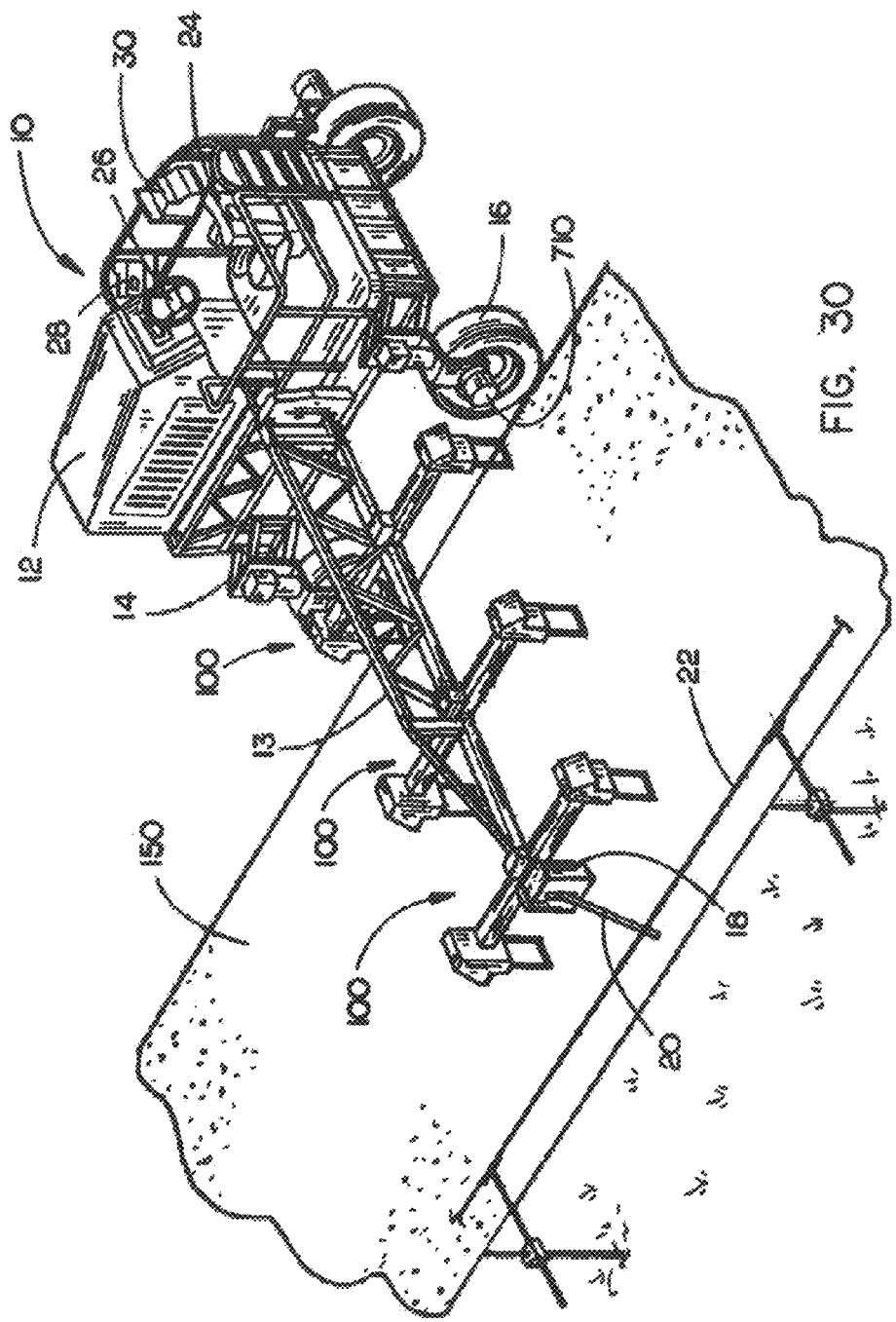
FIG. 30 is an isometric view illustrating a smoothness indicator including a bridge rig having a cantilevered arm in accordance with an exemplary embodiment.
Figure 31:
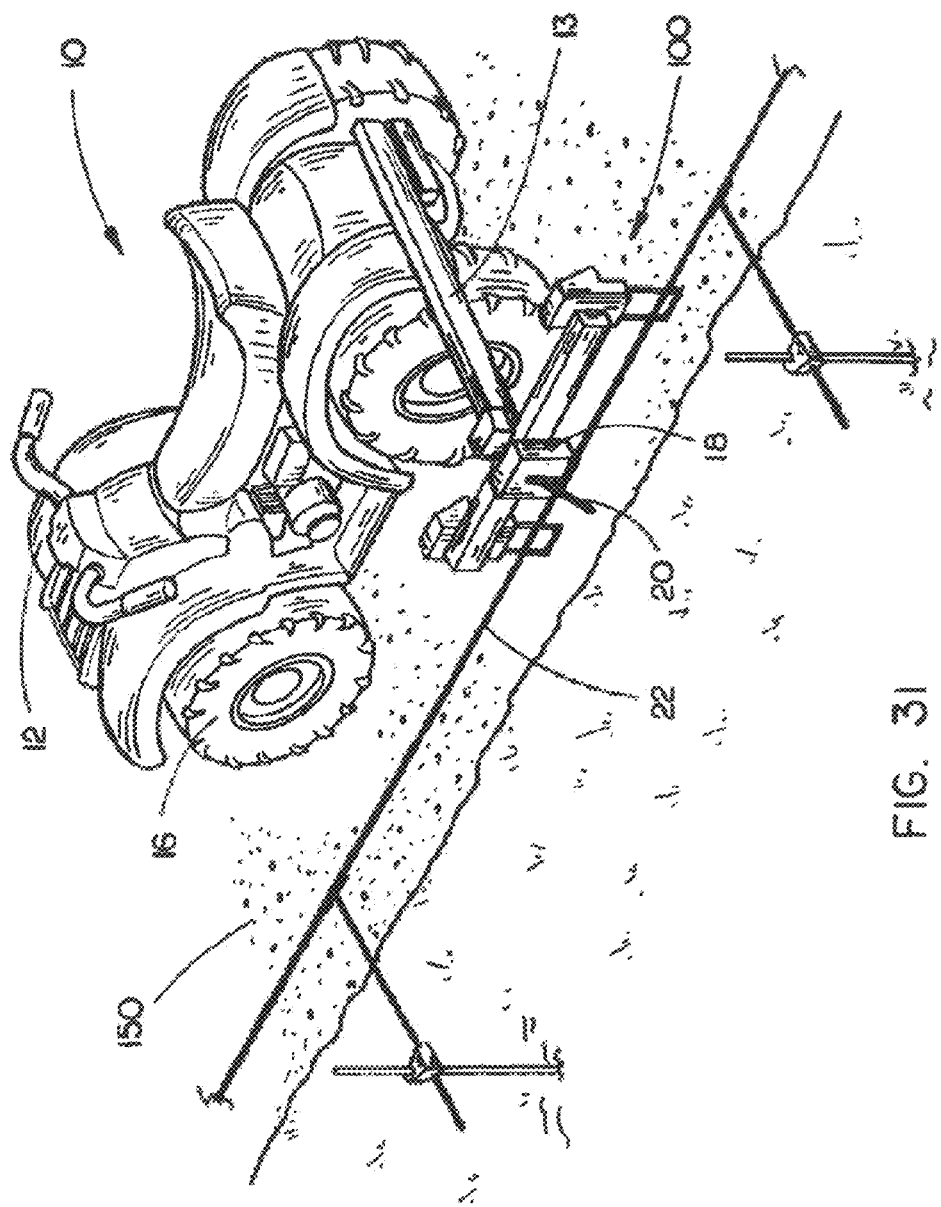
FIG. 31 is an isometric view illustrating a smoothness indicator including an all terrain vehicle (ATV) having a cantilevered arm in accordance with an exemplary embodiment.

Referring to FIGS. 30 and 31, a smoothness indicator 10 including one or more sensor assemblies 100, like the embodiments illustrated in FIGS. 1 through 7, is described in accordance with further exemplary embodiments. The smoothness indicator 10 includes a bridge rig 12 having a cantilevered arm 13. The cantilevered arm 13 may be extended over a surface 150 for profiling the surface. For instance, the cantilevered arm may be folded and/or stowed alongside the rig 12 for transport, and extended for profiling a surface. The sensor assemblies 100 are positioned for measuring locations upon the surface 150, such as where automobile tires may travel upon the surface. In a first embodiment, the sensor assemblies 100 may be manually positioned. Alternatively, a drive assembly may be utilized for automatically adjusting a sensor assembly 100 to a pre-selected position.

The smoothness indicator 10 may include a height adjustment assembly 14, such as an assembly including a hydraulic piston, a mechanical linkage, or the like, for adjusting the height of the smoothness indicator 10 and positioning a sensor assembly 100 a distance from the surface 150. This may be desirable for maintaining the sensor assembly in an optimal range while profiling the surface. In further embodiments, the smoothness indicator 10 transmits a command to the height adjustment assembly 14 to position a sensor assembly 100 at a specified distance from the surface 150.

The smoothness indicator 10 may include a travel distance sensor 710 connected to a wheel 16 of the smoothness indicator. The travel distance sensor 710 measures distances traveled by the wheel of the smoothness indicator to determine distances traveled by a sensor assembly 100. In embodiments, two or more travel distance sensors are included for determining distances over non-linear terrain, such as distances around a sweeping highway curve. In a further example, a distance measuring wheel may be included with the smoothness indicator 10 for determining distances traveled by a sensor assembly 100.

In further embodiments, the smoothness indicator 10 includes one or more contact sensors 18. A contact 20 is included for measuring a distance between the smoothness indicator 10 and a guide, such as a string line positioned for guiding a paver, or the like. For example, a contact sensor 18 may follow a string line 22 for automatically directing the smoothness indicator 10 when measuring a surface profile. The contact 20 follows the string line as the smoothness indicator advances over the surface 150. By analyzing movement of the contact 20, the smoothness indicator positions the smoothness indicator 10 for travel in a direction following the direction of the surface. In another embodiment, an elevation distance sensor assembly is utilized to guide the smoothness indicator by tracking a line, which may be rope or another type of line detectable by the elevation distance sensor.

A feedback and actuator assembly may be utilized to control the wheel 16 of the smoothness indicator 10. The feedback and actuator assembly may include a feedback sensor (such as a rotary potentiometer, or the like, for sensing an angle of the wheel 16), an actuator, and/or a control assembly, for guiding the angle of the wheel 16, controlling its rotational velocity, and/or directing another characteristic of the wheel's movement. The feedback and actuator assembly may be coupled with the contact sensor 18 (or the elevation distance sensor) for controlling the direction of travel of the smoothness indicator 10. Alternatively, the smoothness indicator and/or the wheel are controlled by a Local Positioning System (LPS) (e.g. a robotic total station), a Global Positioning System (GPS), or the like, for directing the smoothness indicator. In this manner, the smoothness indicator 10 may travel a predetermined course.

Referring now to FIG. 31, the surface 150 over which the cantilevered arm 13 is extended may comprise a subgrade. A sensor assembly 100 is positioned for measuring locations upon the subgrade, such as for determining the thickness of pavement to be constructed upon the subgrade. Thus, the smoothness indicator 10 may be utilized to check the subgrade. For example, the smoothness indicator may be correlated to a line detected by an elevation distance sensor for determining a percentage yield for a paving material such as concrete or asphalt. Alternatively, the contact sensor 18 may be used to compare the string line 22 to the subgrade. For instance, string line used by a paver for determining the thickness of a paved surface, such as a road surface, may be compared to the subgrade for determining pavement thickness at various locations and minimizing surface inconsistencies which reduce the percentage yield. In such a case, the contact sensor 18 may be replaced by an elevation distance sensor or the like as needed.

Referring generally to FIGS. 32 through 38, the smoothness indicator analysis system 320 for analyzing elevation information 330 collected and measured by a smoothness indicator 10 is described. The smoothness indicator analysis system 320 generates a comprehensive report and a graphic user interface display useful for planning pavement projects and maintaining the paved road.

Figure 32:
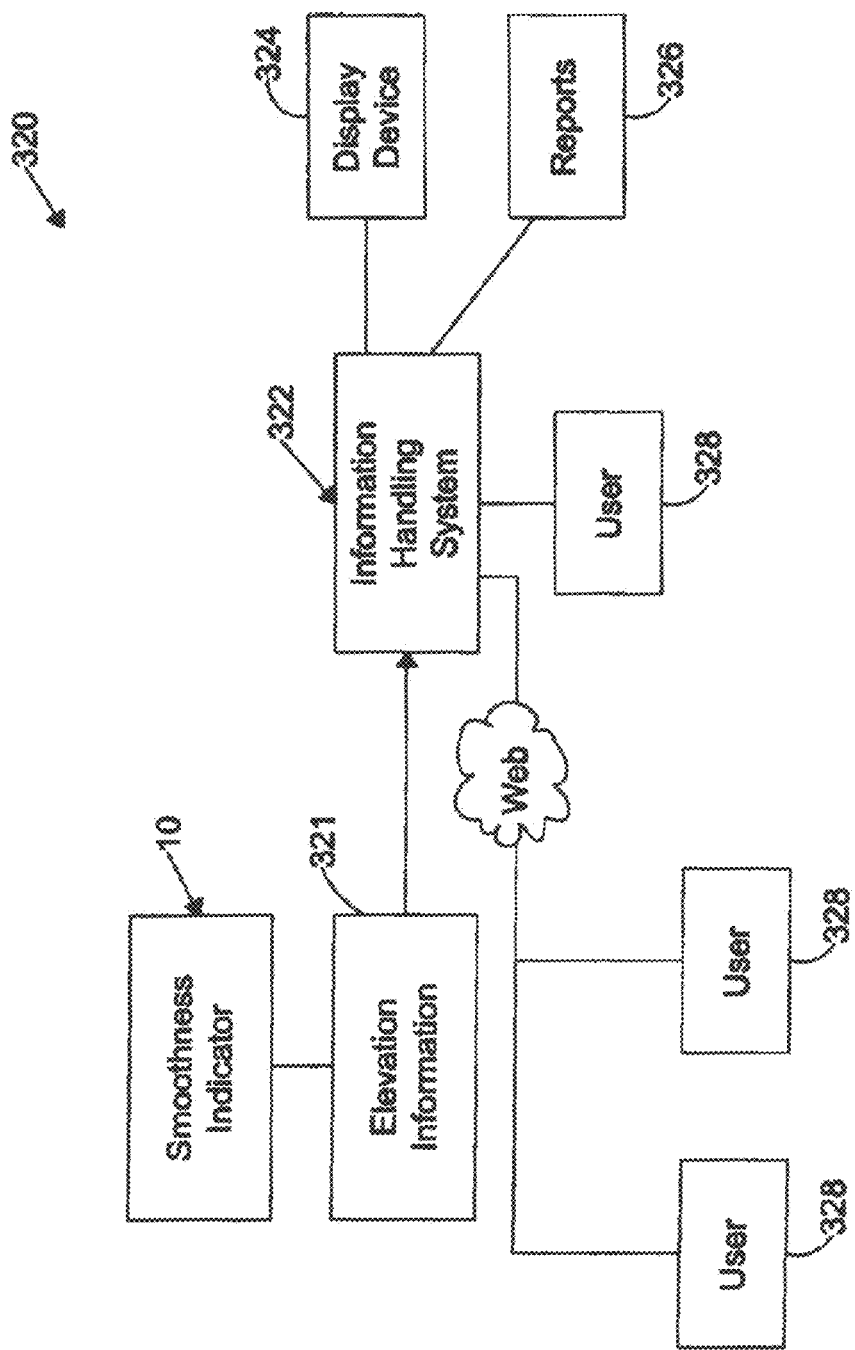
FIG. 32 is a block diagram of a smoothness indicator analysis system including a smoothness indicator and an information handling system in accordance with an exemplary embodiment.

Referring now to FIG. 32, the smoothness indicator analysis system includes information handling system 322 comprising display devices 324 and generating various reports 326. As discussed, the smoothness indicator 10 is configured to determine elevation information 321 such as a surface profile taken of the road surface 150, elevation measurements for the surface, string line elevation profile data, subgrade elevation profile data, or the like. The elevation information 321 regarding the road surface may be stored by the smoothness indicator 10, such as by a Random Access Memory (RAM), a Read-Only Memory (ROM), a magnetic diskette, and/or removable media, such as a floppy disk.

The information handling system 322 may be accessed through a network by various users 328. In an embodiment, the information handling system 322 may provide a web based graphic user interface for allowing users 328 to select user options and view analyzed results.

The elevation information 321 such as elevation measurement data may be utilized to determine a cut or fill surface area or other surface irregularities upon completion of the elevation profile. In one embodiment, the information handling system 322 may be communicatively connected to the smoothness indicator 10 through a network. As such, the information handling system 322 may receive the elevation information 321 from the smoothness indicator 10 via a wireless network connection (e.g. wireless fidelity (Wi-Fi) network connection or the like). Alternatively, the information handling system 322 may upload the elevation information directly from the memory of the smoothness indicator, such as RAM, ROM, or the like. In an alternative embodiment, the information handling system 322 may be a stand alone system which may not be communicatively coupled to the smoothness indictor 10. The information handling system 322 may upload the elevation information 321 from a magnetic diskette, removable media, or the like, which has been previously stored by the smoothness indicator.

Figure 33:
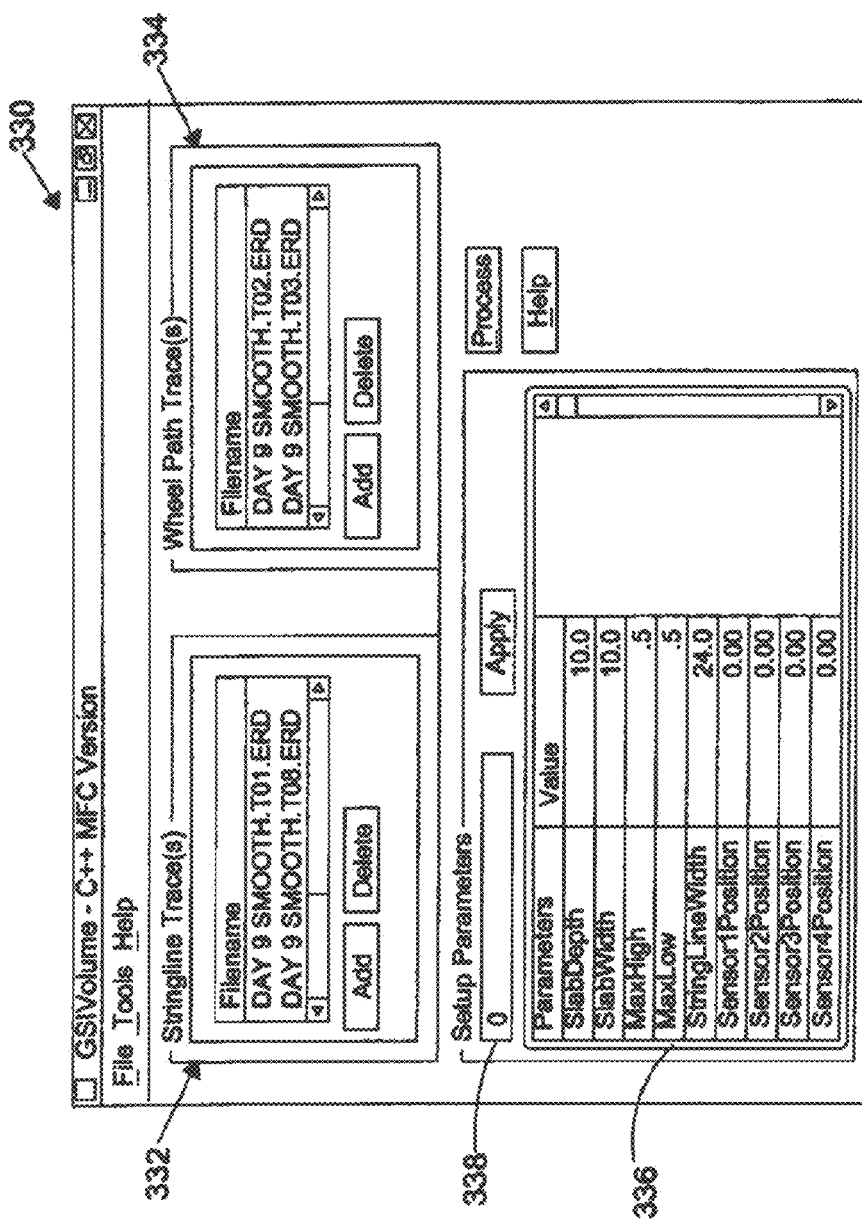
FIG. 33 is an illustration of a main graphic user interface of the information handling system shown in FIG. 32.

Referring now to FIG. 33, a main Graphic User Interface (GUI) 330 for the information handling system of an embodiment is described. In an embodiment, the main GUI 330 may display a list 332 of string line elevation profile data and a list 334 of subgrade elevation profile data. The user may be allowed to add or delete elevation profile data from the lists 332, 334 to execute a desired analysis. It is to be noted that elevation profile data for string lines and elevation profile data for each subgrade trace may be categorized by various factors such as a date/time, a geographic location, an individual smoothness indicator, or the like. For example, the user may add elevation profile data collected by a certain smoothness indicator during day 1 and day 2. Later, the user may delete the elevation profile data collected during day 1. The selected elevation profile data may be uploaded to the information handling system 322.

The main GUI 330 may allow a user to enter various input parameters 336, 338 to the information handing system. For example, dimensions such as length, width, and depth of a concrete slab may be entered. The concrete slab may be constructed upon a subgrade. These dimensions may be used to calculate a design volume (i.e., the theoretical volume of paving material needed to construct the slab) of an intended surface (i.e., an ideal pavement surface) which may be compared to an expected volume calculated from the elevation measurements for the subgrade and/or the string line to determine a predicted volume difference. In an alternative embodiment, overall average volume change may be estimated if elevation profiles from multiple sensor assemblies 100 are used. If the predicted volume differences or overall average volume change are to be excessive, the subgrade may be modified accordingly in order to reduce or eliminate the actual volume difference after paving, saving paving material and reducing the cost of the slab. Those of skill in the art will appreciate that other data may be calculated by comparing subgrade and/or string line elevation measurements without departing from the scope and intent of the disclosure.

The information handling system may compare elevation measurements for a subgrade against various reference elevation points. In one embodiment, three dimensional theoretical elevation data, such as GPS collected elevation data, may be utilized to determine an intended surface and thus, no string line is used as a reference elevation point. It is to be noted that it is well known to the art that the three dimensional theoretical elevation data is collected without any string lines. In an alternative embodiment, various reference elevation points such as string lines, road lines, and the like may be utilized to collect information to determine an intended surface of pavement. For example, when the smoothness indicator scans and generates elevation information, a user may choose the number of string lines for elevation profile measurements. Thus, two string lines, a single string line, no string lines, or the like may be used by the smoothness indicator to compare elevation measurements. Such comparison may be, for example, comparing elevation data points of an existing surface (e.g., a subgrade or a pavement surface, such as in a plastic state) to elevation data points of the existing surface to determine whether a relative elevation difference exists between the elevation data points of an existing surface and the elevation data points of the existing surface.

Generally, a string line may be utilized by a paver for determining the thickness of a paved surface to be constructed upon a subgrade. Thus, the information handling system may determine a percentage yield for a paving material such as concrete by comparing elevation measurements for the subgrade against elevation measurements for the string line. As such, the information handling system may analyze the elevation profile data to determine an amount of paving material required for a given portion of the road surface based on the user selections and the elevation data. It is further contemplated that the information handling system also estimates the pavement thickness of a given portion of the road surface. In this manner, the information handling system may provide various analyzed results useful for planning the pavement of the road surface. Preferably, surface inconsistencies, which can reduce the percentage yield of a paving material, may be identified.

Figure 34:
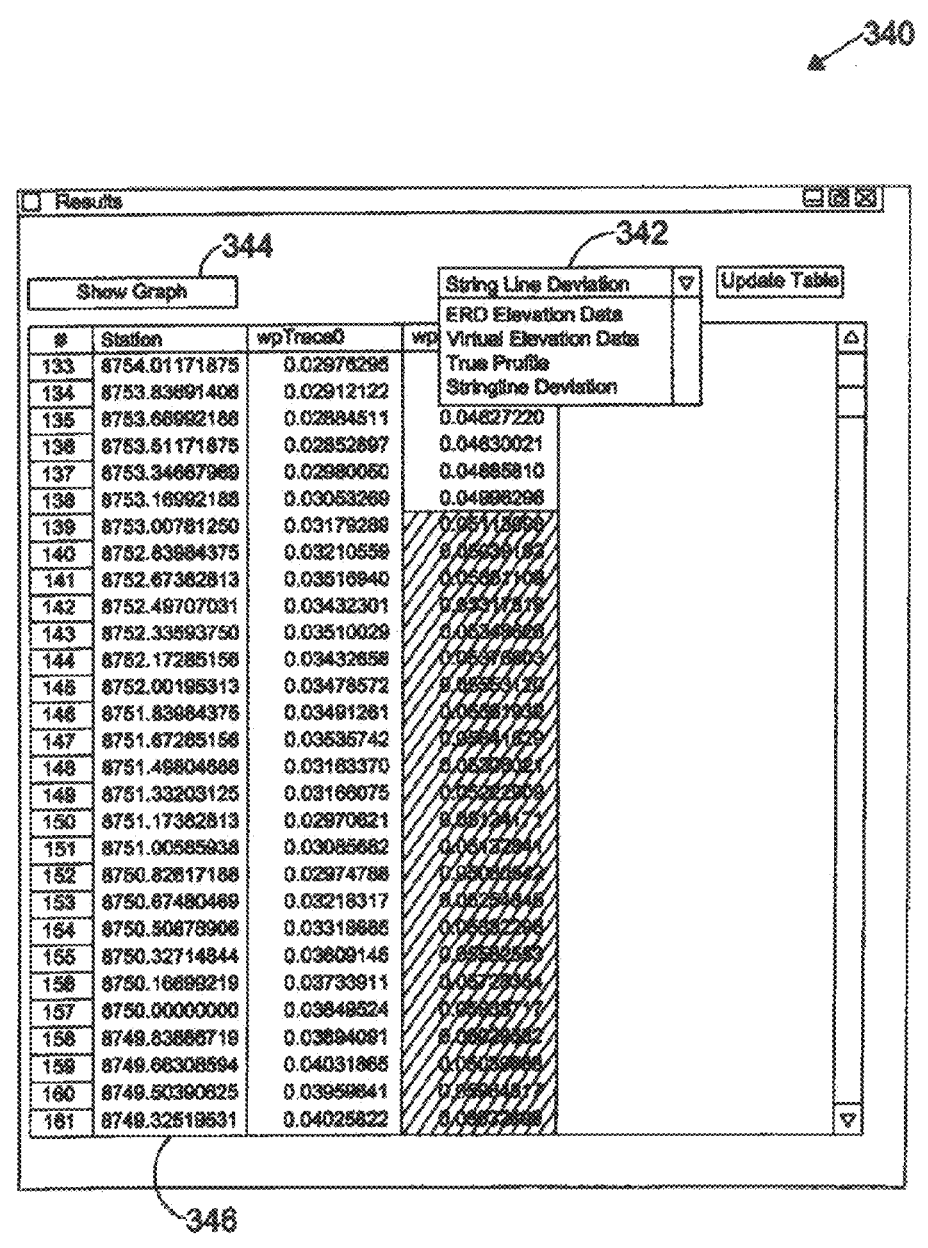

Referring now to FIG. 34, an exemplary report screen 340 for the main GUI 330 is shown. An elevation profile measured for the subgrade may be compared against an elevation profile measured for a string line. Alternatively, a profile of elevation difference measurements (elevation derivation) may be generated, such as by measuring elevation differences between a subgrade and a string line at various locations. In a still further embodiment, elevation measurements for either of the subgrade and the string line are compared against theoretical elevation measurements for the other of the subgrade and the string line. A user may have a choice to have various reports via a selection menu 342. The reports may include an Engineering Research Division (ERD) Elevation Data report, a Virtual elevation data report, a True profile report, a grade Cut/Fill report, or the like. It is to be noted that the ERD file format and ERD software are well known to the art. The ERD file format has been utilized to facilitate automated plotting of simulation data, experimentally measured data, and data from various analysis programs. Those of ordinary skill in the art will appreciate that the information handling system may generate various forms of reports based on its analysis. For each report, a corresponding graph image may be displayed when the user selects Show Graph menu 344 from the report screen 340.

Figure 35:
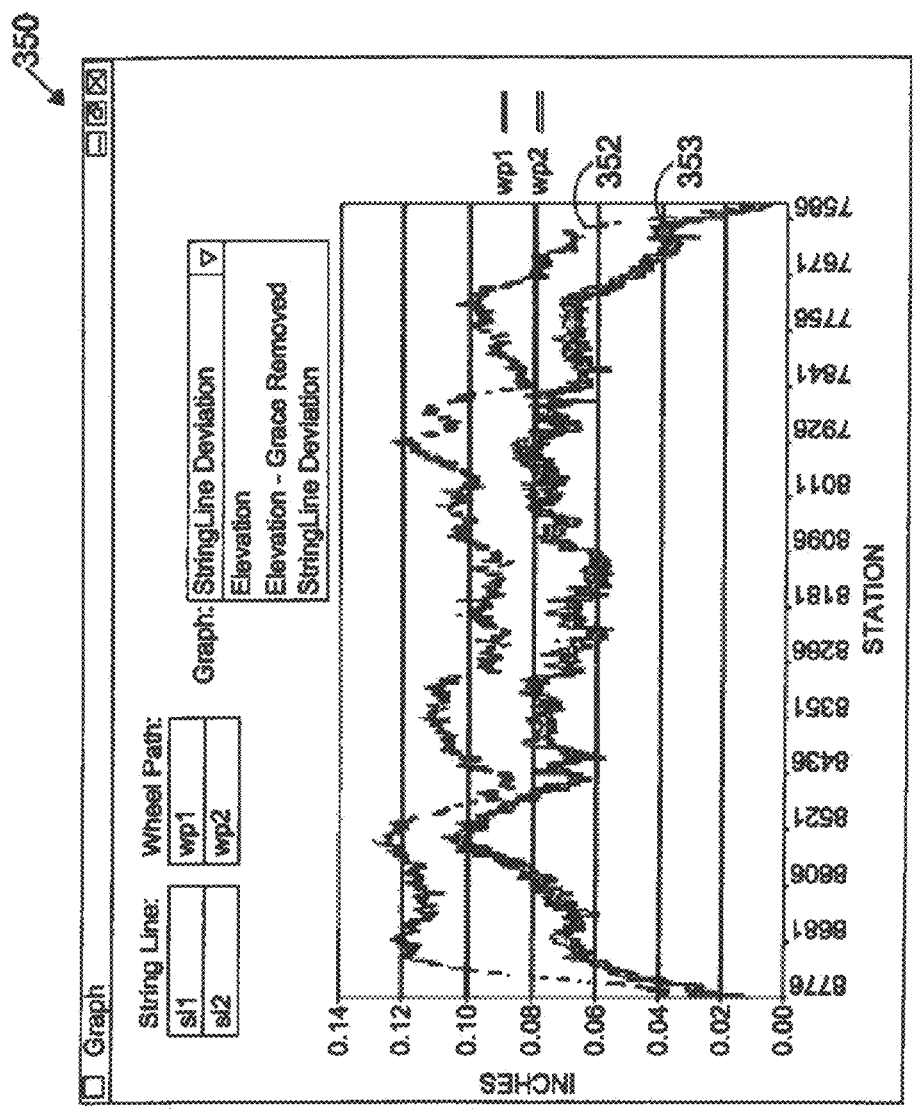
FIG. 35 illustrates an exemplary graph screen displaying two subgrade traces for the exemplary report screen shown in FIG. 34.

Referring now to FIG. 35, a graph screen 350 displaying two subgrade traces is shown. In an embodiment, the graph screen 350 may display the analyzed elevation information in graphical form such as by placing the data on a scale or the like. Preferably, elevation information of two or more subgrade traces may be displayed on the graph screen 350 at one time. For example, first trace elevation profile 352 may be located above second trace elevation profile 353 for comparison purposes. Additionally, the user may choose to view a graph of each trace's true profile (grade removed) data, or a graph of each trace's string line deviation, or the like.

In one embodiment, surface profile data measured by the smoothness indicator may be used for deriving information about a surface. The information handling system may analyze the surface profile data to aid users in finding subgrade to be cut or filled. For example, high areas may be a must-grind bump, a bump which must be reduced and/or eliminated from the surface (e.g. to meet construction specifications). Low area may be an area which must be filled. The information handling system may display a table showing such information to identify irregularity of the subgrade.

Figure 36:
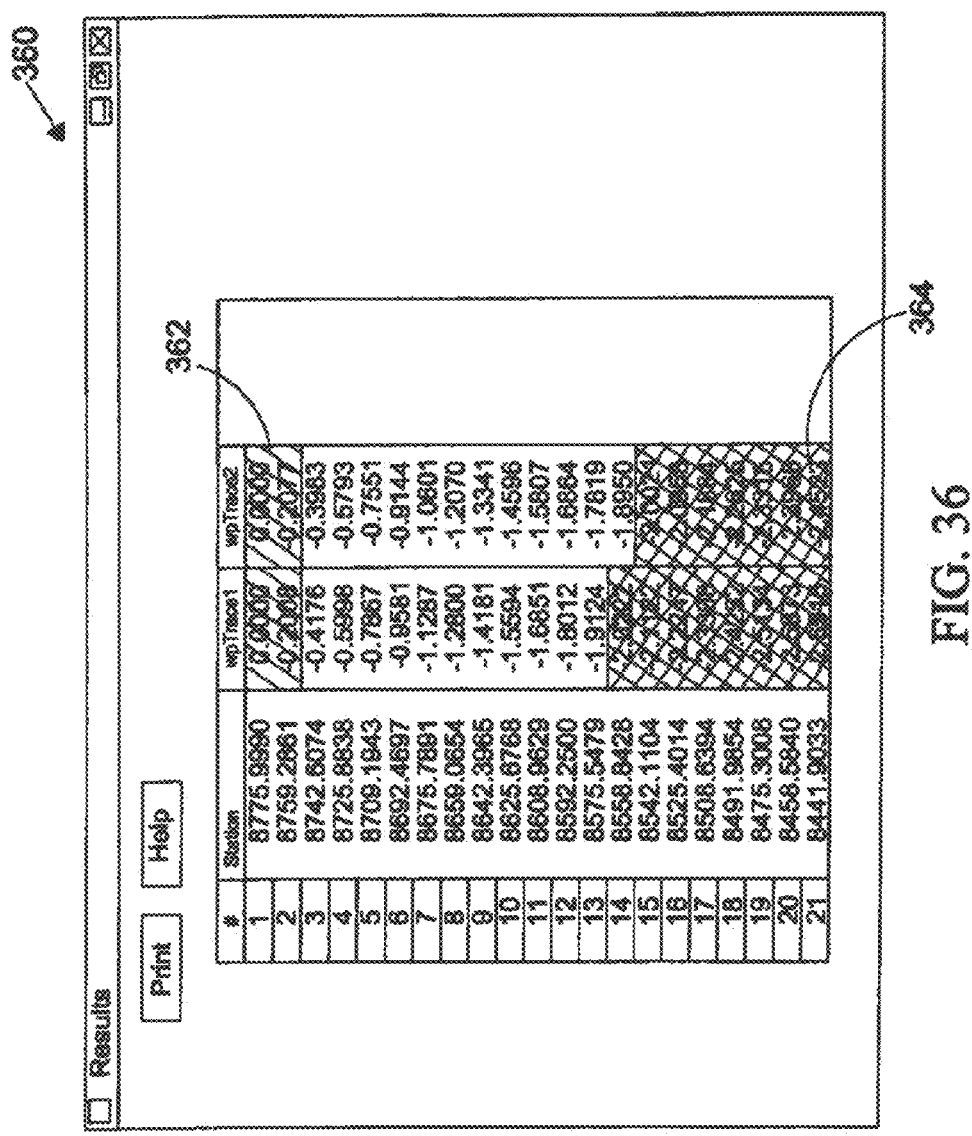
FIG. 36 illustrates another exemplary report screen having maximum high and maximum low values of required specifications for the main graphic user interface shown in FIG. 33.

Referring now to FIG. 36, a table screen 360 having maximum high and maximum low values for required specifications is shown. In a further embodiment, the main GUI 330 allows the user to set the maximum high and maximum low values and corresponding colors for the required specifications. In an embodiment, the maximum high and maximum low values are measured with respect to expected values, calculated utilizing information related to the expected grade of the surface to be paved. In other embodiments, the maximum high and maximum low values may be identified utilizing other information, including information about an actual subgrade and a theoretical subgrade or the like. For example, the user may select the upper limit to show in green for any specification which is −0.25 or higher. A user may select the lower limit to show in red for any specification which is −2.0 or below. In such a case, the table 360 may display the required specifications in different colors 362, 364 in order to help the user to recognize potential problems of the road surface. Alternatively, other graphical methods such as highlighting, flashing, shading, or the like may be utilized to display the required specifications.

It is noted that the surface profile data may be analyzed to provide various reports and displays in various formats. In one embodiment, surface profile measurements are utilized to produce index values such as Profile Index values and International Roughness Index values which are computed for set intervals, such as between station markers. Additionally, the user-defined interval may be centered on any point within the profile. The main GUI 330 may also allow the user to input a width of string lines, a maximum high and a maximum low of an irregularity of the subgrade, the number of subgrade traces used, or the like.

Figure 37:
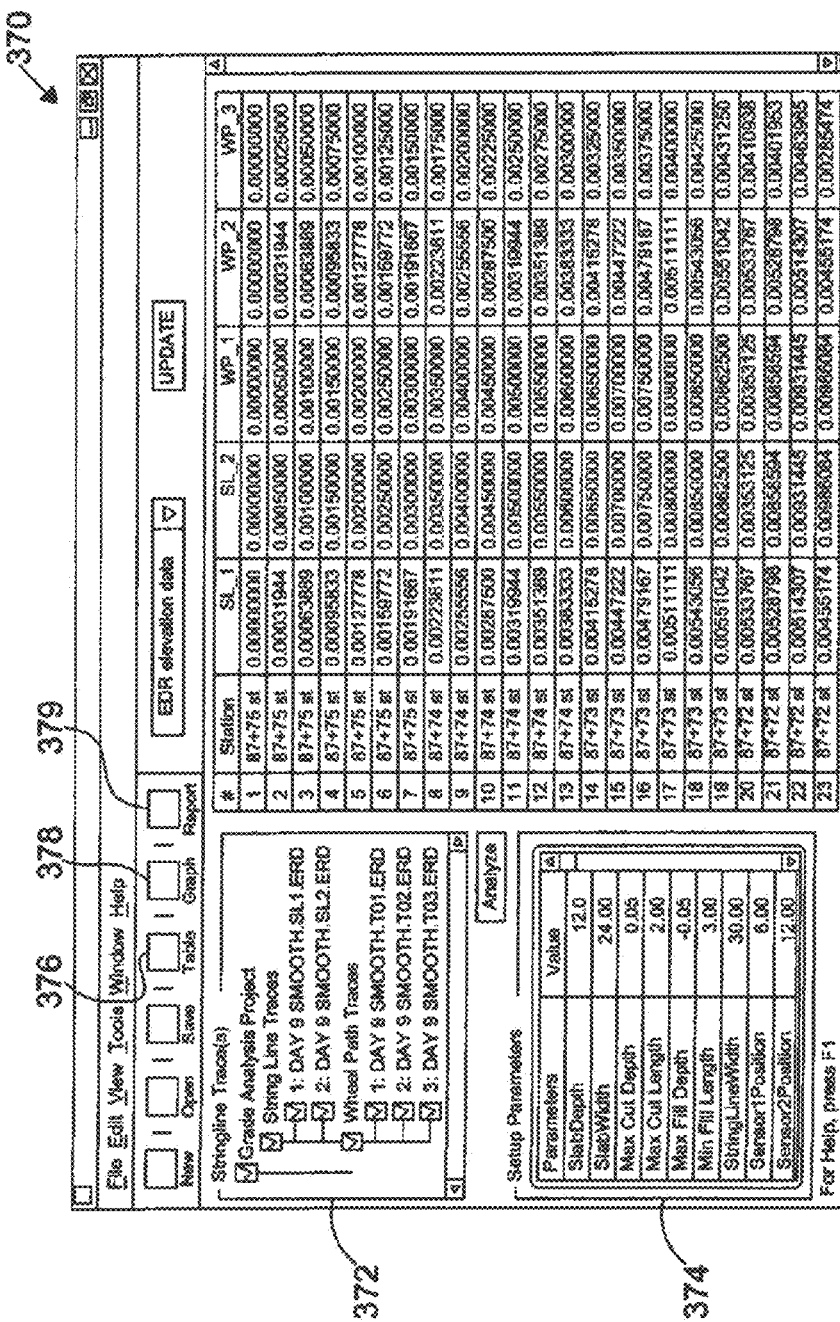
FIG. 37 is an illustration of a further example of a main graphic user interface of the information handling system shown in FIG. 32.
Figure 38:
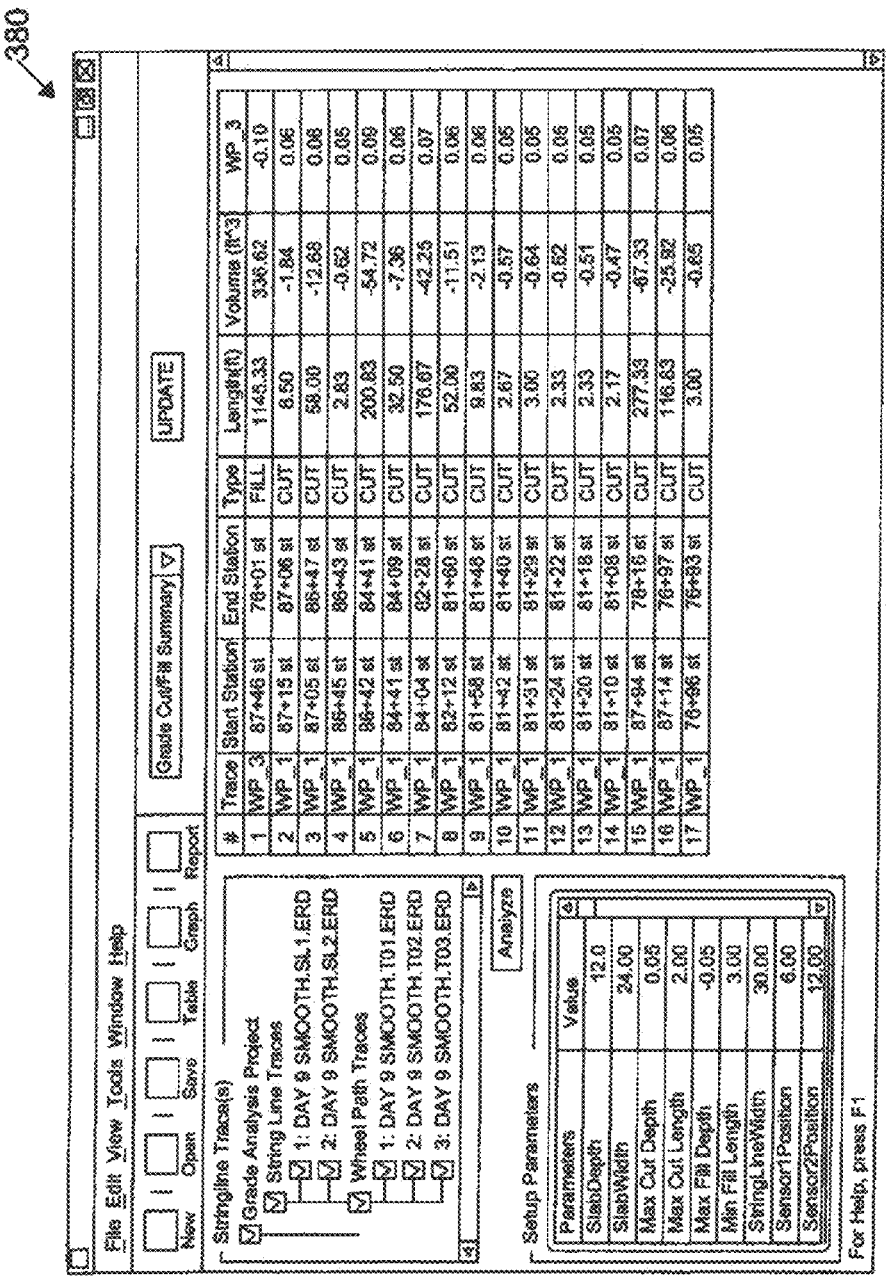
FIG. 38 illustrates an exemplary report screen for the main graphic user interface shown in FIG. 37.

Referring now to FIG. 37, another exemplary main Graphic User Interface (GUI) 370 for the information handling system of an embodiment is described. In an embodiment, the main GUI 370 may display a list of string line elevation profile data and a list of wheel path trace elevation profile data. The user may be allowed to add or delete elevation profile data from the lists to execute a desired analysis. The main GUI 370 may allow a user to enter various input parameters such as a slab definition, Grade Cut/Fill parameters, Sensor positions, Grade offsets, and the like. The user may select various views of the analyzed information. For example, the user may select a table view 376 to have an elevation data table view, a true profile data table view, a Grade cut/fill details table view, a Grade Cut/fill summary table view, and the like. Additionally, the user may choose to have a graph view 378 of elevation data, true profile, Grade cut/fill details or the like. When the user selects an analysis report 379 from the main graphic user interface, a comprehensive grade analysis report may be provided so that the user can print the comprehensive grade analysis report, transfer the comprehensive grade analysis report electronically (e.g. via an e-mail or the like), or view the comprehensive grade analysis report through the main GUI 370.

In a further embodiment, the information handling system may provide a simulated paver mold pan line. When the user chooses to use two string line traces for the smoothness indicator, the information handling system may create a line (a simulated paver mold pan line) to replicate what the paver mold will be located on a paved road. Advantageously, the simulated paver mold pan line may be utilized as a base line for pavement of a road.

Typically, two string lines are not exactly parallel with each other while the elevation information is collected by the smoothness indicator. Thus, in order to get accurate elevation information, it is important to have trace information regarding locations of the traces in reference to each string line. After finding the true elevation (grade removed) by the smoothness indicator, the information handling system may determine trace information regarding the locations of traces in reference to each string line or the simulated paver mold pan line.

$Y_p$, which is a slope between the first string line and the second string line at incremental point (j), is calculated as follows:

$$Y_p = \frac{(SL1(j) - SL0(j))}{Ws}$$

where SL0(j) is a height of the first string line at incremental point (j), SL1(j) is a height of the second string line at incremental point (j), and Ws is a width between the first string line and the second string line.

$Y_t$, which is the height of a sensor in reference to the first string line at incremental point (j), is calculated as follows:

$$Y_t = Y_p * \text{SensorPosition} + SL0(j)$$

Tr1(j), the actual deviation of a second trace at incremental point (j), is calculated for the deviation of a wheel path as follows:

$$Tr1(j) = -1 * (Y_t - WP(j))$$

where WP(j) is a wheel path at incremental point (j).

If the start point and/or the end point has an inaccurate grade cut, the profile value is calculated as follows:

$$\text{ProfileValue} = WP(j) - ((j * WP.\text{avgSlope}) + (\text{OffsetSlopeDiff} * (n\text{data}-1) - j) + (\text{EndOffsetSlopeDiff} * j))$$

where WP.avgSlope is an average slope of the Wheel Path, OffsetSlopeDiff is an offset of the start point, and EndOffsetSlopeDiff is an offset of the end point. Ndata is a total number of data points taken by the smoothness indicator. After the value of ProfileValue is calculated, the information handling system may compare the actual deviation of the first trace to the first string line to determine the deviation from the simulated paver mold pan line. In this manner, trace information regarding locations of the traces in reference to each string line or a simulated paver mold pan line may be determined.

Tr0(j), the actual deviation of a first trace at incremental point (j), is calculated as follows:

$$Tr0(j) = (Y_p) * (Wtr0(j)) + S0(j)$$

where Wtr0(j) is a width of the first trace to the first string line at incremental point (j) and S0(j) is a raw value for the first string line at incremental point (j).

If an offset for the first trace is needed to correct for an inaccurate grade cut at the beginning of a job, Tr0(j) is calculated as follows:

$$Tr0(j) = j * (\text{Echg}/\text{Range}) + (\text{Offset}/\text{Range}) * (\text{Range} - j)$$

where (j) is an incremental point at which elevation data was taken, Offset is the offset value for the first trace, Range is a range of incremental points, and Echg is an elevation change increment value. After the value of Tr0(j) is calculated, the information handling system may compare the actual deviation of the first trace at incremental point (j) to S0(j) to determine the deviation from the simulated paver mold pan line. In this manner, trace information regarding locations of the traces in reference to each string line or a simulated paver mold pan line may be determined.

It is contemplated that the information handling system, communicatively coupled to a smoothness indicator, may simulate the paver mold pan line to the theoretic pave pan movement while the surface of the road is being paved.

It is further contemplated that the information handling system, communicatively coupled to a smoothness indicator, may provide a real time pavement thickness which will aid users to calculate elevation changes of the sub-grade, sub-base, or the like as it may be before paving (either seconds, hours, or days before paving) or at anytime during the pavement process. Additionally, the information handling system may aid users in calculating the elevation changes for the final surface of the pavement. Further, the information handling system may place a distance stamp on each elevation value.

In an embodiment, first profile information may be gathered by a first smoothness indicator in front of the paver and second profile information may be gathered by a second smoothness indicator right behind the paver. The first profile information and the second profile information may be uploaded by the information handling system in a real time manner. Preferably, the information handling system may be communicatively coupled to the smoothness indicators via conventional wireless network connections such as a WI-FI connection, or the like. It should be noted that the wireless network communication can be implemented in various ways. Further, it is also to be noted that additional information may be needed by the information handling system to determine the real-time thickness. The information system may mesh the first and the second profile information together to see the real-time thickness. The first and the second profile information may be overlaid in graphical form such as by placing the data on a scale, or the like, to show the elevation difference at a given portion of the surface. In this manner, the user may be able to have real-time assessment and analysis of the pavement thickness.

In a further embodiment, the information handling system may be useful for a user for inspecting pavement of the road. Typically, a DOT inspector may have to lay on the back of the paver and use a dip stick in random places to check thickness to determine whether the thickness is within specification or not. Embodiments may aid the user, such as a DOT inspector, by allowing for time thinness information, releasing the user from tedious and time consuming inspection.

Figure 39:
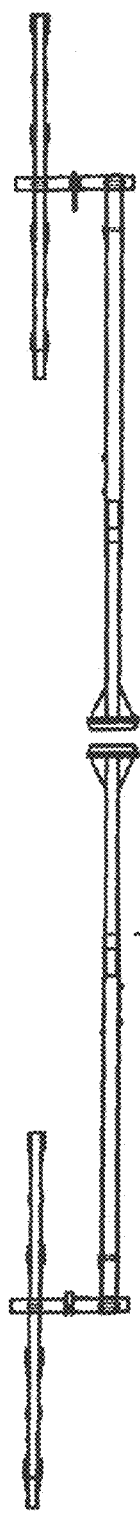
FIG. 39 is a top plan view illustrating a telescoping averaging ski assembly.
Figure 40:
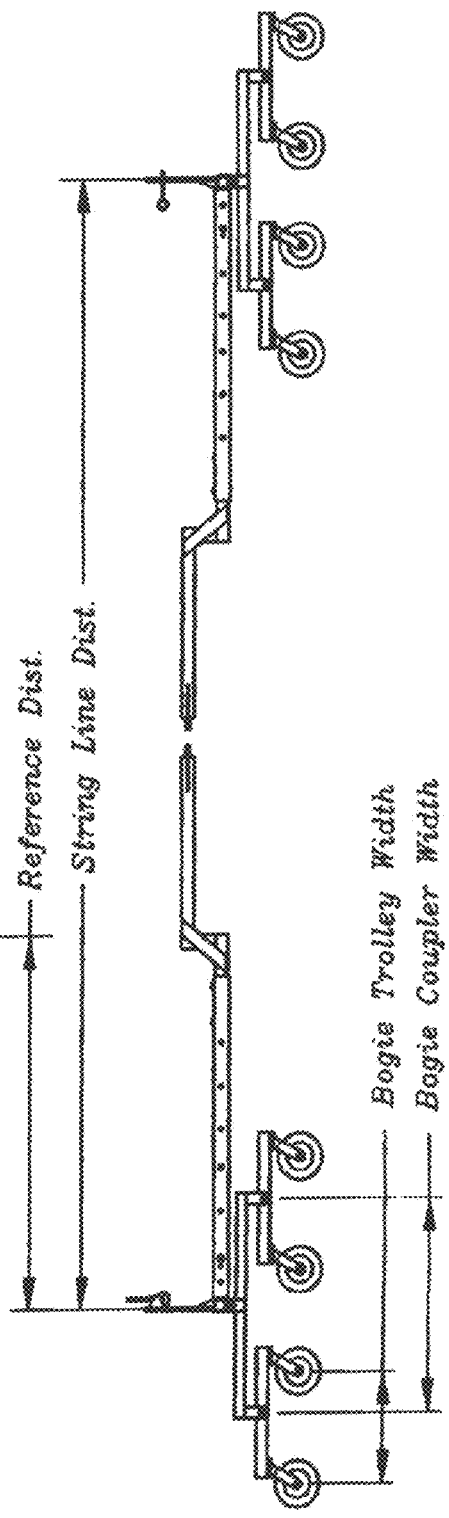
FIG. 40 is a side elevation view of the telescoping averaging ski assembly illustrated in FIG. 39, further illustrating dimensions for simulating a rolling string line reference trace, in accordance with another exemplary embodiment.

Referring now to FIGS. 39 and 40, for the following analysis, let S equal an array of values measured by an elevation distance sensor, such as the first non-contact elevation distance sensor 110, the second non-contact elevation distance sensor 115, an ultrasonic sensor, a laser sensor, or the like. If an individual value, $S_i$, of array S is out of error tolerance, then that value may be replaced with another value interpolated as follows:

$$S_i = \left( \frac{|S_x \cdot \text{Station} - S_i \cdot \text{Station}|}{|S_x \cdot \text{Station} - S_y \cdot \text{Station}|} * (S_y - S_x) \right) + S_x$$

where S is the array of values measured by the elevation distance sensor, i is the current index of S, x is the index of the previous good value of S, and y is the index of the next good value of S.

The average of a group of values taken before and after an individual value, $S_i$, of array S is calculated as follows:

$$S_i = \left( \left( \sum_{j=i-1}^{i-AvgLen} S_j \right) + \left( \sum_{j=i+1}^{i+AvgLen} S_j \right) \right)_{avg}$$

where S is the array of values measured by the elevation distance sensor, i is the current index of S, and AvgLen is the number of values before and after i to average.

An individual value, $S_i$, of array S may be "zeroed" (i.e., adjusted with reference to an initial point or origin) as follows:

$$S_i = (S_i - S_0)$$

where S is the array of values measured by the elevation distance sensor, i is the current index of S, and $S_0$ is a value representing an initial point or origin.

A value for simulating a rolling string line reference trace (e.g., a value representing a theoretical measurement taken by the telescoping averaging ski assembly illustrated in FIGS. 39 and 40) may be calculated as follows:

$$S_i = \frac{(S_{f1} + S_{f2} + S_{f3} + S_{f4})_{avg} - (S_{b1} + S_{b2} + S_{b3} + S_{b4})_{avg}}{\text{StringLineDist}} *$$
$$(\text{StringLineDist} - \text{ReferenceDist}) + (S_{b1} + S_{b2} + S_{b3} + S_{b4})_{avg}$$

where S is the array of values measured by the elevation distance sensor; i is the current index of S; and b1, b2, b3, b4, f1, f2, f3, and f4 are indices selected from S. Indices b1, b2, b3, b4, f1, f2, f3, and f4 are calculated as follows:

$$b1 = i - \frac{\text{feetBeforeAvg} * 12.0}{2.0}$$

$$b2 = b1 + \frac{\text{BogieTrolleyWidth}}{2.0}$$

$$b3 = i - \frac{\text{feetToBackWheel3} * 12.0}{2.0}$$

$$b4 = b3 + \frac{\text{BogieTrolleyWidth}}{2.0}$$

$$f1 = i + \frac{\text{feetToFrontWheel1} * 12.0}{2.0}$$

$$f2 = f1 + \frac{\text{BogieTrolleyWidth}}{2.0}$$

$$f3 = i + \frac{\text{feetToFrontWheel3} * 12.0}{2.0}$$

$$f4 = f3 + \frac{\text{BogieTrolleyWidth}}{2.0}$$

where feetBeforeAvg, feetToBackWheel3, feetToFrontWheel1, and feetToFrontWheel3 are calculated as follows:

feetBeforeAvg=StringLineDist−ReferenceDist+(BogieCouplerWidth/2.0/12.0)+(BogieTrolleyWidth/2.0/12.0)

feetToBackWheel3=StringLineDist−ReferenceDist−(BogieCouplerWidth/2.0/12.0)+(BogieTrolleyWidth/2.0/12.0)

feetToFrontWheel1=ReferenceDist−(BogieCouplerWidth/2.0/12.0)−(BogieTrolleyWidth/2.0/12.0)

feetToFrontWheel3=ReferenceDist+(BogieCouplerWidth/2.0/12.0)−(BogieTrolleyWidth/2.0/12.0)

An individual value, $S_i$, of array S may be interpolated for station line up as follows:

$$S_i = \left( \frac{|S_x \cdot \text{Station} - R_i \cdot \text{Station}|}{|S_x \cdot \text{Station} - S_y \cdot \text{Station}|} * (S_y - S_x) \right) + S_x$$

where S is the array of values measured by the elevation distance sensor, i is the current index of S, R is an array of reference trace values, x is the starting index where $S_x$.Station≤$R_i$.Station, and y is the ending index where $S_y$.Station≥$R_i$.Station.

Let D equal an array of values representing individual deviations of elements of array S from a reference line. An individual value, $D_j$, of array D may be calculated as follows:

$$D_j = \left( \left( \frac{R1_j - R0_j}{\text{reflineWidth}} * SP_i + RO_j \right) - S_j \right) + O_i$$

where S is the array of values measured by the elevation distance sensor, i is the trace index of S, j is the current index of D, R0 is a first reference trace, R1 is a second reference trace, SP is a sensor position, O is an array of sensor elevation offsets, and reflineWidth is the distance between reference traces R0 and R1.

The volume V of a slab may be calculated as follows:

$$V = \left( \left( \sum_{i=0}^{n} len * \left( SP_0 - \frac{\text{reflineWidth} - \text{slabWidth}}{2} \right) \right) *$$

-continued $$(WP[0]_i + WP[0]_{i+1} + WP[0]_i + WP[0]_{i+1})_{avg} * -1 \Bigg) +$$

$$\left( \sum_{i=0}^{n} \left( \sum_{j=0}^{t-1} len*(SP_{j+1} - SP_j) * \right. \right.$$

$$(WP[j]_i + WP[j]_{i+1} + WP[j+1]_i + WP[j+1]_{i+1})_{avg} * -1 \bigg) \bigg) +$$

$$\left( \sum_{i=0}^{n} len * \left( feglineWidth - SP_{t-1} - \frac{reflineWidth - slabWidth}{2} \right) * \right.$$

$$(WP[t-1]_i + WP[t-1]_{i+1} + WP[t-1]_i + WP[t-1]_{i+1})_{avg} * -1 \bigg) \bigg)$$

where len is the distance between trace points, reflineWidth is the distance between reference traces, slabWidth is the width of the slab, t is the number of traces, SP is an array of sensor positions, and WP is an array of sensor path traces.

Stringless paving systems according to embodiments of the invention may utilize 3-D models of the terrain where a road will be built coupled with a paving profile to determine the position and orientation of each machine in a paving train. In the context of the present disclosure, "paving train" should be understood to include both a sequence of machines operating contemporaneously; and also machines operating in a batch mode wherein one or more of the same type of machine may operate contemporaneously, with additional types of machines operating in separate batch processes, but all of the machines controlled by a unified control system having unified design profile data and topographical profile data. Surveyors may use specialized surveying instruments and techniques to produce a 3-D model of the terrain where a road will be built. Civil engineers may design a profile for the road based on the desired characteristics and projected traffic on the road. The design profile may include the thickness of the road, aggregate size, aggregate density and surface texturing.

In at least one embodiment, a system may produce a design profile based on desired design characteristics, available materials and a topographical profile. For a given topographical profile, a computer system may apply design characteristics to the topographical profile to determine a necessary subgrade. Furthermore, the computer system may determine a paving material from a list of available paving materials to accomplish the design characteristics such as road thickness, ride quality and maximum load.

Figure 41:
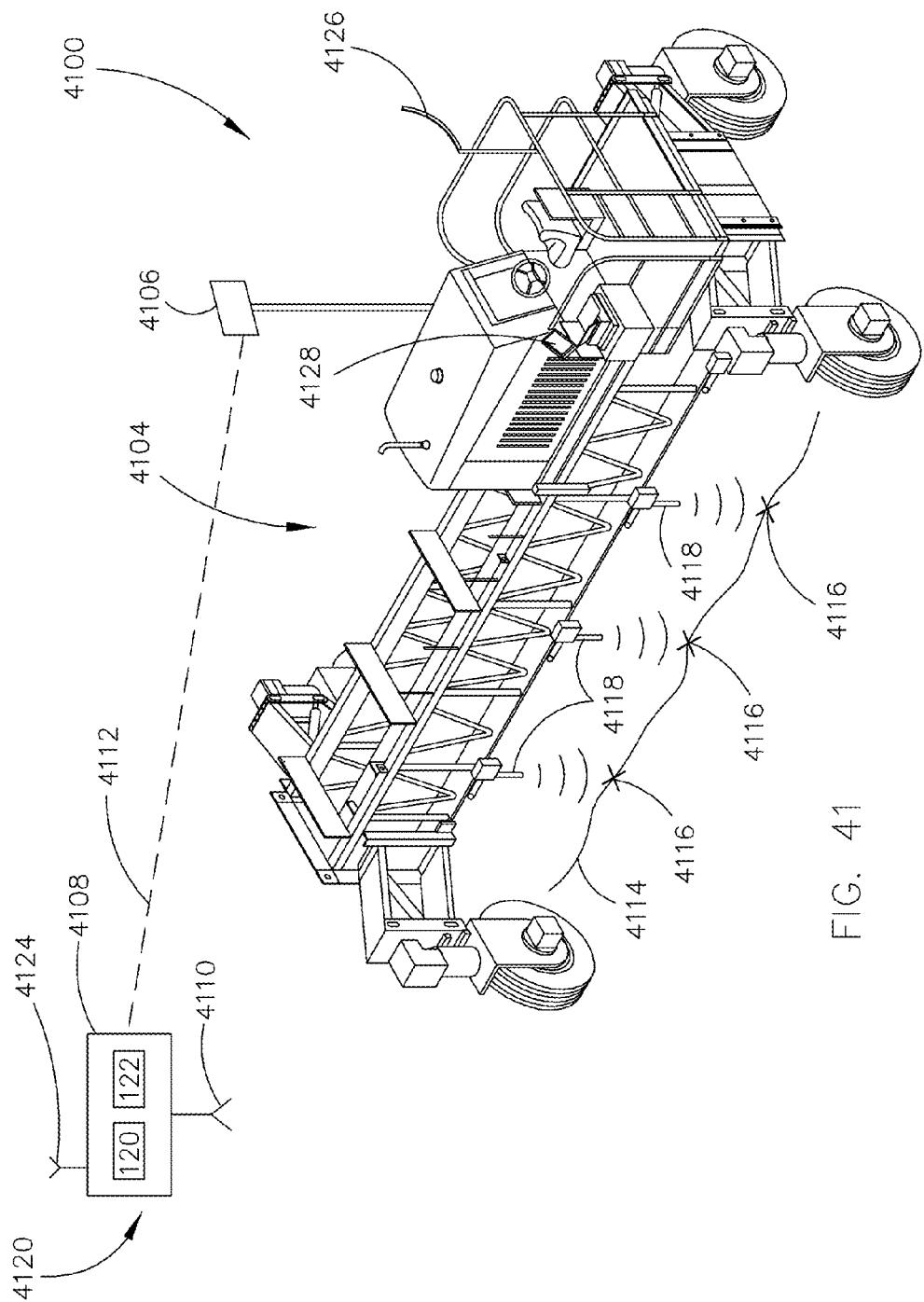
FIG. 41 shows a schematic diagram of a surface data measurement system including a position measurement station and a surface measurement apparatus.

Referring now to FIG. 41, a schematic diagram of a surface data measurement system 4100 is shown. Such systems 4100 generally include a position measurement station 4102 and a surface measurement apparatus 4104. The position measurement station 4102 includes a known/pre-determined location and may be configured to measure a position of a reference point 4106 such as a laser mast on the surface measurement apparatus 4104 relative to the position measurement station 4102. The known/predetermined location of the position measurement station 4102 may be acquired via current absolute positioning techniques, such as via Global Positioning System (GPS) data, survey data, and the like, or other suitable positioning techniques. In one implementation, the position measurement station 4102 is a total station (i.e., a location position system) which utilizes a robotic tracking head 4108 mounted on a stationary base 4110. The robotic tracking head 4108 sends a laser 4112 to the reference point 4106 (e.g., target) on the surface measurement apparatus 4104 which is positioned on and/or traveling over a surface 4114 on which surface data is to be acquired. The robotic tracking head 4108 may track movement of the surface measurement apparatus 4104 along surface 4114 so as to gather a plurality of positions of the reference point 4106 of the surface measurement apparatus 4104 over time as the surface measurement apparatus 4104 travels. The reference point 4106 may be a prism or other device to reflect at least a portion of the laser 4112 in order for the robotic tracking head 4108 to measure the position of the reference point 4106 of the surface measurement apparatus 4104. While an implementation of system 4100 has been described having a position measurement station 4102 incorporating a laser 4112, robotic tracking head 4108, and prism, it is contemplated that position measurement station 4102 may include other devices suitable for measuring a position of reference point 4106 and/or the surface measurement apparatus 4104, including, but not limited to, a camera and target, GPS receivers, laser masts, sonic sensors, and/or other world coordinate sensor combinations.

The surface measurement apparatus 4104 is generally configured to measure elevation/distance/position of a plurality of points 4116 on the surface 4114 from a plurality of sensors 4118 positioned on the surface measurement apparatus 4104. In one implementation, the sensors 4118 are non-contact sonic sensors positioned above the surface 4114. However, it is contemplated that the sensors 4118 may be any sensor (e.g., contact or non-contact) sufficient to measure an elevation/distance/position between the sensors 4118 and the points 4116 on the surface 4114. Such sensors may include, for example, sonic sensors, laser sensors, cameras, and the like. An exemplary surface measurement apparatus 104 may be disclosed in U.S. Pat. No. 7,044,680, entitled "Method and apparatus for calculating and using the profile of a surface," which is incorporated in its entirety.

Each sensor of the plurality of sensors 4118 is positioned at a known distance/position from the reference point 4106 on the surface measurement apparatus 4104, such that the reference point 4106 has a known/pre-determined relative position difference (e.g., a 3-D position offset) from each sensor of the plurality of sensors 4118. Thus, when a measurement is taken from a particular sensor, the distance/position difference between the point 4116 on the surface 4114 and the reference point 4106 may be calculated by using the known distance/position difference between the sensor 4118 and the reference point 4106 and by using the measured elevation/distance/position between the sensor 4118 and the point 4116. In a particular implementation, the position of the plurality of sensors 4118 may be adjusted to be nearer or farther from the surface 4114, with the adjusted position being recorded so as to preserve a known distance/position difference between the reference point 4106 and the sensor 4118. An absolute position (e.g., real world coordinate (RWC)) may be determined for each point 4116 via the calculated distance/position difference between the point 4116 and the reference point 4106 and the measured position of the reference point 4106 of the surface measurement apparatus 4104 (e.g., measured by the position measurement station 4102, as described above). For instance, a processing unit (e.g., computer processor) on the surface measurement apparatus, on the position measurement station 4102, or at a site remote from the system 4100 may perform the absolute position calculations.

The position measurement station 4102 may include one or more of a memory 4120 and a communications interface 4122 for storing or transmitting, respectively, the measured position of the reference point 4106 of the surface measurement apparatus 4104. In one implementation, the communications interface 4122 interfaces with a transmitter 4124 for transmitting the measured position to a receiver 126 on the surface measurement apparatus 4104. In a particular implementation, the position measurement station 4102 calculates a distance between the position measurement station 4102 and the reference point 4106 on the surface measurement apparatus 4104 based on the measured position of the reference point 4106 and the known location of the position measurement station 4102. The position measurement station 4102 may then transmit via the transmitter 4124 the calculated distance and/or the measured position to the receiver 4126 on the surface measurement apparatus 4104.

The surface measurement apparatus 4104 may include a display 4128 to display data, including, but not limited to, the measured position of the reference point 4106 of the surface measurement apparatus 4104, the distance between the sensors 4118 and the reference point 4106, the measured distance between the sensors 4118 and the points 4116 on the surface 4114, and the determined absolute position for each point 4116. The display 4128 may advantageously provide on-site data to personnel working with the position measurement station 4102 and the surface measurement apparatus 4104.

Figure 42:
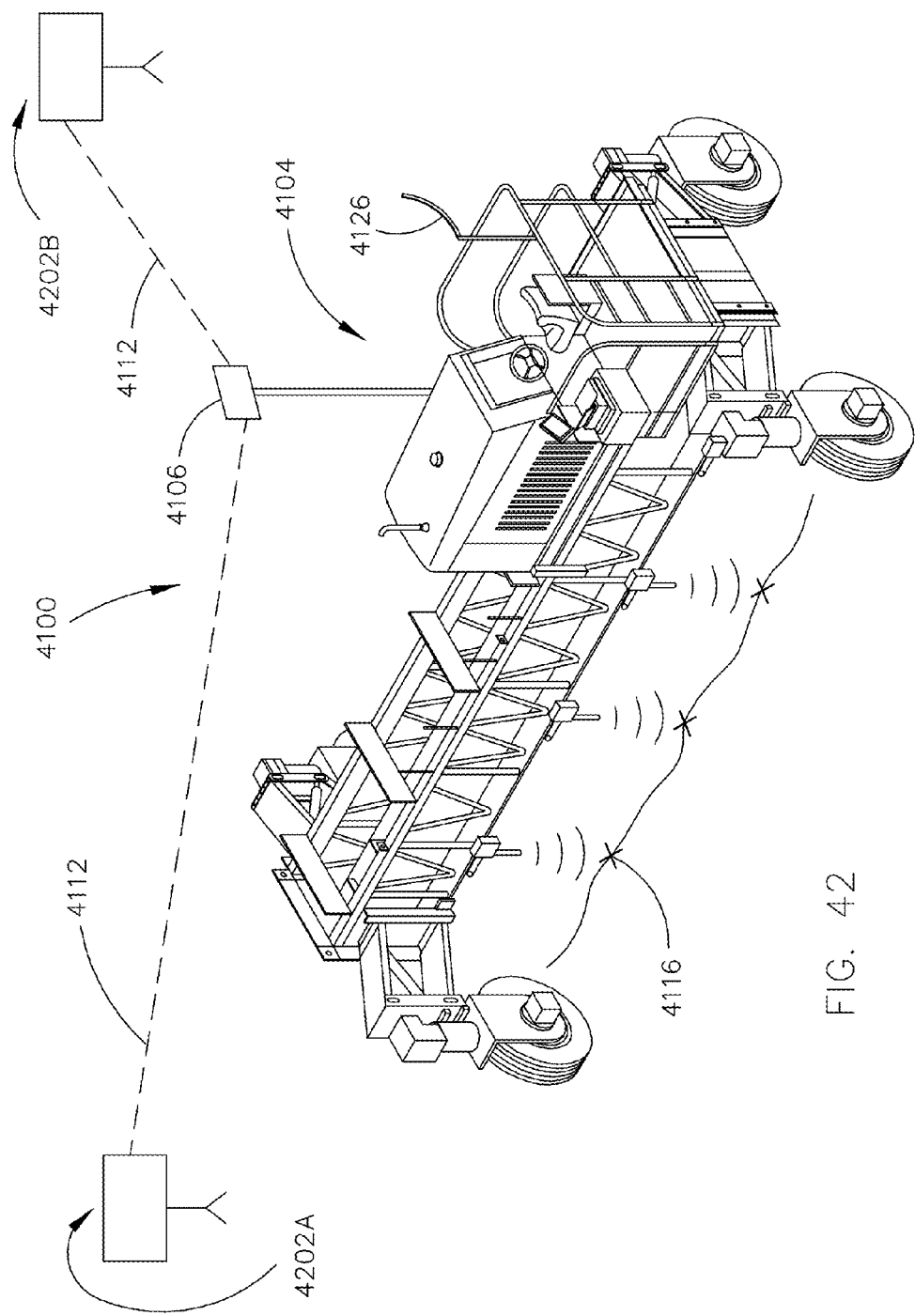
FIG. 42 shows a schematic diagram of the surface data measurement system of FIG. 41 including a plurality of position measurement stations.

Referring now to FIG. 42, a schematic diagram of the surface data measurement system 4100 is shown with a plurality of position measurement stations 4202a, 4202b. While a single position measurement station may be repositioned to continue gathering data while the surface measurement apparatus 4104 proceeds in a direction of travel, multiple position measurement stations may be utilized to provide continuous data collection without the substantial interruption to the data gathering associated with the repositioning of the position measurement station 4102 in the single station implementation. As shown in FIG. 42, the position measurement stations 4202a and 4202b may be spaced apart in the direction of travel of the surface measurement apparatus 4104, such that, for example, position measurement station 4202a gathers data while the surface measurement apparatus 4104 is near the position measurement station 4202a and position measurement station 4202b gathers data while the surface measurement apparatus 4104 is near the position measurement station 4202b, upon further travel of the surface measurement apparatus 4104. The amount of separation between position measurement stations 4202a and 4202b depends on a desired amount of data collection overlap between the position measurement stations 4202a and 4202b. In one implementation, the position measurement stations 4202a and 4202b are spaced between approximately 300 feet and 600 feet from each other. Overlap may be desirably minimized to avoid data collection redundancy and to maximize a distance covered by the position measurement stations 4202a and 4202b. However, some degree of overlap may be useful in confirming accuracy/precision of data collection between position measurement stations 4202a and 4202b.

In operation, position measurement station 4202a gathers data of the position of the reference point 106 on the surface measurement apparatus 4104 for a period of time while the surface measurement apparatus 4104 proceeds along the surface 4114 in the direction of travel as indicated by the arrow 4204. Once the surface measurement apparatus 4104 reaches a certain distance from position measurement station 4202a (e.g., a maximum operating distance), a test may be performed by the position measurement station 4202b to verify that the position measurement station 4202b is able to gather accurate data. Such a test may include, for example, a comparison of absolute position data of the points 4116 on the surface 4114 derived from the data collected by the position measurement station 4202a and from the data collected by the position measurement station 4202b. If the derived absolute positions are within a desired tolerance, then confirmation of the accuracy of position measurement station 4202b is verified. Once verified, the position measurement station 4202b may proceed to measure the positional data of the surface measurement apparatus 4104 and the position measurement station 4202a may stop gathering positional data. Based on the 3-D model of the terrain and the design profile, a computer may be programmed to produce an accurate estimation of materials necessary to produce the design profile over the terrain. The computer may utilize models relating the quantities of cement and aggregate necessary to produce a given quantity of concrete having the properties necessitated by the design profile. Similar methodology may be used to accurately estimate materials necessary to prepare terrain for paving. Materials necessary to prepare terrain for paving may include any materials necessary to create an appropriate base course such as crushed rock for an aggregate base and asphalt (bitumen).

In at least one embodiment, a control system may derive a minimum materials list from a design profile. A design profile may include necessary characteristics for the paved surface, such as intended use, maximum load, ride characteristics, available material, available subgrade or other paving relevant information. The control system may determine minimum surface thickness based on the necessary characteristics and compute total material volume based on the design profile and the minimum thickness. Furthermore, the control system may determine a material cost estimate based on the total material volume and a unit cost factor associated with the material.

Likewise, the control system may receive topographical data associated with the route of the design profile. The control system may orient the topographical profile and the design profile based on one or more location markers, and thereby determine portions of the topographical profile that require grading. Grading may be required for the insertion of culverts or other drainage solutions, or soil stabilization based on a subgrade. Grading may also be required for the inclusion of bridges. The control system may determine an estimated grading cost based on the identified portions. Furthermore, the control system may include the material cost of culverts and bridge elements in the material cost estimate.

Figure 43:
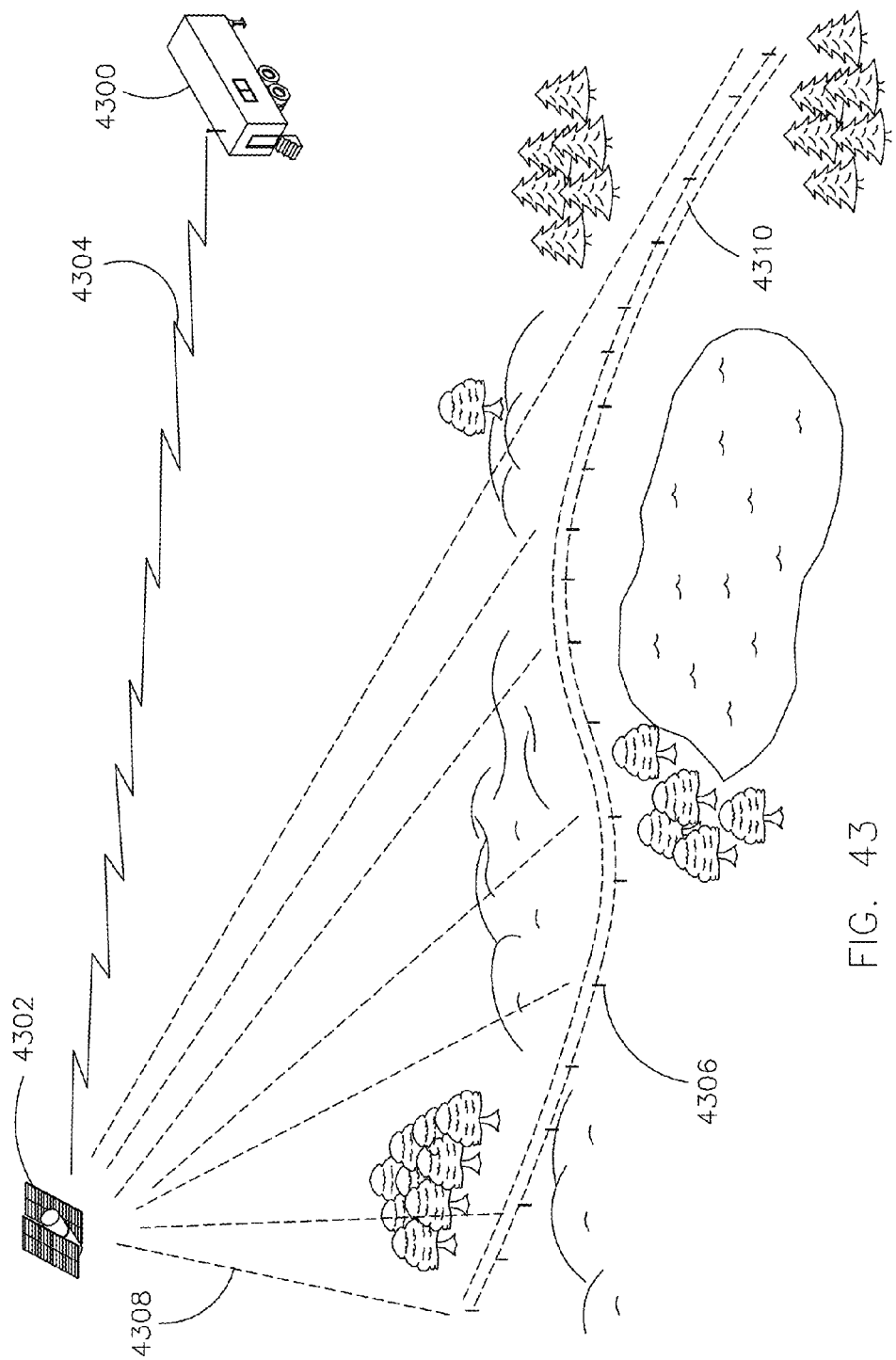
FIG. 43 shows a schematic diagram of a surface data measurement system including a data point markers identifiable by a satellite.

Referring to FIG. 43, a schematic diagram of a surface data measurement system including a data point markers identifiable by a satellite is shown. In one embodiment, a plurality of markers 4310 define a design profile route. The markers 4310 may be satellite communicable 4308 such that a satellite 4302 may identify each marker 4310, acquire information from each marker 4310 such as relative or absolute elevation and position. Such information may then be communicated 4304 to a central control unit 4300. Alternatively, each marker 4310 may be GPS enabled such that each marker 4310 may identify its own relative or absolute elevation and position and communicate such information to a central control unit 4300.

A road builder utilizing methods for accurately estimating the materials necessary to build a particular profile over a giver terrain can use resources more efficiently and complete the construction project for the minimum possible cost. First, trees are cleared from the future road's pathway 4310. Cost of removing trees may be estimated based on information related to a particular terrain (such as tree density) in reference to the pathway 4310 as defined by the plurality of markers 4306. While removing trees, erosion control devices must be installed to keep the dirt from washing away. Erosion control can include silt fences, sediment basins or diversion ditches. These all help contain runoff from a cleared site. Such materials and associated labor costs may be estimated based on information associated with the plurality of markers 4306 and a given profile.

After clearing comes the moving and mounding of dirt to create even surfaces and places for bridges. Cost estimates for earth moving may be made very accurate based on information associated with each marker 4306 because each marker 4306 records a precise elevation, and changes along a given pathway 4310 is a critical component in determining earth moving requirements. When earth moving to fill major voids and remove major earth mounts is finished, the next step is rough grading. Rough grading evens the surface more, though not to a perfect level.

If the pathway 4310 requires culverts, large concrete pipes in a box shape that divert streams from one side of a road to another, they are installed at this point in the process. After rough grading, storm pipes and drains are installed, as well as water and sewer items. This can be one of the lengthiest parts of the process.

Next, graders fine-grade the already rough graded pathway 4310. This is called the subgrade. In this process, workers start meticulously grading the road to match the levels called for by engineers. The soil is then stabilized to add strength and durability to the subgrade. Stabilization is done with lime or cement or both. Engineers take samples of the soil and makes recommendations on how to stabilize it, depending on its characteristics. Such information may be incorporated into an amended materials list. Fine-grading is done again after stabilization.

Control Systems

Figure 44:
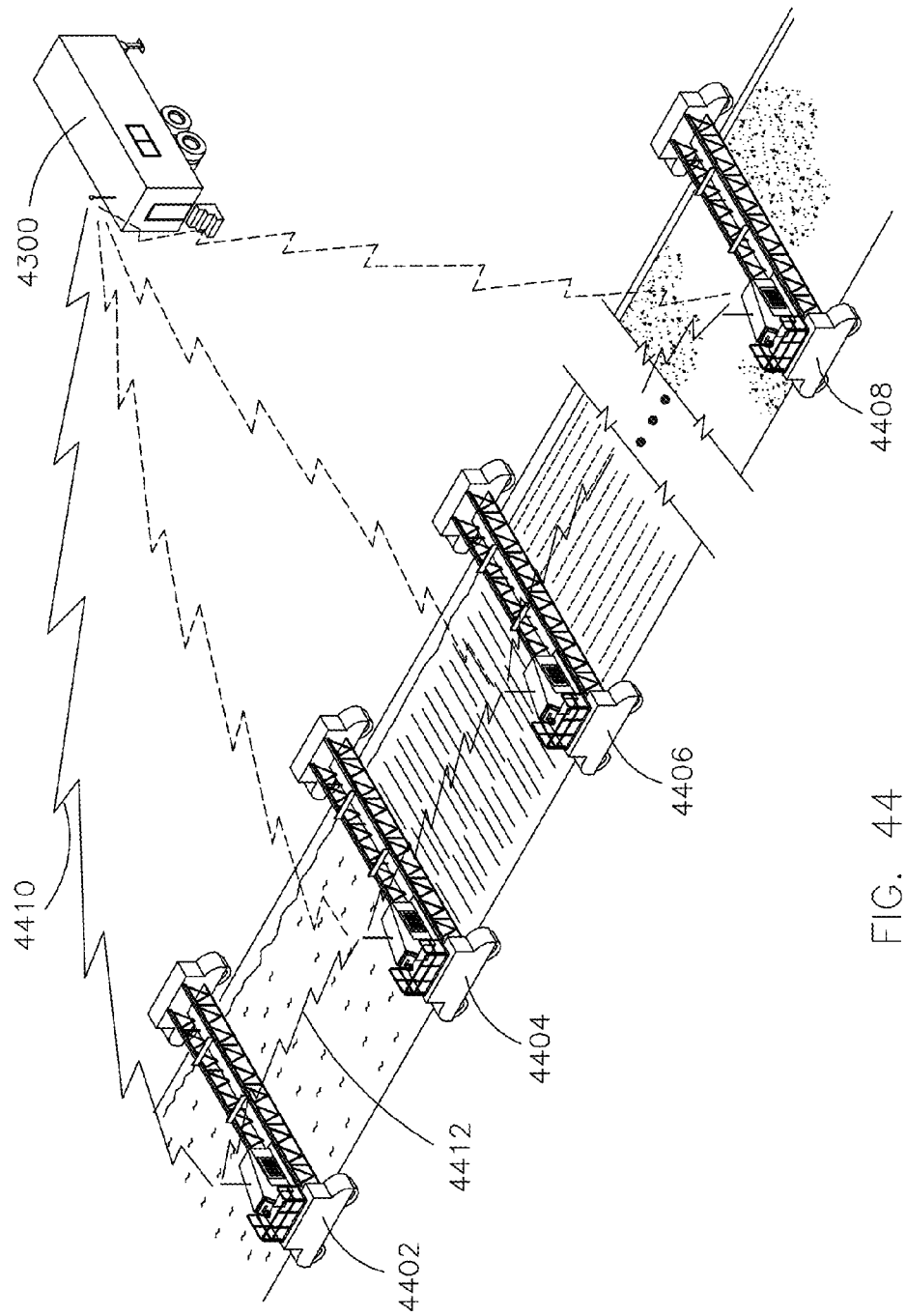
FIG. 44 shows a schematic of a paving train wirelessly connected to a central control unit.

Referring to FIG. 44, a schematic of a paving train wirelessly connected to a central control unit is shown. A control system may include a central control unit 4300. The central control unit is in communication 410 with one or more machines 4402, 4404, 4406, 4408 in a paving train. Each machine 4402, 4404, 4406, 4408 performs one or more distinct functions in the paving train. Furthermore, each machine 4402, 4404, 4406, 4408 may include elements for examining a road surface in process. Information from such elements may be sent to the central control unit 4300 or to the other machines 4402, 4404, 4406, 4408 in the paving train or both. Information from one of the machine 4402, 4404, 4406, 4408 may be used to modify the action of following machines 4402, 4404, 4406, 4408 in the paving train to correct deficiencies in the road surface or errors in the design profile.

Stringless paving may utilize any control system capable of delivering position and orientation information to the machines 4402, 4404, 4406, 4408 in the paving train with a sufficient degree of accuracy. Control systems may include GPS, RTK, laser leveling, photogrammetry, topographic mapping, phototopography (mapping of terrain based solely on photographs) or any other system or combination of systems for relating the position and orientation of a paving machine 4402, 4404, 4406, 4408 to the terrain.

One method for controlling machines 4402, 4404, 4406, 4408 in a paving train includes setting specialized surveying equipment at known points along the path of the road (such as markers 4306 in FIG. 43). One type of specialized surveying instrument useful in this method is commonly called a total station. A total station is single instrument combining a theodolite and an electronic distance meter. In surveying applications a surveyor wishing to know the precise location of some feature places a target called a corner cube prism or corner reflector on the feature. The surveyor then places a total station at a known location. The total station may then determine the precise location and distance of the target relative to the total station. Based on that information and the known location of the total station, a surveyor can determine the precise location of the target and the feature identified by the target. A computer system may combine multiple measurements to create a topographical map.

Provided the exact position of a total station is known, the total station can determine the position of a machine 4402, 4404, 4406, 4408 in a paving train with great accuracy. A corner prism target may be placed at a precise, known location on a machine 4402, 4404, 4406, 4408 in a paving train. The total station may then determine the precise location of the target by the method set forth herein. A second corner prism may be placed at a different precise, known location on the machine 4402, 4404, 4406, 4408 and a second total station may determine the precise location of the second target. Based on all of that information, the location and position of the machine 4402, 4404, 4406, 4408, including elevation, may be determined with great accuracy. Each total station may include a radio to transmit the location and position data of the machine 4402, 4404, 4406, 4408 to other machines 4402, 4404, 4406, 4408 in the paving train or a central control unit 4300.

A computer may be equipped to receive location and position data about the machines 4402, 4404, 4406, 4408 in the paving train from one or more total stations. The computer may be programmed to correlate the location and position data, and relate such data to a 3-D terrain model. The computer may also be configured to adjust certain features of the machine 4402, 4404, 4406, 4408 in a paving train to achieve the desired design profile. The computer may use feedback from one or more total stations to continually adjust features of one or more machines 4402, 4404, 4406, 4408 in the paving train.

Alternatively, a machine 4402, 4404, 4406, 4408 in a paving train may be equipped with a GPS antenna. The GPS signal available for commercial use may not provide sufficient accuracy on it own for road building applications. GPS combined with RTK may provide accurate positioning within a few centimeters. GPS generally cannot provide orientation data for a given machine 4402, 4404, 4406, 4408; therefore, a machine 4402, 4404, 4406, 4408 utilizing GPS may also require tilt sensors.

In addition to mechanisms such as GPS, a machine 4402, 4404, 4406, 4408 in a paving train may utilize one or more laser levels. Surveyors use a laser level to establish a horizontal plane visible within the line of site of the laser level. A laser level may be used in conjunction with a laser mast (such as the reference point 4106 shown in FIG. 41). A laser mast is a device that detects the position of laser light along at least a portion of its length. One or more laser masts may be affixed to a known location on a machine 4402, 4404, 4406, 4408 in a paving train. A laser level placed at a known location may project a horizontal plane a known distance above ground level. A machine 4402, 4404, 4406, 4408 in a paving train with a laser mast affixed at a known location within the line of site of the laser level may detect the projected horizontal plane. The laser mast may determine the location of the projected horizontal plane along the length of the mast and relay such information to a computer either aboard a machine 4402, 4404, 4406, 4408, in a central control unit 4300 or both. The computer may then determine the height of the machine 4402, 4404, 4406, 4408 relative to the laser level. Machines 4402, 4404, 4406, 4408 in a paving train often include hydraulic mechanisms to control the orientation of the machine 4402, 4404, 4406, 4408 and the height of the machine 4402, 4404, 4406, 4408 above ground level. A computer receiving information from a laser mast affixed to a machine 4402, 4404, 4406, 4408 in a paving train may be configured to adjust the hydraulic mechanisms of that machine 4402, 4404, 4406, 4408 to control the orientation and height of the machine 4402, 4404, 4406, 4408 and produce a road closely conforming to a design profile.

In at least one embodiment, a control system may coordinate machines 4402, 4404, 4406, 4408 according to certain paving specific criteria. For example, the control system may determine a minimum cure time associated with an operation performed by a first machine 4402, and subsequently control the speed or position of a second machine 4404 to account for such minimum cure time. Likewise, the control system may determine a maximum cure time associated with an operation performed by a first machine 4402, after which the second machine 4404 may be ineffective, and subsequently control the speed or position of a second machine 4404 to account for such maximum cure time. Furthermore, the control system may utilize such information to determine an anticipated schedule to complete as paving operation.

Road Construction

Figure 45:
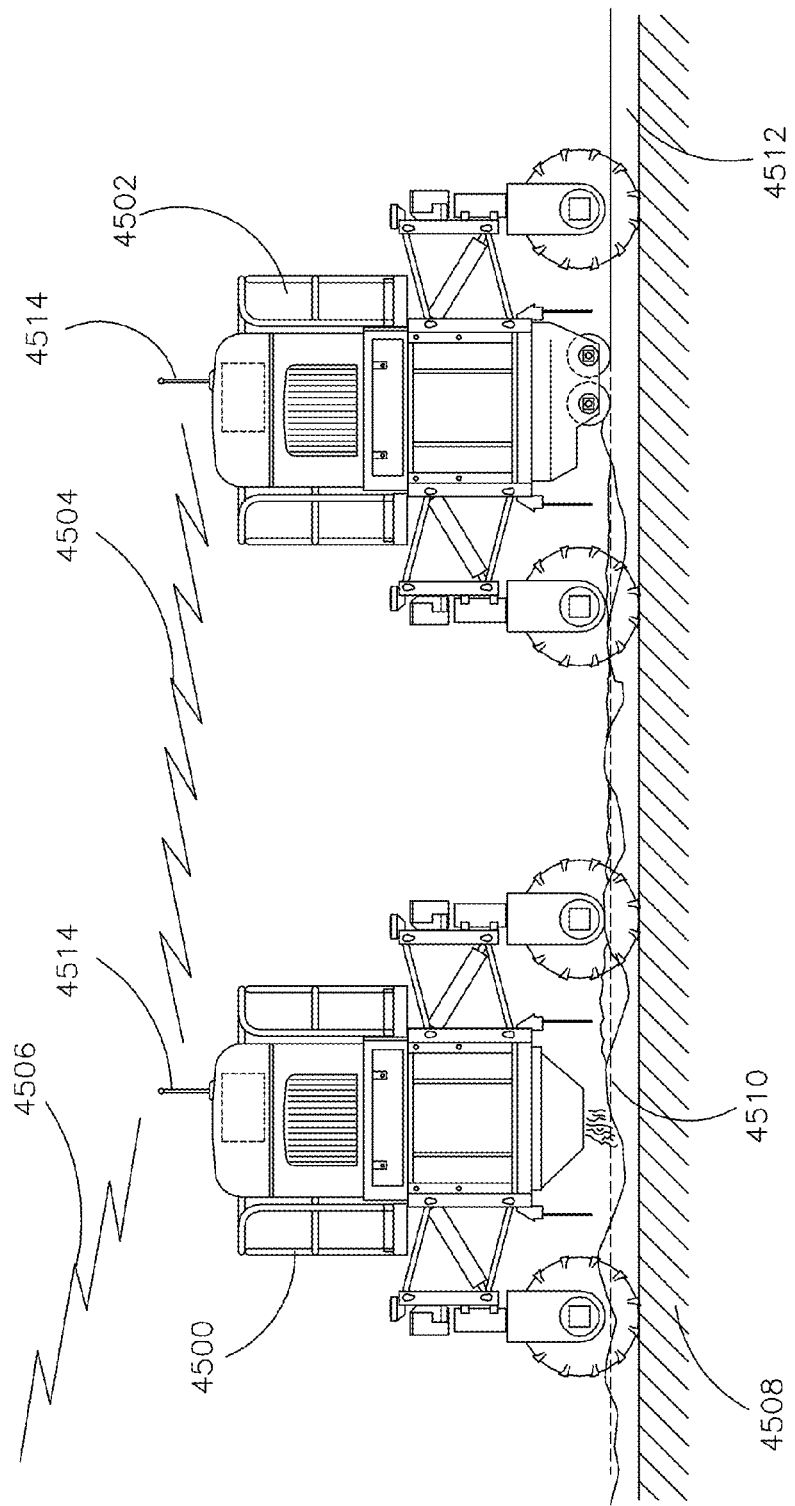
FIG. 45 shows a schematic diagram of two machines in a paving train wirelessly connected to each other.

Referring to FIG. 45, a schematic diagram of two machines in a paving train wirelessly connected to each other over a construction site network is shown. Once the terrain has been graded, road crews may deposit a layer of aggregate to form an aggregate base 4508. Aggregate generally comprises crushed stone. The aggregate base may be graded.

Road crews may apply a base layer of asphalt over the aggregate base. The base layer may include crushed stone aggregate. Road crews may apply an intermediate layer of asphalt. The intermediate layer may include crushed stone aggregate. The crushed stone aggregate of the intermediate layer may be smaller on average than the crushed stone aggregate of the base layer.

Road crews may apply a surface layer 4510 comprising cement concrete or asphalt concrete. The surface layer 4510 may be deposited and processed by machines 4500, 4502 in a paving train, each machine 4500, 4502 equipped with a stringless control system, to produce a smoothed surface layer 4512. The stringless paving control system may include a GPS antenna 4514 affixed to a known location on the machine 4500, 4502 to relay GPS data to a computer. The GPS antenna 4514 may further utilize RTK to provide more accurate position data than is possible using only commercially available GPS signals.

Alternatively, the stringless paving control system may include one or more cube prisms affixed to each machine 4500, 4502 in the paving train at a known location. One or more total stations may be placed at known locations along the terrain. The total stations may target the corner prisms on the machines in the paving train to determine the precise location of each machine relative to each total station. Each total station may transmit the precise location data for each machine to a computer. The computer may then determine Machines 4500, 4502 in a paving train may also be equipped to transmit and receive signals 4504 from other machines 4500, 4502 in the paving train. Such signal 4504 may include information pertinent to the execution of a design profile such as the location of voids that need to be filled to produce a smooth surface. Machines 4500, 4502 may use such signals to alter their operation in real time. Such signals 4504 may be further communicated 4506 to a central control unit.

Finished Road Properties

Figure 46:
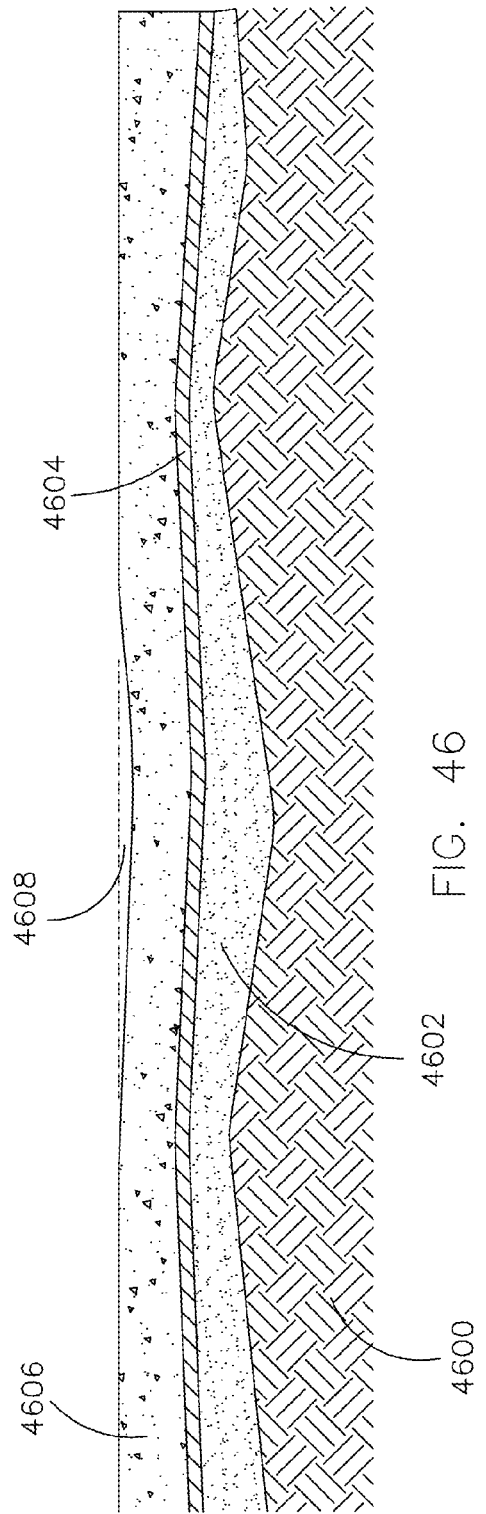
FIG. 46 shows a paved surface with a smoothness defect.

Referring to FIG. 46, a paved surface with a smoothness defect is shown. The road may include an aggregate base 4600 to produce a rough desired grade. An asphalt base layer 4602 may then be applied and an intermediate asphalt layer 4604 applied to the base layer 4602 to prepare a surface suitable for finishing. A smooth surface layer 4606 is then applied. Where a design profile lacks information pertaining to surface features requiring correction, and there is no mechanism to make such corrections during construction, a road surface may include a defect 4608.

Certain properties of a finished road may be extremely important. Some jurisdictions award bonuses based on the smoothness of a road. Profile designs generally call for a certain minimum road thickness while at the same time the authority paying for the road generally seeks the lowest bid. Road builders must meet the minimum thickness requirements with the least possible material. A defect 4608 may necessitate expensive refinishing and retesting.

Figure 47:
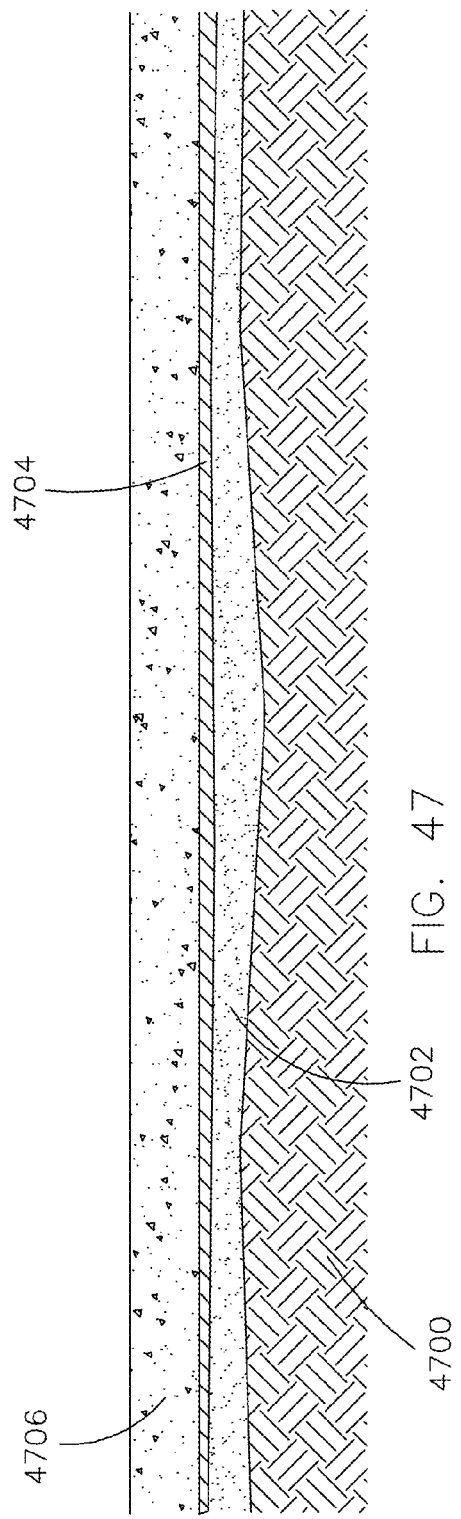
FIG. 47 shows a paved surface with a smooth finish.

Referring to FIG. 47, a paved surface with a smooth finish is shown. The road may also include an aggregate base 4700 to produce a rough desired grade. An asphalt base layer 4702 may then be applied and an intermediate asphalt layer 4704 applied to the base layer 4702 to prepare a surface suitable for finishing. A smooth surface layer 4706 is then applied. In this case, the surface layer 4706 includes no substantial defects because information pertaining to any regions where defects may have occurred is identified early in the construction process and corrected by machines in the paving train.

In one embodiment, a profile may scan a surface corresponding to a design profile at some intermediate state during the paving process. For example, after a surface is rough graded or subgraded, the profiler may profile the surface. The surface profile may then be compared to the design profile to identify portions of the graded surface that require correction. The same process may be utilized at any phase of paving. A control system may analyze the surface profile with reference to the design profile and produce a list of required corrections to make the surface conform to the design profile.

Figure 48:
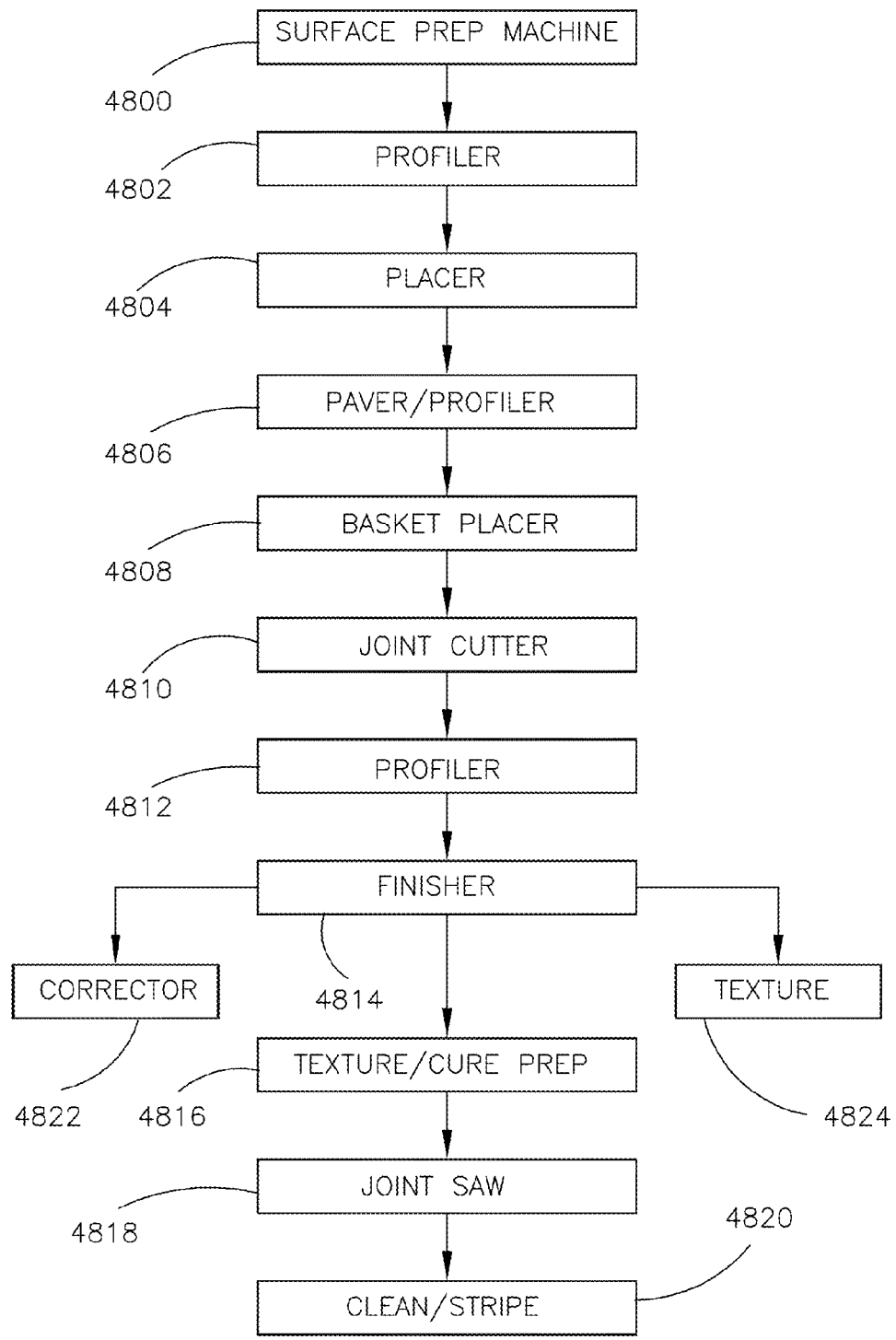
FIG. 48 shows a block diagram of a method for utilizing machines in a paving train.

Referring to FIG. 48, a block diagram of a method for utilizing machines in a paving train is shown. Where a route is defined, the area is prepared by removing trees and moving earth according to a design profile. The design profile may be produced according to embodiments with markers and data derived from such markers. A paving train is then used to create a road. A surface prep machine roughly prepares 4800 the road surface. A profiler then profiles 4802 the prepared surface to identify any areas requiring special attention and confirm the prepared surface conforms to the design profile. A placer places 4804 joint elements as necessary and according to the design profile to maintain the structural integrity of the finished surface. A paver then paves 4806 the surface with asphalt or concrete according to the design profile. The paver may also include elements for scanning the surface to determine if any correction is necessary. Where such correction is necessary, a command may be send to a following machine in the paving train.

After paving, joint elements may be placed 4808 to prevent vertical shifting in the road surface. Then expansion joints may be cut 4810 where joint elements are placed 4808. A final profiler may scan 4812 the surface again to determine if any correction is necessary. If correction is necessary, a finisher may direct a corrector to apply 4822 a correction, otherwise the finisher may finish 4814 a surface (for example by screeding) and texturing 4824 the finished surface.

Where additional texturing is called for, a machine in the paving train may apply 4816 such texture and prepare 4816 such surface to cure. As the surface cures, a joint saw may follow up the expansion joints cut 4810 with additional joint saw cuts 4818. Finally, the finished surface is cleaned and striped 4820.

Because machines in the paving train may communicate with each other and precisely identify their own position and location, a finished surface may be produced within the limits of the design profile with a minimum of material overage. Where a machine in the paving train identifies an error, the error may be corrected contemporaneously so that no expensive resurfacing is required. Furthermore, because the machines are in data communication, and the machines may identify their precise locations through GPS or other means, no string lines are necessary.

Referring generally to FIGS. 49-59, some embodiments include a control system for paving operations, and vehicle bus systems utilizing one or more Controller Area Network ("CAN") protocols allowing utilization of individualized or synchronized components for more precise paving operations.

Figure 49:
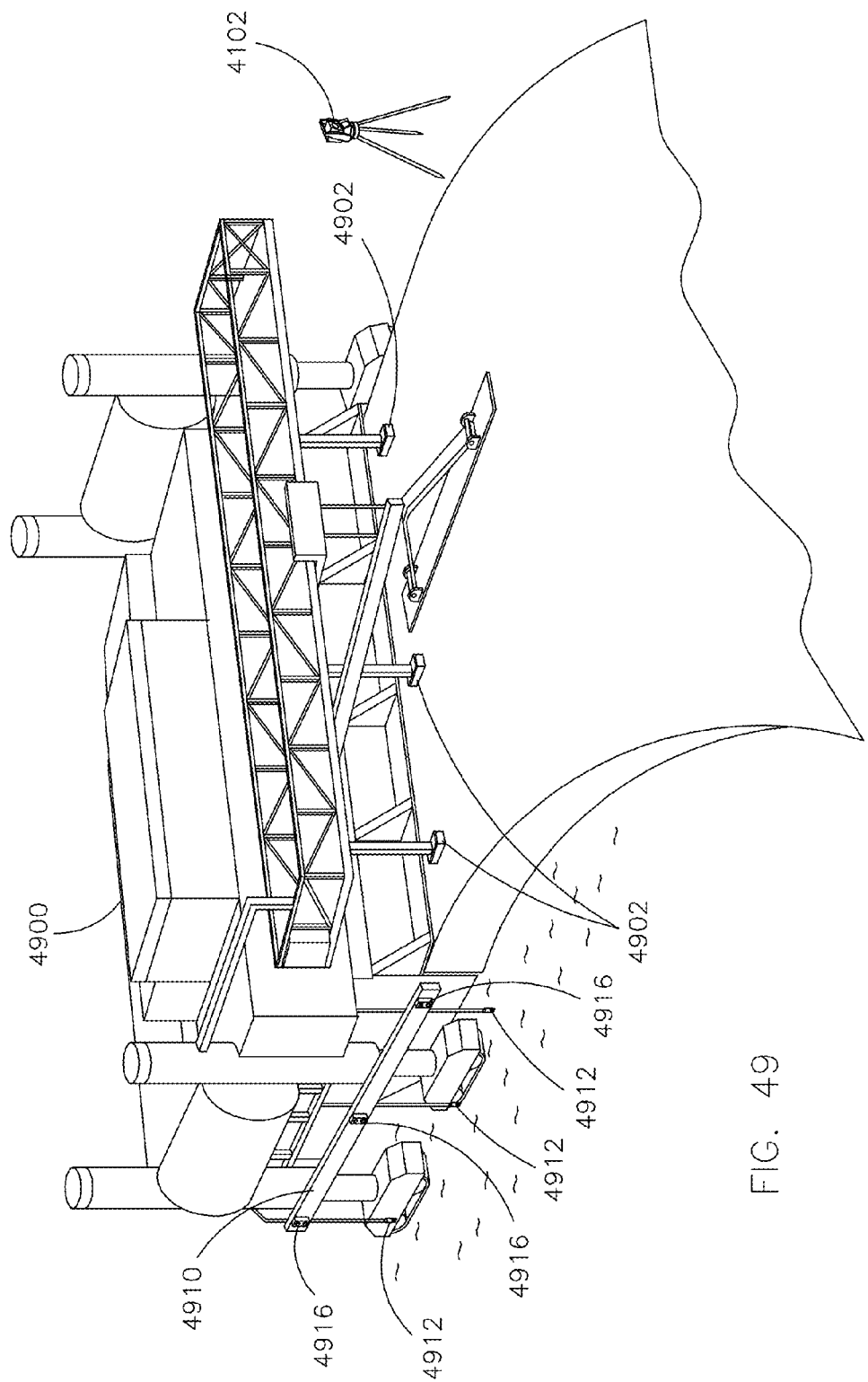
FIG. 49 shows a view of paver machine and a position measurement station.
Figure 50:
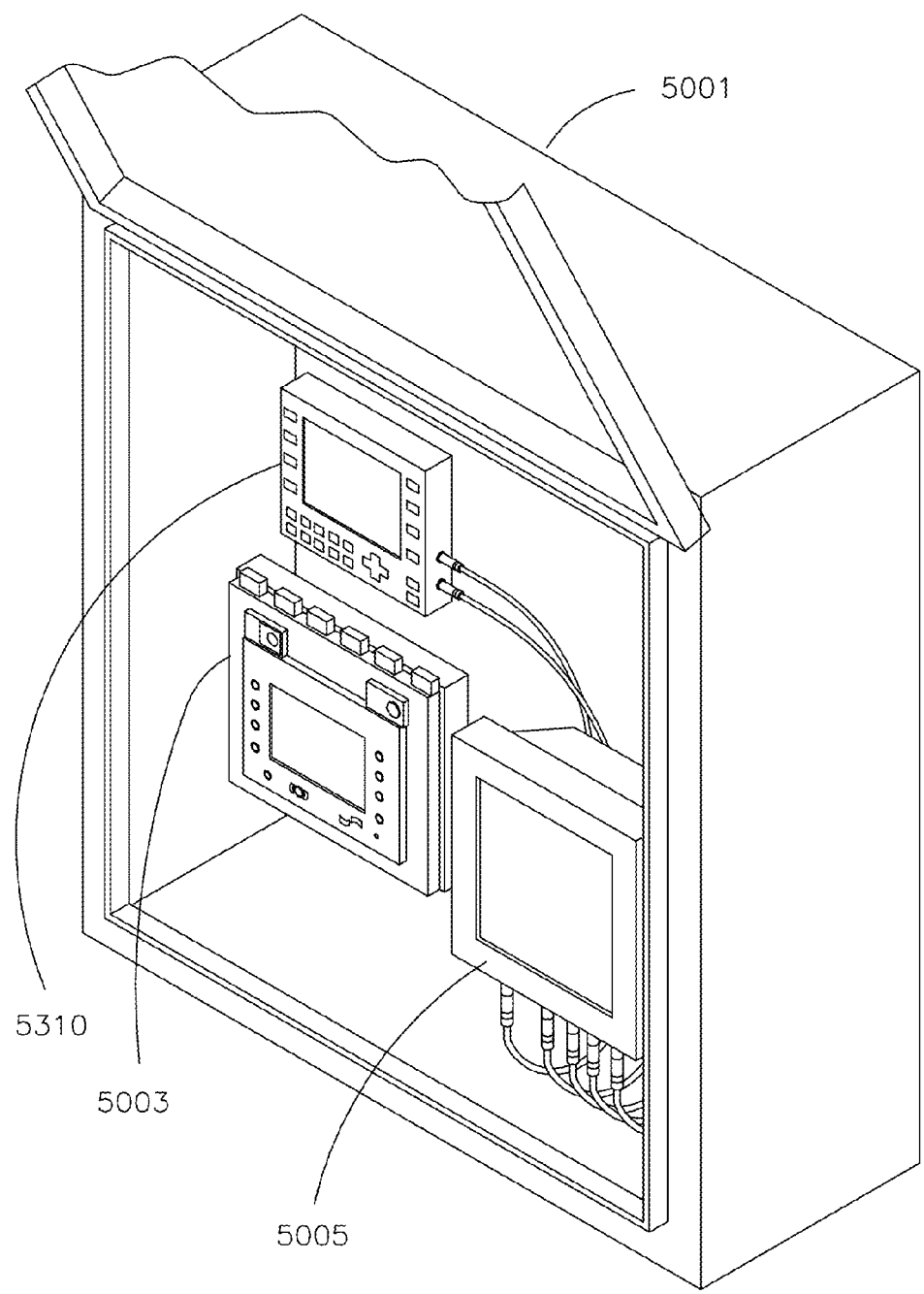
FIG. 50 shows a remote operator console.

Referring now to FIG. 49, a view of a paver machine 4900 of a paving train and a position measurement station 4102 is shown. As shown in FIG. 49, the paver machine 4900 may include a plurality of sensors which may include a variety of sensors types, such as sensor assemblies 4902, 4912, and 4916. The variety of sensor types may include elevation sensors, smoothness sensors, slope sensors, position sensors (such as two-dimensional or three-dimensional position sensors), temperature sensors, cameras, moisture sensors, sonic sensors, ultra-sonic sensors, rotary sensors, laser sensors, infra-red sensors, mix (paving material) sensors, paving group machine position sensors, tool position sensors, or the like.

Still referring to FIG. 49, in some embodiments, some of the sensor assemblies may be mounted on an instrument rail 4910. In some embodiments, the instrument rail 4910 is configured to quickly attach or detach from the paver machine 4900 and may be comprised of aluminum to reduce the weight. The instrument rail 4910 may configured to customizably mount, add, or remove sensor assemblies at desired points along the instrument rail 4910. In an embodiment, the system includes a Controller Area Network ("CAN") connected sensor system with one or more CAN sensors mounted to various components compatible with the paving machine, and some or all of the sensors may be mounted to an aluminum instrument rail ("AIR"). In some embodiments, the CAN connected sensor system is configured to enable system access to multiple arrays of sensors, wherein placement of multiple sensor arrays enable sensor data to be processed based on sensor placement for more precise sensor data. The CAN connected sensor system may be configured to provide sensor data to the control system for controlling slope, grade, steer, and other operations as a particular project may require. For example, the sensor data may be used for controlling paving of fill-in lanes, tunnels, half-width overlays, canals, as well as steering off an existing barrier wall based on sensor data.

Still referring to FIG. 49, a position measurement station 4102 may provide position data to support three-dimensional machine control.

Generally referring now to FIGS. 50-53, views of components of an exemplary control system are shown. In some embodiments, each machine of a paving train includes a control system which is communicatively coupled over a construction network to other control systems of other pave train machines. For example, a control system of a paver machine 4900 may be wirelessly connected to control systems of one or more bar inserter control systems (such as one or more control systems of an integrated bar inserter, a frame mounted bar inserter, a side bar inserter, a tie bar inserter, an in-the-pan dowel bar inserter (IDBI), or the like). The control systems connected over the construction site network are configured to share data (such as sensor data and position data) and to send and receive control instructions. For example, a bar inserter control system may be configured to allow operation of one or more tie bar inserters (TBIs), one or more side bar inserters, a paint marker, a sprayer, and one or more power transition adjustors ("PTA"s). An accessory control system may be further configured to allow work to be programmed such that a process to be performed is based on time or distance, and to allow automated control of and efficient and/or optimal material usage and roadway performance.

Figure 51:
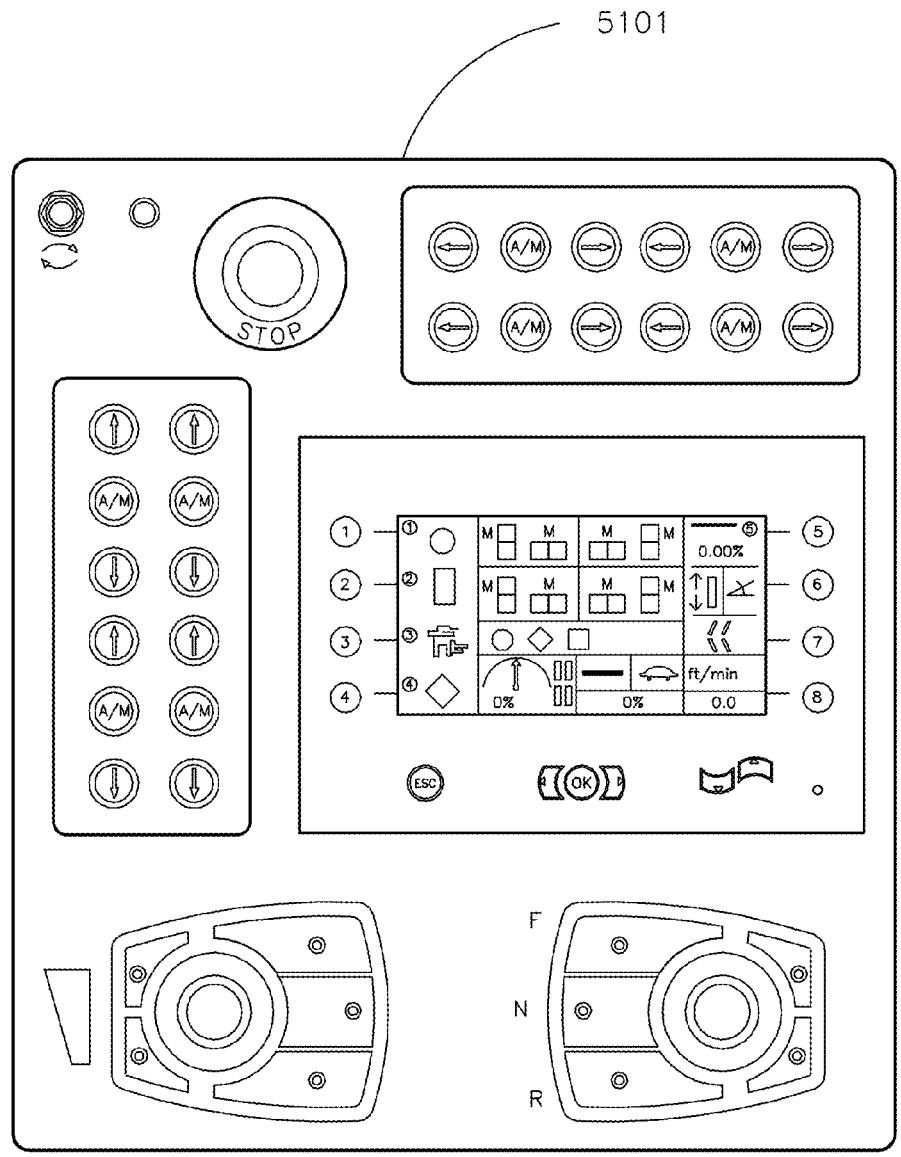
FIG. 51 shows an exemplary machine control panel.

As shown in FIG. 51, an exemplary machine control panel 5101 is shown. Each machine of a paving train may include a machine control panel 5101, which includes an input/output user interface for one or more machine operators. The machine control panel 5101 may include a display (such as a touch-screen display) and user-inputs (such as buttons or knobs). The machine control panel 5101 may be installed, for example, in an operator's cab of the machine (such as a cab of a paver machine 4900).

In an exemplary embodiment, a paving train operation system includes: a paving machine; other paving train machines (e.g., a trimmer, a bar inserter, a placer, a smoothness indicator, or the like); one or more control systems, which may be implemented as a software control interface system over a construction site network; and a software control connector system. In some embodiments, each machine of the pave train includes a vehicle bus network of one or more Controller Area Network ("CAN") based systems connected to or through the software control interface system for the interfacing the CAN based system(s) throughout the entire paving machine and/or throughout other machines of the paving train. The system may also include additional components connected with one or more CAN lines for allowing the exchange of data and information with the CAN based system(s); and a console. Non-limiting examples of information exchanged over the CAN line(s) include pulse pickup (PPu) data from the tracks as well as slope sensor data.

In some embodiments, multiple CANs are implemented in the system on each paver and on each of the other paving train machines. For example, the CANs may include a Main Machine Control CAN (e.g., for propel, grade and steer data), an Engine CAN, a Leg Sensor CAN (e.g., for each leg on a machine), and one or more accessory CANs. Additional CANs can include smoothness indicator ("SI") CANs, bar inserter CANs, power transition adjuster ("PTA") CANs, In-the-pan Dowel Bar Inserter (IDBI) CANs, and 3-dimensional control system CANs.

In some embodiments, the system includes a user navigable display. The user display provides display of the output data in various forms including but not limited to: graphical screens, charts, diagrams, and visual representations. The user display may permit display of the output data in a plurality of languages including, but not limited to, English, Spanish, German, Russian, Kalmyk Oirat, and French. The console may have labels including, but not limited to, universal picture decals or icons, which allow for simplification of labeling and reduction of clutter.

In some embodiments, the pave train system topology a smoothness indicator ("SI") machine or the paver machine 4900 includes an SI. The SI may comprise a real time profiler which provides output data which can be displayed in easily recognizable forms, including but not limited to graphs, charts, or reports; wherein, the graphs, charts, or reports display the true profile as well as real time International Roughness Index ("IRI"), Profile Index ("PI") and other smoothness data. The SI may be used by the contractor to help fine tune a paving machine and overall paving operation by enabling adjustments to be made to a paver operation with immediate feedback. When changes are made to the paving machine, the changes may be recorded in the software control system to observe how the change affects final paving.

In some embodiments, the pave train system topology is configured for PTA control to permit automated control of multiple PTAs (e.g., up to four) of a paving pan. The capability of controlling up to four PTA's in the pan simultaneously enables the user to pave "flying shoulders." Instead of, or in addition to, entering transitions in terms of vertical height over a distance, the bar inserter control computer allows transitions to be entered as a slope value, which better corresponds to jobsite plans (e.g. design file).

Referring again to FIG. 50, in some embodiments, a particular machine (e.g., a paver machine 4900) of the paving train includes a remote operator console 5001, which may be attached to the particular paving train machine. The remote operator console 5001 may, for example, include a control panel 5003, an auxiliary display 5005, and a removable setup remote 5310. The remote operator console 5001 may be attached to the exterior of a particular machine so as to allow access by ground personnel. The remote operator console 5001 readily plugs into the software control connector system allowing the remote operator to view the display that the main operator is viewing. Additionally, the remote operator may easily monitor and make changes to the particular machine of the paving train as necessary. For example, if the SI is in operation, the remote operator can view the SI data and make appropriate changes to the sensitivity without climbing up and down the ladder into an operator cab.

Figure 52:
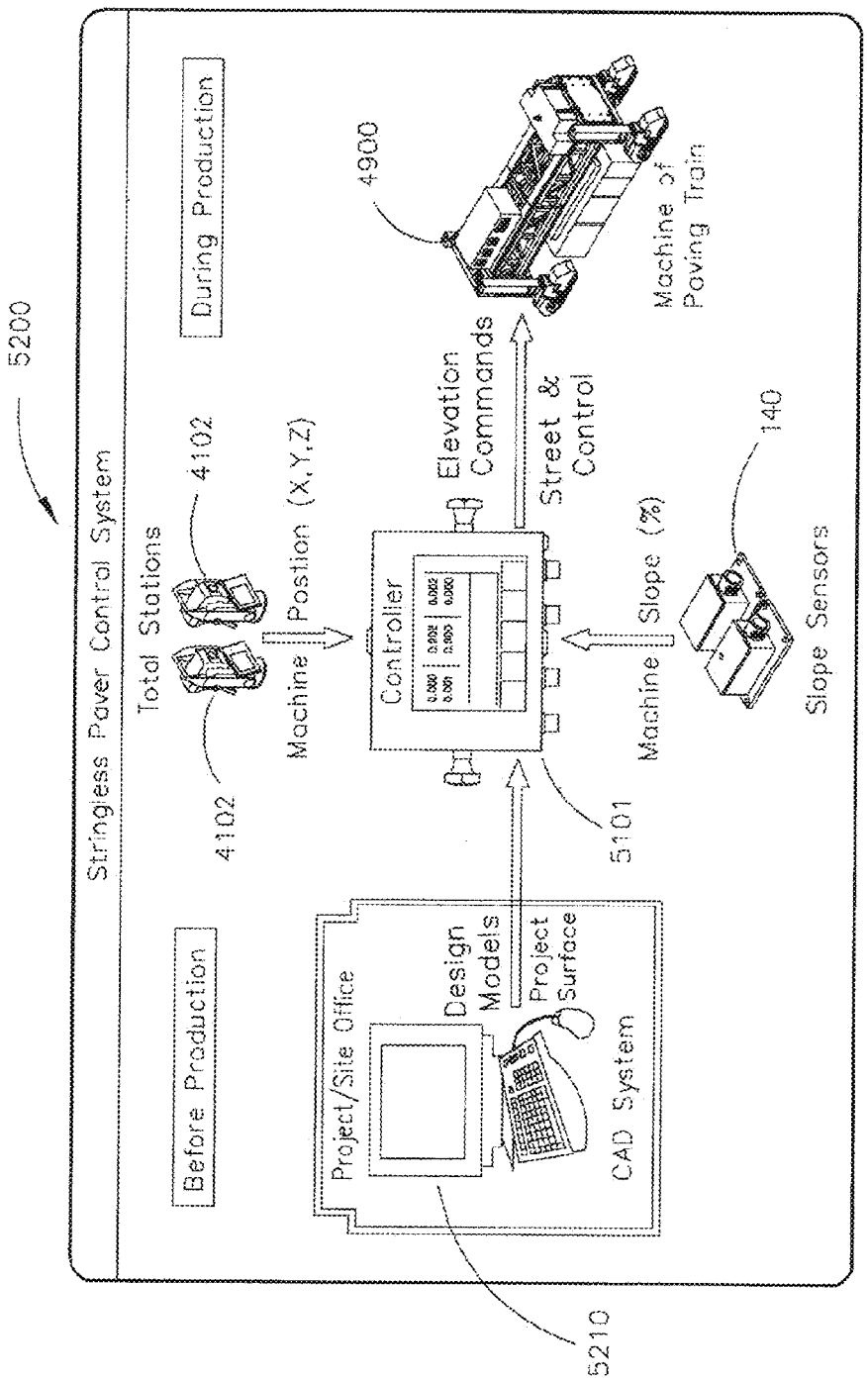
FIG. 52 shows a system topology.

Referring now to FIG. 52, an exemplary partial system topology 5200 for an exemplary stringless paver control system is shown. An exemplary partial system topology 5200 may include a control system/controller 5101 of a paver machine 4900. The control system 5101 may be communicatively connected over a network to a computing device 5210 located on or off a project site. The control system/controller 5101 may be communicatively coupled to a plurality of sensors, such as slope sensors 140, elevation sensors, position sensors or the like. In some embodiments, the control system/controller 5101 is configured to receive three-dimensional position data from position measurement stations 4102. The control system/controller 5101 may be configured to control particular paving train machines (such as a paver machine 4900); for example, the control system/controller 5101 may steer the paver machine 4900, control machine speed, control leg elevations of the machine, or the like. Furthermore, the control system/controller 5101 may be connected to other control system/controllers of other machines of the paving train. In some embodiments, the control system/controller 5101 of a first machine (e.g., a paver machine 4900) is configured to receive one or more design files which may comprise design information for a paving project and information of specifications for the paving project. For example, design files may include a two-dimensional or three-dimensional computer-aided design (CAD) file, a specification file (which contains information of project design requirements), a design profile, or the like. Additionally, the control system/controller 5101 may be configured to receive sensor and position data from a first particular machine and sensor data and position data of other machines of the paving train.

The control system/controller 5101 may update a paving work state file to include the most recent/current information of the jobsite. In some embodiments, the paving work state file includes information related to how the project is built, paved, prepared for paving, or the like. For example, each machine of a paving train or each machine involved in a paving project may transmit sensor data, position data, or the like to a computing device of particular machine of the paving train/paving project, and the receiving computing device of the particular machine updates the paving work state file to include the received current information of the paving project at that particular time and position as measured by sensors of various machines (as well as, instruments, tools, or the like) connected via a network at the construction site. For example, the paving work state file may include the most up-to-date measured topographical information (e.g., slope, elevation, grade, soil moisture, soil temperature, soil hardness) and information of the in-progress (or completed) paving (e.g., mix type, thickness, base elevation, top elevation, bar locations/spacing, smoothness, slope, temperature, moisture, hardness, or the like). As a particular example, a trimmer may transmit a stream of data (e.g., position, time, elevation, slope, or the like) to a computing a device of a paver machine as the trimmer removes soil material from particular locations of the project site, and the computing device of the paver machine updates the paving work state file based on the stream of data received from the trimmer. In some embodiments, the paving work state file includes previous state data (in addition to the most current data) with respect to some or all locations (e.g., with respect to a surface position or three-dimensional position). The paving work state file can be compared against the design file to determine whether the as-paved project complies with the designed-project within a predetermined level of tolerance. Furthermore, the control system/controller 5101 (or another computing device) may create an as-built file or as-paved file based on data updated in the paving work state file. Additionally, the control system/controller 5101 may generate a certification report once a paving project (or a portion/stage thereof) is complete, if the control system/controller 5101 (or another computing device) determines that the completed paving project complies with all the requirements of the designed project within a predetermined (e.g., specified in the construction documents for a particular project) level of tolerance. This generated certification report may be transmitted to other computer devices (such as one or more computing devices of a contractor, sub-contractor, inspector, owner, architect, engineer, government agency, or regulatory entity), such as to accompany a request for approval or payment. For example, the certification report may reduce the amount of labor and time required to verify that a project is completed as specified and designed, and as such may expedite payment for the paving contractor.

Figure 53:
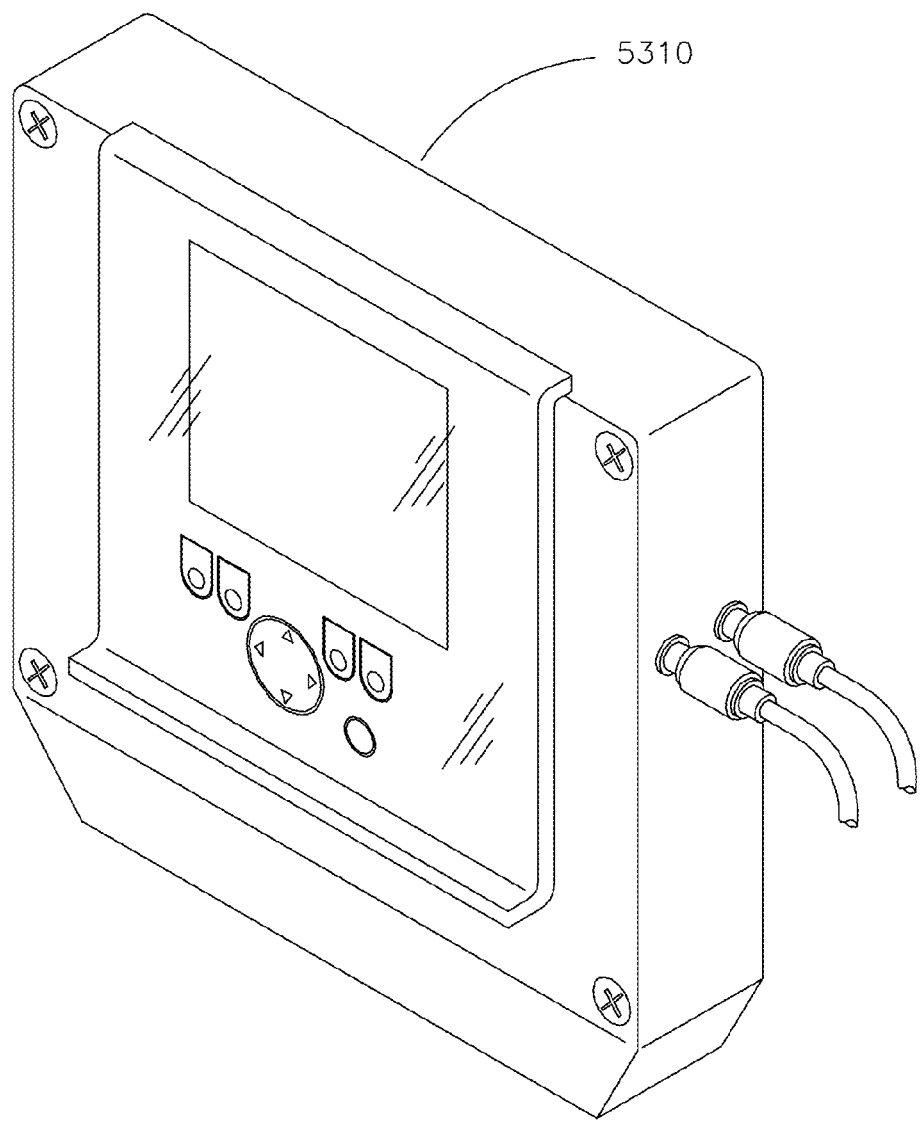
FIG. 53 shows a setup remote.

Referring now to FIG. 53, in some embodiments, the system includes a setup remote 5310 providing a plurality of operational functions. The setup remote 5310 may plug into the machine and aid in the setup of a particular machine, such as a machine involved in engaging a mold, alternating between transport and paving positions, and the like. The operational functions include, but are not limited to, throttle, individual leg control, left side control, right side control, elevation all jog, and entire machine functioning. The setup remote 5310 may move each individual leg (elevation and travel), a left or right side only (elevation and travel), an entire machine at once (elevation and travel), or the like. The setup remote 5310 may also be configured with several built in safety features. For example, the safety features include, but are not limited to: notifying the overall system that the setup remote 5310 is plugged-in; displaying an icon at the main controller screen to inform an operator that the setup remote 5310 operational/non-operational; disabling the manual jog buttons on the main controller so the operator and the remote operator are not performing or changing the same or contradictory operations; ensuring the machine emergency stops are cleared before use of the setup remote 5310; reducing the valve drives so only slow deliberate movements can be made; and, incorporating a two-button-at-a-time operation, which requires the use of two hands to operate, eliminating the possibility of unknowingly hitting a button and causing an unwanted action to take place.

Referring generally now to FIGS. 54-59, exemplary graphical user interface screens of an exemplary control panel are depicted. In some embodiments, the system is configured to display digital slope control and Advanced Setup and Diagnostic tools. For example, the configuration for digital slope control allows long and cross slope to be configured using high resolution dual slope sensors which read both long and cross slope. These sensors may be either or both of analog and digital sensors or mixed-signal sensors. In some embodiments, the digital slope sensors are preferred. The software control connector system may allow the same slope sensors to be used for the machine as well as the 3D control.

Figure 54:
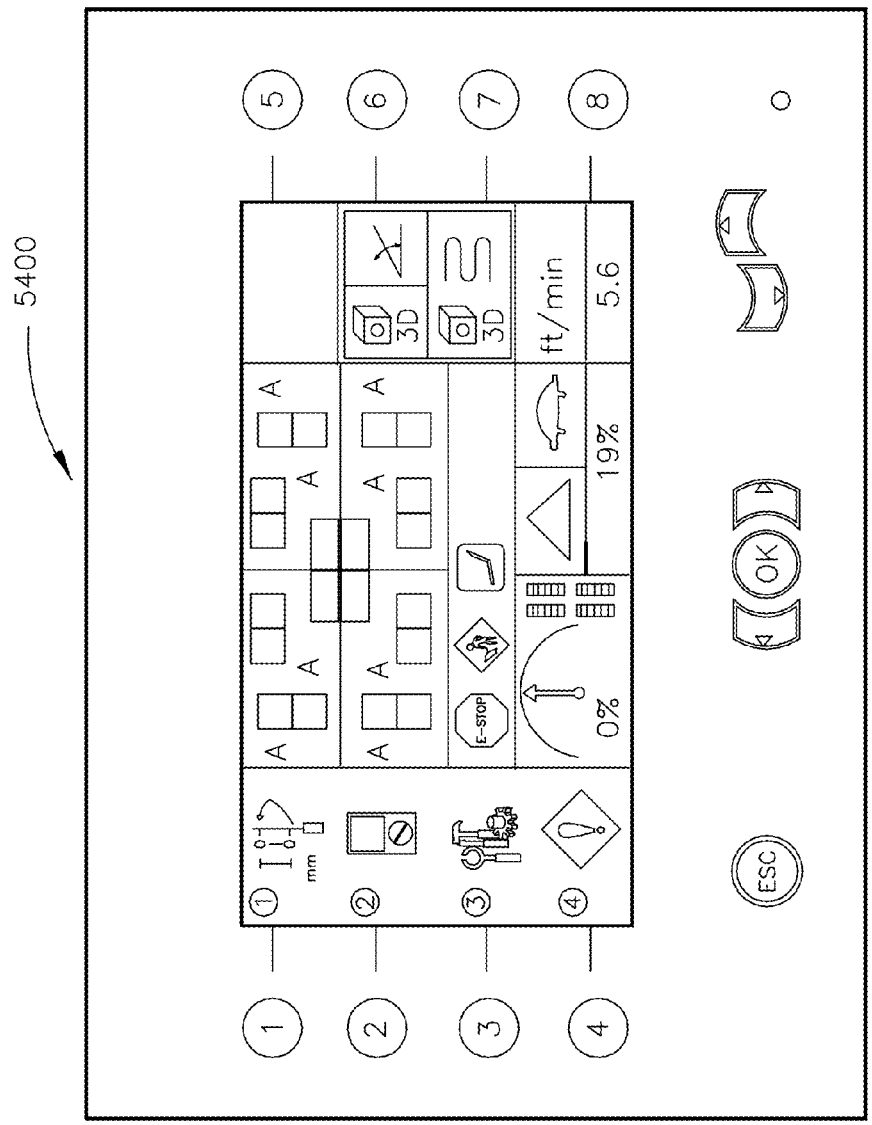
FIGS. 54-59 show exemplary graphical user interface screens of an exemplary control panel.

Referring now to FIG. 54, a view 5400 of a control panel displaying an Advanced Setup and Diagnostic tools configured with a Run Screen with deviation boxes is shown. The deviation boxes show the steering and elevation deviations. The boxes in the center show sensory feedback for steering. This allows the operator to observe how the tracks are responding to sensory corrections.

Figure 55:
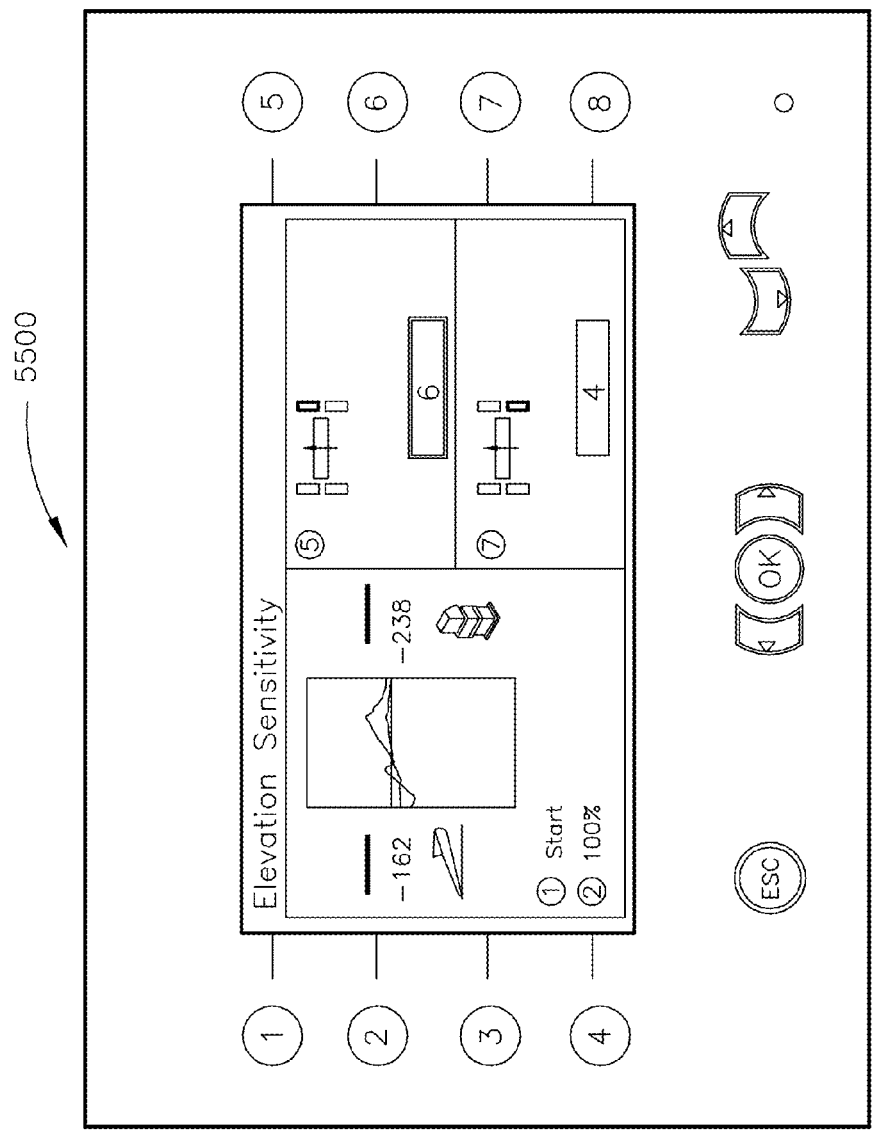

Referring now to FIG. 55, a view 5500 of a control panel displaying the Advanced Setup and Diagnostic tools include setup tools configured with a sensitivity tuning graph feature. An elevation sensitivity screen includes a graph that compares sensor feedback to valve drive output. This graph produces a real time sine-wave graph with the two components overlaid on top of each other. This function allows the operator to adjust sensitivity and fine tune sensor feedback and valve output until the feedback and output match each other providing accurate (such as optimum) control.

In some embodiments, the Advanced Setup and Diagnostic tools include setup tools configured to allow system threshold settings. The system allows for easier and more accurate threshold settings and may be operated by one individual from a main software control screen. Some embodiments are configured for various controls, such as string-line sensors, slope sensors, and/or stringless 3D machine control. Thresholds may be set much more accurately by utilizing the sensor feedback. By using sensors to set the thresholds the need for two people to complete this process can be eliminated, and the impacts of human error can be reduced.

Figure 56:
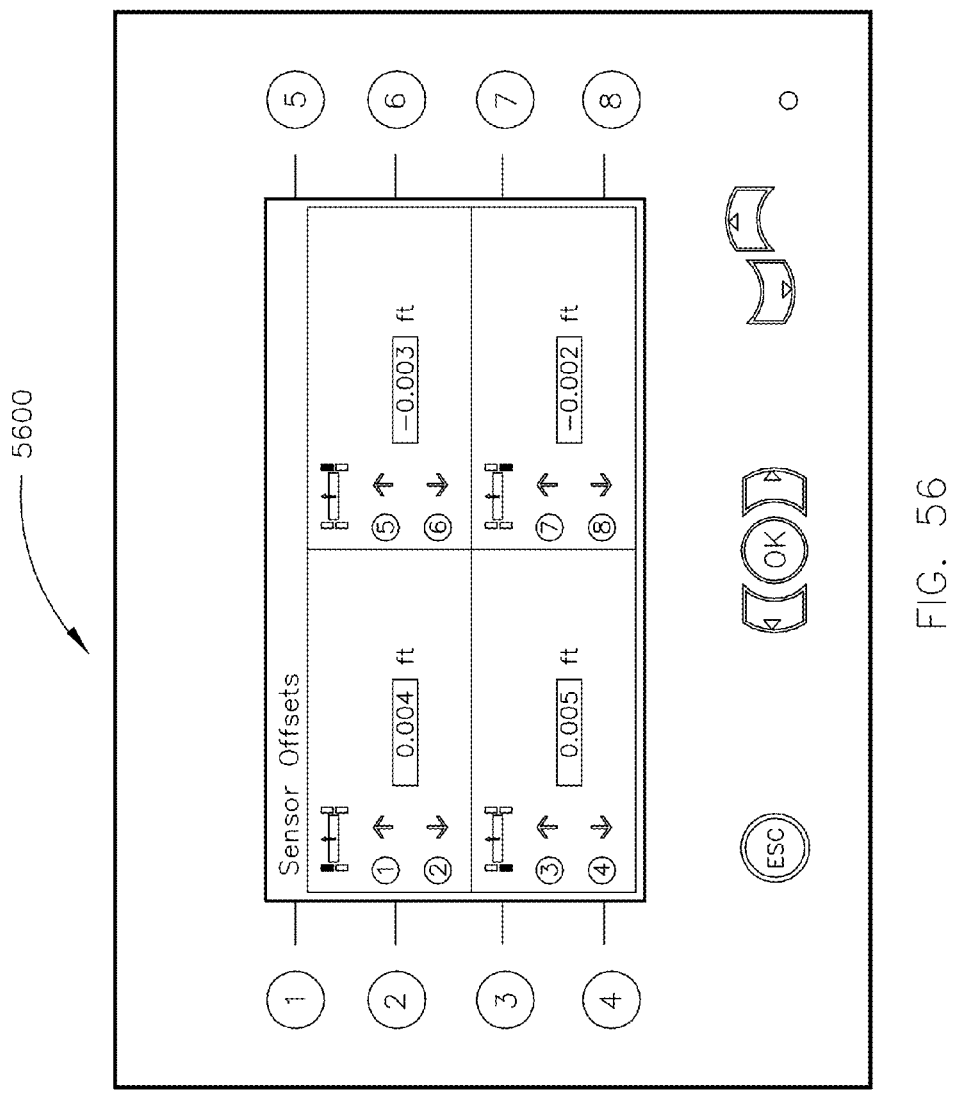

Referring now to FIG. 56, a view 5600 of a control panel displaying the Advanced Setup and Diagnostic tools configured with a digital offsets feature is shown. Digital offsets may be used for string-line sensors and assist a user on the ground to monitor the offsets on each sensor throughout operation of the system.

Figure 57:
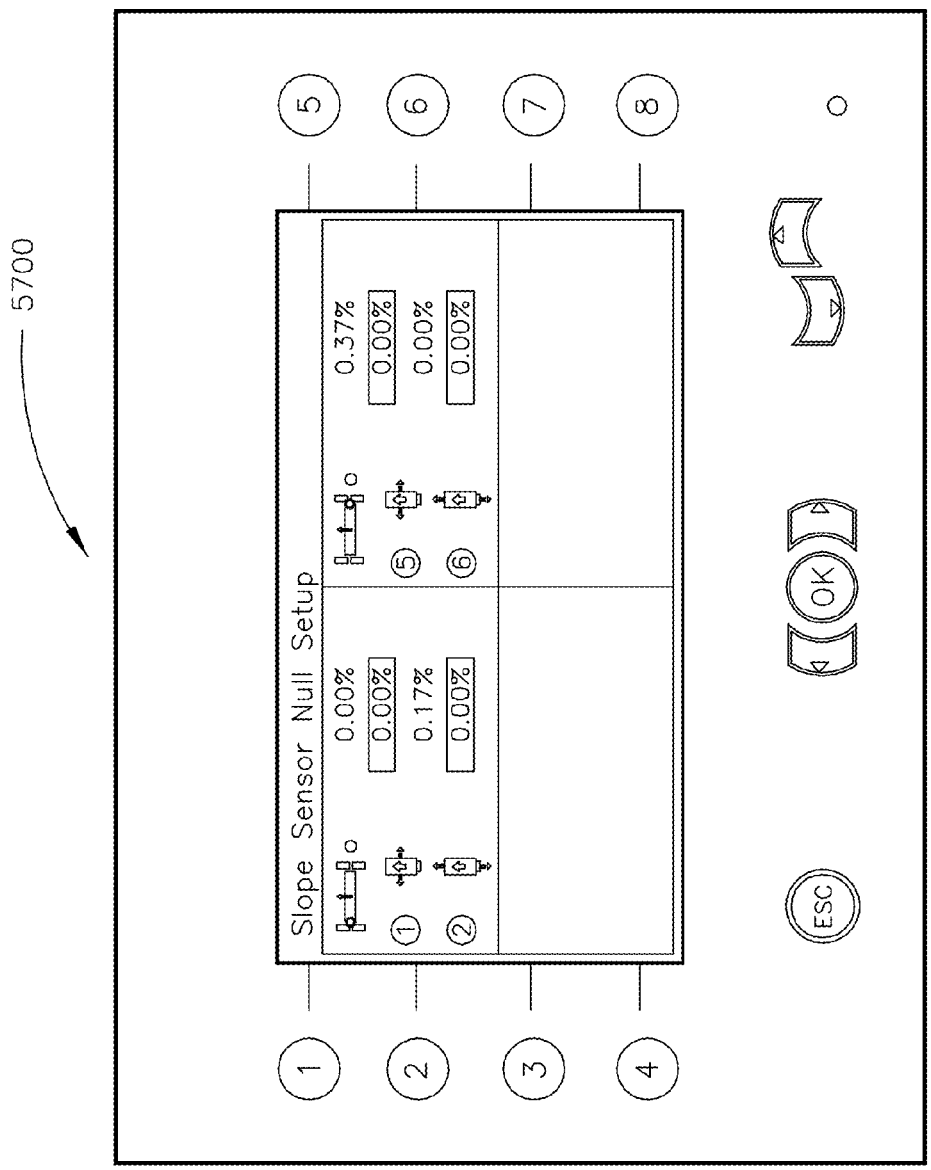

Referring now to FIG. 57, a view 5700 of a control panel displaying the Advanced Setup and Diagnostic tools configured with a slope sensor null setup feature is shown. In one embodiment, to null the slope sensors, the machine is leveled and each sensor is nulled at the system console. Preferably, there is no need to make any adjustments to the actual slope sensor if it is mounted correctly.

Figure 58:
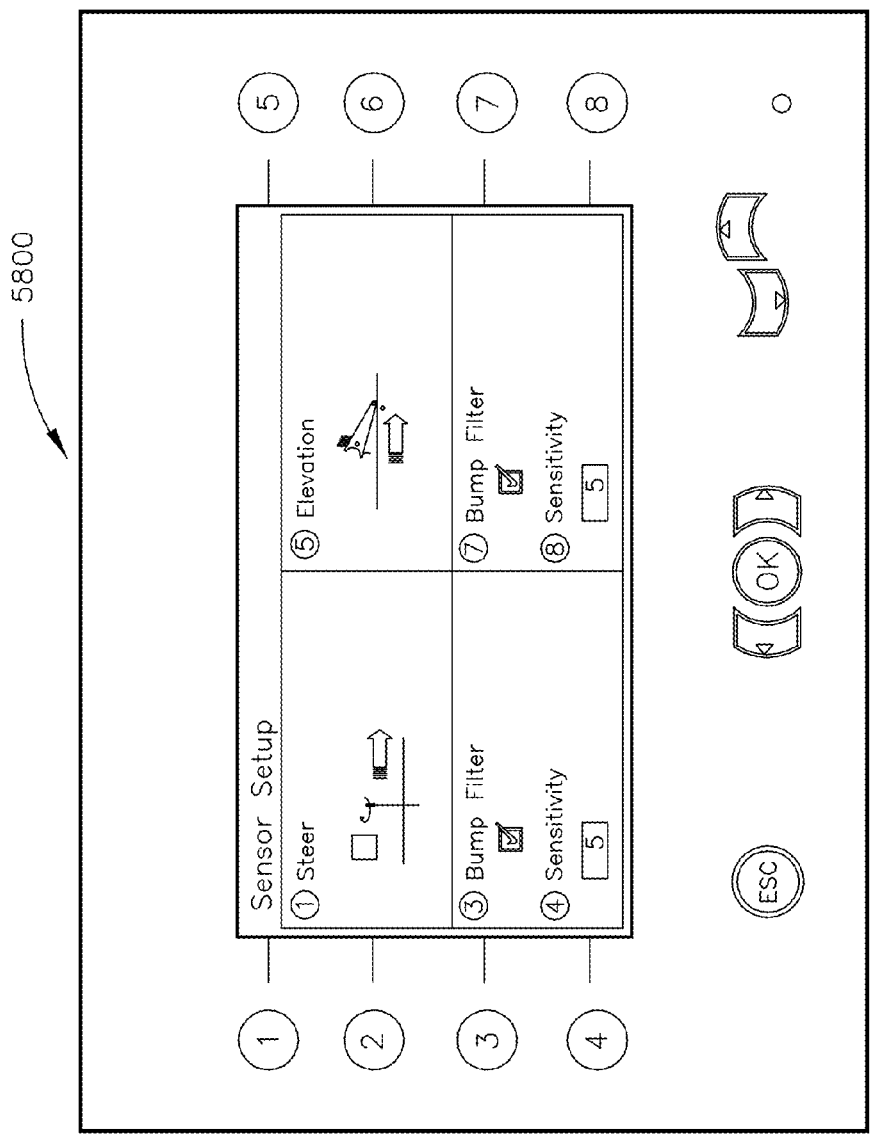

Referring now to FIG. 58, a view 5800 of a control panel displaying the Advanced Setup and Diagnostic tools including setup tools configured to allow sensor setup is shown. Advanced diagnostics may be used to assure proper sensor setup. The sensor setup screen lets the user select either push or pull for the steering and elevation sensor wands. The bump filter with the software control system is configured to turn on and off via the operator selecting the sensitivity value. This is function is enabled through pulse pickup data accounting for the speed of the machine.

Figure 59:
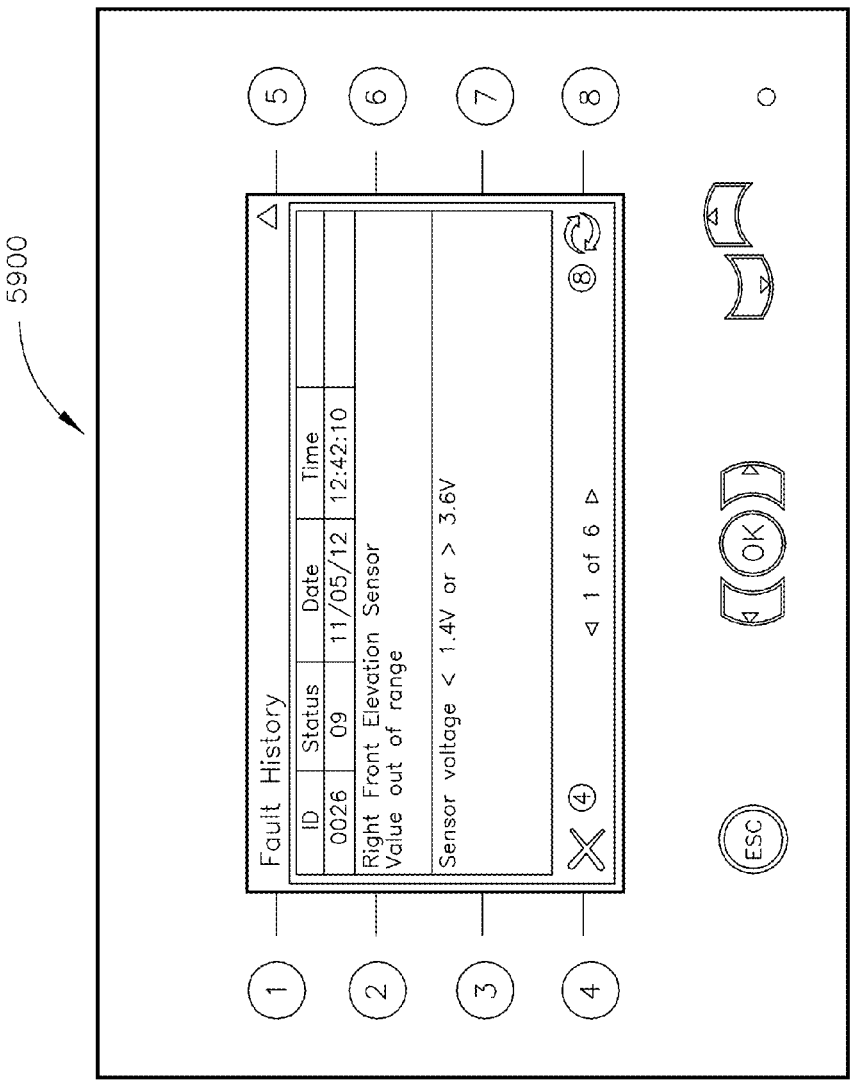

Referring now to FIG. 59, a view 5900 of a control panel displaying the Advanced Setup and Diagnostic tools are further configured with a Troubleshooting feature. In one embodiment, the trouble shooting feature includes a fault history feature. The fault history screen may improve troubleshooting by being able to view the current machine faults as well as previous faults (such as the previous 30 faults) with a date/time stamp.

Additionally, the display of the control panel may present further information. For example, The Advanced Setup and Diagnostic tools may be further configured with a setup menu including, but not limited to, large icons with headings to ensure easy navigation. Screens may incorporate numbers, arrows, or other indicators and a selection button for menu selection. Backtracking menu selections may be performed by pressing keys similar to escape keys.

Also, the Advanced Setup and Diagnostic tools may be further configured with a 3D controls screen feature. The 3D controls screen is a diagnostic screen to view the feedback and communication values for elevation, steering, and other paving and paver machine/paving train controls.

Additionally, the Advanced Setup and Diagnostic tools may be further configured with a switch test 1 feature. In one embodiment, the switch test 1 screen assists the operator in troubleshooting problems or to assure all switches are working properly. In the test screen you can check the jog buttons, as well as the steering, propel buttons, and knobs. When a button is pushed it may light up on the screen to show that it is functioning properly with the controller. The Advanced Setup and Diagnostic tools may be further configured with a switch test 2 feature. In one embodiment, the Switch test 2 screen is similar to the first switch test screen but allows different components to be viewed. In test screen 2, the functionality of the E-stops may be diagnosed, as well as all the auger and trimmer head functions.

In some embodiments, the Advanced Setup and Diagnostic tools are further configured to include an elevation power feature. The elevation power screen shows the voltages for each string-line sensor as well as each servo valve.

Figure 60:
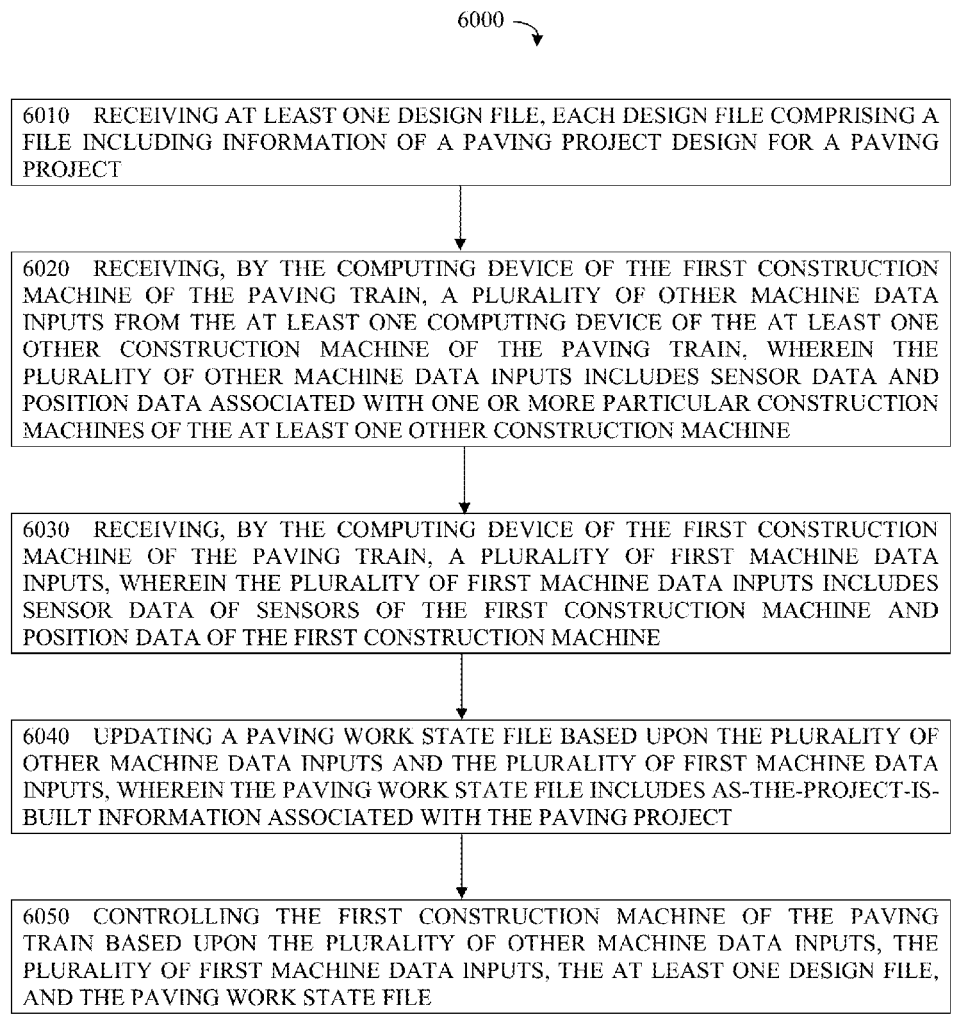
FIG. 60 shows an exemplary method of operating construction machines of a paving train over a construction site network of some embodiments.

Referring to FIG. 60, an embodiment of the invention includes a method 6000 for operating construction machines of a paving train over a construction site network. In some embodiments, the construction site network includes a computing device of a first construction machine of the paving train, at least one computing device of at least one other construction machine of the paving train, and at least one other computing device. It is contemplated that embodiments of the method 6000 can be performed by a control system (such as control system 5101); at least one component, circuit, or module of the control system or of a computing device; software or firmware executed on a computing device (such as the control system 5101, a controller, or a processor); other computing devices; other computer components; or on other software, firmware, or middleware of the system topology. The method 6000 can include any or all of steps 6010, 6020, 6030, 6040 and/or 6050, and it is contemplated that the method 6000 can include additional steps as disclosed throughout, but not explicitly set forth in this paragraph. Further, it is fully contemplated that the steps of the method 6000 can be performed concurrently or in a non-sequential order. Likewise, it is fully contemplated that the method 6000 can be performed prior to, concurrently, subsequent to, or in combination with the performance of one or more steps of one or more other embodied methods disclosed throughout.

Embodiments of the method 6000 include a step 6010, wherein the step 6010 comprises receiving at least one design file, each design file comprising a file including information of a paving project design for a paving project. Embodiments of the method 6000 also include a step 6020, wherein the step 6020 comprises receiving, by the computing device of the first construction machine of the paving train, a plurality of other machine data inputs from the at least one computing device of the at least one other construction machine of the paving train. The plurality of other machine data inputs includes sensor data and position data associated with one or more particular construction machines of the at least one other construction machine. Embodiments of the method 6000 additionally include a step 6030, wherein the step 6030 comprises receiving, by the computing device of the first construction machine of the paving train, a plurality of first machine data inputs. The plurality of first machine data inputs includes sensor data of sensors of the first construction machine and position data of the first construction machine. Embodiments of the method 6000 further include a step 6040, wherein the step 6040 comprises updating a paving work state file based upon the plurality of other machine data inputs and the plurality of first machine data inputs. The paving work state file includes as-the-project-is-built information associated with the paving project. Embodiments of the method 6000 also include a step 6050, wherein the step 6050 comprises controlling the first construction machine of the paving train based upon the plurality of other machine data inputs, the plurality of first machine data inputs, the at least one design file, and the paving work state file.

In some embodiments, the method 6000 further includes a step of transmitting updated paving work state file to the at least one computing device of the at least one other construction machine.

In some embodiments, the method 6000 may include a step of transmitting updated paving work state file to at least one off-site computing device operated by at least one of a general contractor, subcontractor, a designer, an owner, or a regulatory entity.

In some embodiments, the method 6000 also includes steps of receiving topographical data from at least one of a general contractor, a subcontractor, a designer, an owner, or a regulatory entity; and updating a paving work state file based upon the plurality of other machine data inputs, the plurality of first machine data inputs, and the received site data.

In some embodiments, the method 6000 also includes steps of upon completion of the paving project or a stage of the paving project, creating an as-paved or an as-paved portion of the at least one design file based upon the updated paving work state file; and generating a certification report upon creating the as-paved file or the as-paved portion of the at least one design file.

In some embodiments, the method 6000 also includes a step of controlling the at least one other construction machine of the paving train based upon the plurality of other machine data inputs, the plurality of first machine data inputs, the at least one design file, and the paving work state file.

Additionally, some embodiments of the method 6000 include receiving one or more inputs via at least one input device or input/output device. Also, some embodiments of the method 6000 include sending one or more outputs via at least one output device or input/output device.

Figure 61:
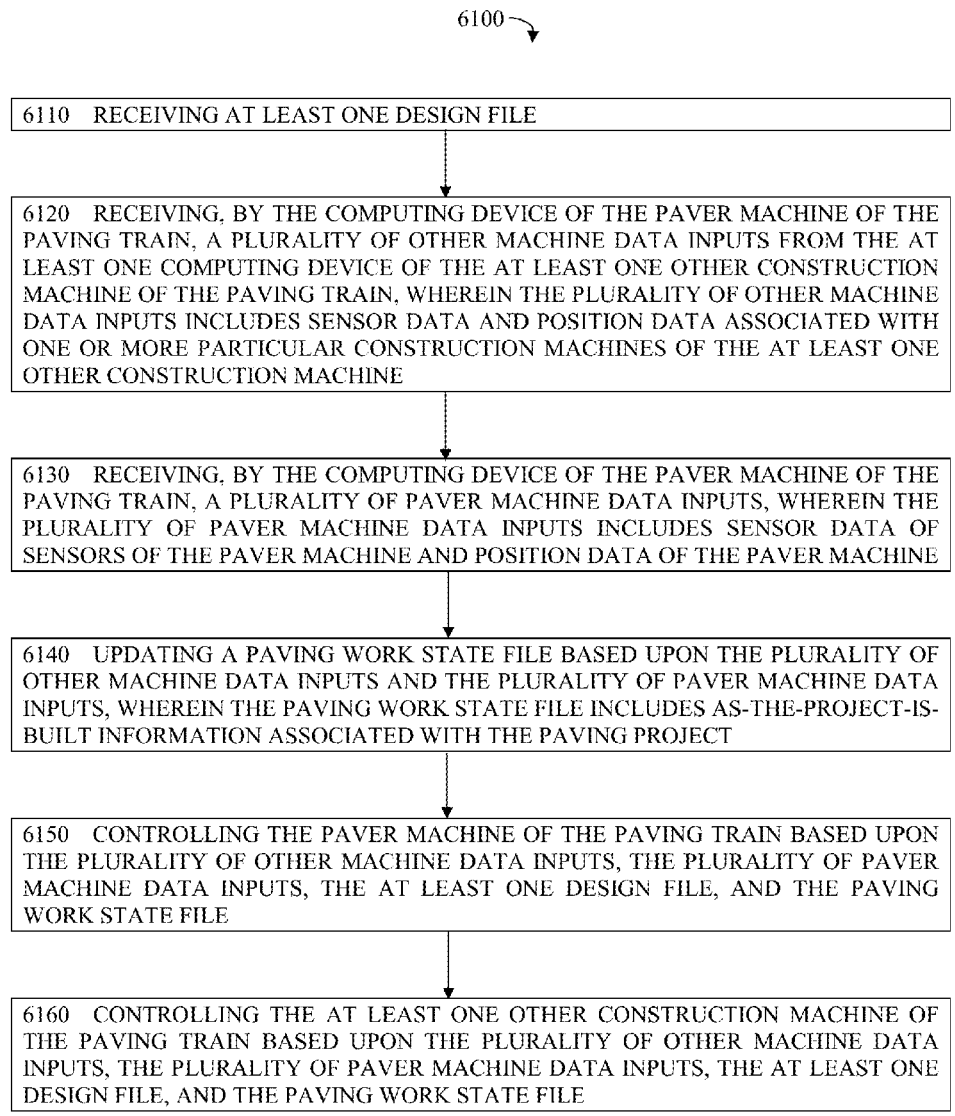
FIG. 61 shows an additional exemplary method of operating construction machines of a paving train over a construction site network of some embodiments.

Referring to FIG. 61, an embodiment of the invention includes a method 6100 for operating construction machines of a paving train over a construction site network. In some embodiments, the construction site network includes a computing device of a paver machine of the paving train, at least one computing device of at least one other construction machine of the paving train, and at least one other computing device. It is contemplated that embodiments of the method 6100 can be performed by a control system (such as control system 5101); at least one component, circuit, or module of the control system or of a computing device; software or firmware executed on a computing device (such as the control system 5101, a controller, or a processor); other computing devices; other computer components; or on other software, firmware, or middleware of the system topology. The method 6100 can include any or all of steps 6110, 6120, 6130, 6140, 6150, and/or 6160, and it is contemplated that the method 6100 can include additional steps as disclosed throughout, but not explicitly set forth in this paragraph. Further, it is fully contemplated that the steps of the method 6100 can be performed concurrently or in a non-sequential order. Likewise, it is fully contemplated that the method 6100 can be performed prior to, concurrently, subsequent to, or in combination with the performance of one or more steps of one or more other embodied methods disclosed throughout.

Embodiments of the method 6100 include a step 6110, wherein the step 6110 comprises receiving at least one design file, each design file comprising a file including information of a paving project design for a paving project. Embodiments of the method 6100 also include a step 6120, wherein the step 6120 comprises receiving, by the computing device of the paver machine of the paving train, a plurality of other machine data inputs from the at least one computing device of the at least one other construction machine of the paving train. The plurality of other machine data inputs includes sensor data and position data associated with one or more particular construction machines of the at least one other construction machine. Embodiments of the method 6100 additionally include a step 6130, wherein the step 6130 comprises receiving, by the computing device of the paver machine of the paving train, a plurality of paver machine data inputs. The plurality of paver machine data inputs includes sensor data of sensors of the paver machine and position data of the paver machine. Embodiments of the method 6100 further include a step 6140, wherein the step 6140 comprises updating a paving work state file based upon the plurality of other machine data inputs and the plurality of paver machine data inputs. The paving work state file includes as-the-project-is-built information associated with the paving project. Embodiments of the method 6100 also include a step 6150, wherein the step 6150 comprises controlling the paver machine of the paving train based upon the plurality of other machine data inputs, the plurality of paver machine data inputs, the at least one design file, and the paving work state file. Embodiments of the method 6100 further include a step 6160, wherein the step 6160 comprises controlling the at least one other construction machine of the paving train based upon the plurality of other machine data inputs, the plurality of paver machine data inputs, the at least one design file, and the paving work state file.

Still referring to FIG. 61, in some embodiments, the plurality of paver machine data inputs further include a first set of elevation data points of an existing surface, a second set of elevation points of a paved surface, smoothness data points, and slope data points. Additionally, the plurality of other machine data inputs may further include a first set of elevation data points of an existing surface, a second set of elevation points of a paved surface, smoothness data points, and slope data points.

In some embodiments, the method 6100 includes the additional step of upon completion of the paving project or a stage of the paving project, creating an as-paved file or an as-paved portion of the at least one design file based upon the updated paving work state file. The method 6100 may further include a step of generating a certification report upon creating the as-paved file or the as-paved portion of the at least one design file, wherein the certification report indicates that the paving project or a particular portion of the paving project has been completed within a predetermined level of tolerance of project specifications.

In some embodiments, the method 6100 includes the additional steps of: displaying information of the paving work state file and the design file to an operator user; receiving an operator input in response to displaying the information of the paving work state file and the design file to the operator user; and controlling the paver machine of the paving train based upon the plurality of other machine data inputs, the plurality of paver machine data inputs, the at least one design file, the paving work state file, and the operator input.

In some embodiments, the method 6100 includes the additional steps of: comparing the at least one design file and the updated paving work state file; and determining whether the updated paving work state file matches parameters of the at least one design file within a predetermined level of tolerance upon comparing the at least one design file and the paving work state file.

In some embodiments, the method 6100 includes the additional step of triggering a machine stop upon a determination that the updated paving work state file fails to match a particular parameter of the at least one design file within the predetermined level of tolerance.

In some embodiments, the method 6100 includes the additional step of adjusting, by the computing device of the paver machine, an operation of the paver machine upon a determination that the updated paving work state file fails to match a particular parameter of the at least one design file within a particular predetermined level of tolerance.

In some embodiments, the method 6100 includes the additional step of adjusting, by the computing device of the paver machine, a height of a leg of the of the paver machine, an orientation of the leg to turn the paver machine, a paving thickness, and a speed of the paver machine upon a determination that the updated paving work state file fails to match a particular parameter of the at least one design file within a particular predetermined level of tolerance.

In some embodiments, the method 6100 includes the additional step of adjusting, by the computing device of the paver machine, bar insertion placement upon a determination that the updated paving work state file fails to match a particular parameter of the at least one design file within a particular predetermined level of tolerance.

In some embodiments, the method 6100 includes the additional step of adjusting, by the computing device of the paver machine, a paving finish upon a determination that the updated paving work state file fails to match a particular parameter of the at least one design file within a particular predetermined level of tolerance.

In some embodiments, the method 6100 includes the additional step of adjusting, by the computing device of the first construction machine, at least one operation of the at least one other construction machine upon a determination that the updated paving work state file fails to match a particular parameter of the at least one design file within a particular predetermined level of tolerance.

Figure 62:
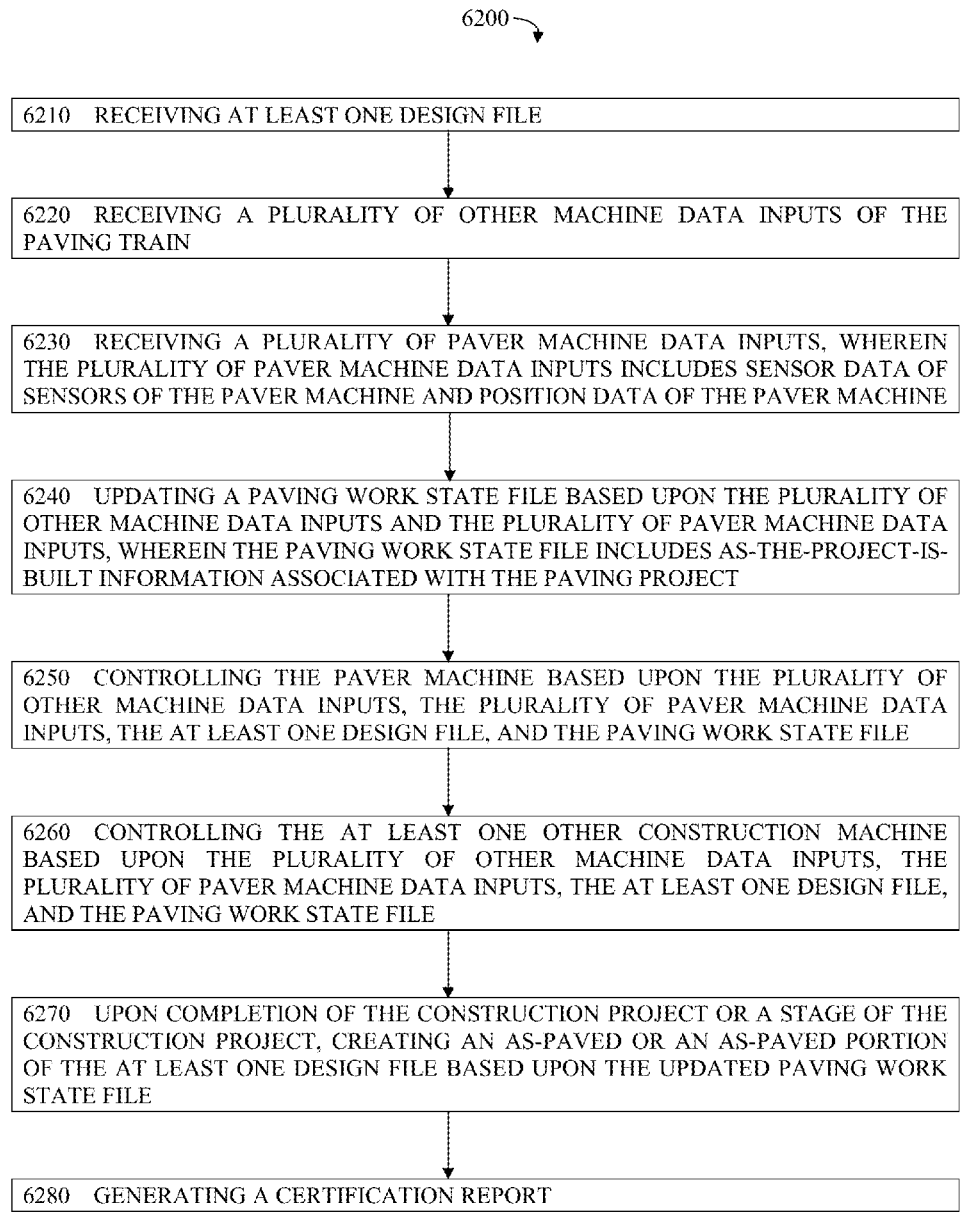
FIG. 62 shows a further exemplary method of operating construction machines of a paving train over a construction site network of some embodiments.

Referring to FIG. 62, an embodiment of the invention includes a method 6200 for operating construction machines of a paving train over a construction site network. In some embodiments, the construction site network includes a computing device of a paver machine of the paving train, at least one computing device of at least one other construction machine of the paving train, and at least one other computing device. It is contemplated that embodiments of the method 6200 can be performed by a control system (such as control system 5101); at least one component, circuit, or module of the control system or of a computing device; software or firmware executed on a computing device (such as the control system 5101, a controller, or a processor); other computing devices; other computer components; or on other software, firmware, or middleware of the system topology. The method 6200 can include any or all of steps 6210, 6220, 6230, 6240, 6250, 6260, 6270, and/or 6280, and it is contemplated that the method 6200 can include additional steps as disclosed throughout, but not explicitly set forth in this paragraph. Further, it is fully contemplated that the steps of the method 6200 can be performed concurrently or in a non-sequential order. Likewise, it is fully contemplated that the method 6200 can be performed prior to, concurrently, subsequent to, or in combination with the performance of one or more steps of one or more other embodied methods disclosed throughout.

Embodiments of the method 6200 include a step 6210, wherein the step 6210 comprises receiving at least one design file, each design file comprising a file including information of a paving project design for a paving project. Embodiments of the method 6200 also include a step 6220, wherein the step 6220 comprises receiving, by the computing device of the paver machine of the paving train, a plurality of other machine data inputs from the at least one computing device of the at least one other construction machine of the paving train, wherein the plurality of other machine data inputs includes sensor data and position data associated with one or more particular construction machines of the at least one other construction machine. Embodiments of the method 6200 additionally include a step 6230, wherein the step 6230 comprises receiving, by the computing device of the paver machine of the paving train, a plurality of paver machine data inputs, wherein the plurality of paver machine data inputs includes sensor data of sensors of the paver machine and position data of the paver machine. Embodiments of the method 6200 further include a step 6240, wherein the step 6240 comprises updating a paving work state file based upon the plurality of other machine data inputs and the plurality of paver machine data inputs, wherein the paving work state file includes as-the-project-is-built information associated with the paving project. Embodiments of the method 6200 also include a step 6250, wherein the step 6250 comprises controlling the paver machine of the paving train based upon the plurality of other machine data inputs, the plurality of paver machine data inputs, the at least one design file, and the paving work state file. Embodiments of the method 6200 further include a step 6260, wherein the step 6260 comprises controlling the at least one other construction machine of the paving train based upon the plurality of other machine data inputs, the plurality of paver machine data inputs, the at least one design file, and the paving work state file. Embodiments of the method 6200 also include a step 6270, wherein the step 6270 comprises: upon completion of the construction project or a stage of the construction project, creating an as-paved or an as-paved portion of the at least one design file based upon the updated paving work state file. Embodiments of the method 6200 further include a step 6280, wherein the step 6280 comprises generating a certification report upon creating the as-paved file or the as-paved portion of the at least one design file, wherein the certification report indicates that the paving project or a particular portion of the paving project has been completed within a predetermined level of tolerance of project specifications.

Figure 63:
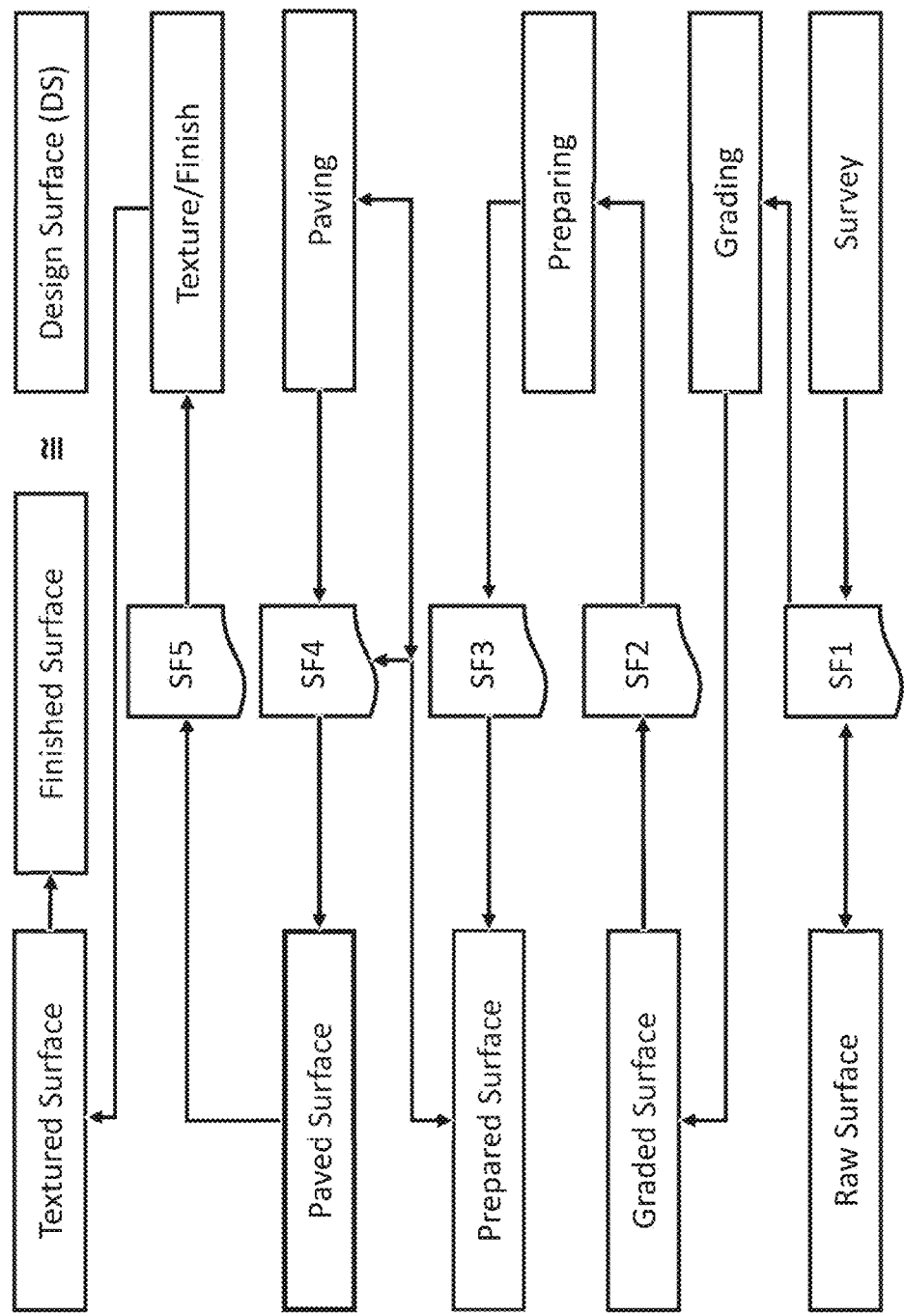
FIG. 63 shows an exemplary flow diagram of paving operations of some embodiments.

Referring now to FIG. 63, in accordance with an embodiment of either a concurrent or noncurrent paving operation, a paved surface is constructed through a set of processes. For example, in the pavement of a raw surface versus the re-pavement of an existing paved surface, a full set or a partial set of paving processes may be necessary (FIG. 63; SF1-SF5 or SF3-SF5). The paving work state file may include one or more prepared surface data files (e.g., SF1-SF5). In some embodiments, the one or more prepared surface data files comprise a plurality of files whereby each of the plurality of files is stored at a particular machine computing device; while in other embodiments, the one or more prepared surface data files comprises a single prepared surface data file, which is stored and updated in a single computing device of a machine or mirrored and stored on a plurality of computing devices of various machines or tools. Where a raw surface is to be paved, a road design (DS) may be created from survey data and the like. The road design may be an electronic three-dimensional surface data file (SF1). The design file may include a 3-D road design surface file. This 3-D road design surface data file (SF2), in accordance with an embodiment of the present invention, may be utilized to control the operation of a grading apparatus such as a dozer, earthmover, crane, and trimmer or the like to produce a prepared surface. The prepared surface may be represented by a 3-D prepared surface data file (SF3) as measured by a specialty surface measuring tool or surface collection instrumentation mounted on a grading apparatus or the like. An embodiment may compare the prepared surface data file (SF3) with the road design surface data file (DS) and send data of the road design surface data file (DS) to other paving machines over a network. Some embodiments render the road design surface from the prepared surface data file (SF3) in consideration of at least road design specifications and the efficient use of a specified paving material list (e.g., paving material, dowel bars, mats, curing/treating materials, fill, consumables and the like). Thus, a prepared surface (finished surface) resulting from all paving operations (SF4, SF5) will meet the design criteria (DS). Likewise, where the design criteria are more particular and less granular (specifying only a ride quality and pavement thickness or the like), the surface may be prepared such that a paved and finished surface meeting the design criteria will result. For example, where required, an embodiment may produce a finished surface meeting a detailed specification. Wherein for example, specific dowel bar placement, texturing/finishing patterns, crown, crown transitions, super elevations, slope, and the like by specific location may or may not be required (depending on the detail of a design file).

It is believed that other embodiments of the invention will be understood by the foregoing description, and it will be apparent that various changes can be made in the form, construction, and arrangement of the components thereof without departing from the scope and spirit of embodiments of the invention or without sacrificing all of its material advantages. The form herein described is merely an explanatory embodiment thereof, and it is the intention of the following claims to encompass and include such changes.

What is claimed is:

1. A method for operating construction machines of a paving train over a construction site network, wherein the construction site network includes a computing device of a first construction machine of the paving train, at least one computing device of at least one other construction machine of the paving train, and at least one other computing device, wherein the first construction machine of the paving train is a paver machine of the paving train, the method comprising:

receiving, by the computing device of the first construction machine of the paving train, at least two design files, each design file including information of a paving project design for a paving project, the at least two design files including a three-dimensional computer-aided design file and a specification file including information of project design requirements;

receiving, by the computing device of the first construction machine of the paving train, a plurality of other machine data inputs from the at least one computing device of the at least one other construction machine of the paving train, wherein the plurality of other machine data inputs includes sensor data and position data associated with one or more particular construction machines of the at least one other construction machine;

receiving, by the computing device of the first construction machine of the paving train, a plurality of first machine data inputs, wherein the plurality of first machine data inputs includes sensor data of sensors of the first construction machine and position data of the first construction machine;

updating, by the computing device of the first construction machine of the paving train, a paving work state file based at least upon the plurality of other machine data inputs and the plurality of first machine data inputs, wherein the paving work state file includes as-the-project-is-built information associated with the paving project, wherein the as-the-project-is-built information includes topographical information and in-progress paving information, the topographical information including slope information and elevation information, the in-progress paving information including thickness information and bar location information;

controlling, by the computing device of the first construction machine of the paving train, the first construction machine of the paving train based at least upon the plurality of other machine data inputs, the plurality of first machine data inputs, the at least two design files, and the paving work state file;

comparing, by the computing device of the first construction machine of the paving train, the at least two design files and the updated paving work state file;

determining, by the computing device of the first construction machine of the paving train, whether the updated paving work state file matches parameters of the at least two design files within a predetermined level of tolerance upon comparing the at least two design files and the paving work state file;

adjusting, by the computing device of the first construction machine, an operation of the first construction machine upon a determination that the updated paving work state file fails to match a particular parameter of the at least two design files within a particular predetermined level of tolerance;

upon completion of the paving project or a stage of the paving project, creating, by the computing device of the first construction machine of the paving train, an as-paved or an as-paved portion of the at least two design files based at least upon the updated paving work state file;

determining, by the computing device of the first construction machine of the paving train, that the paving project or a particular portion of the paving project has been completed within a predetermined level of tolerance of project specifications upon creating the as-paved file or the as-paved portion of the at least two design files; and generating, by the computing device of the first construction machine of the paving train, a certification report upon determining that the paving project or the particular portion of the paving project has been completed within the predetermined level of tolerance of the project specifications, wherein the certification report indicates that the paving project or the particular portion of the paving project has been completed within the predetermined level of tolerance of the project specifications.

2. The method of claim 1, further comprising:
transmitting, from the first construction machine of the paving train, updated paving work state file to the at least one computing device of the at least one other construction machine.

3. The method of claim 1, further comprising:
transmitting, from the first construction machine of the paving train, updated paving work state file to at least one off-site computing device operated by at least one of a general contractor, subcontractor, a designer, an owner, or a regulatory entity.

4. The method of claim 1, further comprising
receiving, by the computing device of the first construction machine of the paving train, topographical data from at least one of a general contractor, a subcontractor, a designer, an owner, or a regulatory entity; and
wherein updating, by the computing device of the first construction machine of the paving train, a paving work state file based at least upon the plurality of other machine data inputs and the plurality of first machine data inputs further comprises:
updating, by the computing device of the first construction machine of the paving train, a paving work state file based at least upon the plurality of other machine data inputs, the plurality of first machine data inputs, and received site data.

5. The method of claim 1, further comprising:
controlling the at least one other construction machine of the paving train based at least upon the plurality of other machine data inputs, the plurality of first machine data inputs, the at least two design files, and the paving work state file.

6. A method for operating construction machines of a paving train over a construction site network, wherein the construction site network includes a computing device of a paver machine of the paving train, at least one computing device of at least one other construction machine of the paving train, and at least one other computing device, the method comprising:

receiving, by the computing device of the paver machine of the paving train, at least two design files, each design file including information of a paving project design for a paving project, the at least two design files including a three-dimensional computer-aided design file and a specification file including information of project design requirements;

receiving, by the computing device of the paver machine of the paving train, a plurality of other machine data inputs from the at least one computing device of the at least one other construction machine of the paving train, wherein the plurality of other machine data inputs includes sensor data and position data associated with one or more particular construction machines of the at least one other construction machine;

receiving, by the computing device of the paver machine of the paving train, a plurality of paver machine data inputs, wherein the plurality of paver machine data inputs includes sensor data of sensors of the paver machine and position data of the paver machine;

updating, by the computing device of the paver machine of the paving train, a paving work state file based at least upon the plurality of other machine data inputs and the plurality of paver machine data inputs, wherein the paving work state file includes as-the-project-is-built information associated with the paving project, wherein the as-the-project-is-built information includes topographical information and in-progress paving information, the topographical information including slope information and elevation information, the in-progress paving information including thickness information and bar location information;

controlling, by the computing device of the paver machine of the paving train, the paver machine of the paving train based at least upon the plurality of other machine data inputs, the plurality of paver machine data inputs, the at least two design files, and the paving work state file;

controlling the at least one other construction machine of the paving train based at least upon the plurality of other machine data inputs, the plurality of paver machine data inputs, the at least two design files, and the paving work state file;

comparing, by the computing device of the paver machine of the paving train, the at least two design files and the updated paving work state file;

determining, by the computing device of the paver machine of the paving train, whether the updated paving work state file matches parameters of the at least two design files within a predetermined level of tolerance upon comparing the at least two design files and the paving work state file;

adjusting, by the computing device of the paver machine, an operation of the paver machine upon a determination that the updated paving work state file fails to match a particular parameter of the at least two design files within a particular predetermined level of tolerance;

upon completion of the paving project or a stage of the paving project, creating, by the computing device of the paver machine of the paving train, an as-paved or an as-paved portion of the at least two design files based at least upon the updated paving work state file;

determining, by the computing device of the paver machine of the paving train, that the paving project or a particular portion of the paving project has been completed within a predetermined level of tolerance of project specifications upon creating the as-paved file or the as-paved portion of the at least two design files; and generating, by the computing device of the paver machine of the paving train, a certification report upon determining that the paving project or the particular portion of the paving project has been completed within the predetermined level of tolerance of the project specifications, wherein the certification report indicates that the paving project or the particular portion of the paving project has been completed within the predetermined level of tolerance of the project specifications.

7. The method of claim 6, wherein the plurality of paver machine data inputs further include a first set of elevation data points of an existing surface, a second set of elevation data points of a paved surface, smoothness data points, and slope data points.

8. The method of claim 6, wherein the plurality of other machine data inputs further include a first set of elevation data points of an existing surface, a second set of elevation data points of a paved surface, smoothness data points, and slope data points.

9. The method of claim 6, further comprising:
displaying information of the paving work state file and one or more of the at least two design files to an operator user of the paver machine of the paving train; and
receiving an operator input in response to displaying the information of the paving work state file and the one or more of the at least two design files to the operator user of the paver machine of the paving train,
wherein controlling, by the computing device of the paver machine of the paving train, the paver machine of the paving train based at least upon the plurality of other machine data inputs, the plurality of paver machine data inputs, the at least two design files, and the paving work state file further comprises:
controlling, by the computing device of the paver machine of the paving train, the paver machine of the paving train based at least upon the plurality of other machine data inputs, the plurality of paver machine data inputs, the at least two design files, the paving work state file, and the operator input.

10. The method of claim 6, further comprising:
triggering, by the computing device of the paver machine of the paving train, a machine stop upon a determination that the updated paving work state file fails to match a particular parameter of the at least two design files within the predetermined level of tolerance.

11. The method of claim 6, wherein adjusting, by the computing device of the paver machine, an operation of the paver machine upon a determination that the updated paving work state file fails to match a particular parameter of the at least two design files within a particular predetermined level of tolerance further comprises:
adjusting, by the computing device of the paver machine, a height of a leg of the paver machine, an orientation of the leg to turn the paver machine, a paving thickness, and a speed of the paver machine upon a determination that the updated paving work state file fails to match a particular parameter of the at least two design files within a particular predetermined level of tolerance.

12. The method of claim 6, wherein adjusting, by the computing device of the paver machine, an operation of the paver machine upon a determination that the updated paving work state file fails to match a particular parameter of the at least two design files within a particular predetermined level of tolerance further comprises:
adjusting, by the computing device of the paver machine, bar insertion placement upon a determination that the updated paving work state file fails to match a particular parameter of the at least two design files within a particular predetermined level of tolerance.

13. The method of claim 6, wherein adjusting, by the computing device of the paver machine, an operation of the paver machine upon a determination that the updated paving work state file fails to match a particular parameter of the at least two design files within a particular predetermined level of tolerance further comprises:
adjusting, by the computing device of the paver machine, a paving finish upon a determination that the updated paving work state file fails to match a particular parameter of the at least two design files within a particular predetermined level of tolerance.

14. The method of claim 6, wherein adjusting, by the computing device of the paver machine, an operation of the paver machine upon a determination that the updated paving work state file fails to match a particular parameter of the at least two design files within a particular predetermined level of tolerance further comprises:
adjusting, by the computing device of the paver machine, at least one operation of the at least one other construction machine upon a determination that the updated paving work state file fails to match a particular parameter of the at least two design files within a particular predetermined level of tolerance.

15. A method for operating construction machines of a paving train over a construction site network, wherein the construction site network includes a computing device of a paver machine of the paving train, at least one computing device of at least one other construction machine of the paving train, and at least one other computing device, the method comprising:
receiving, by the computing device of the paver machine of the paving train, at least two design files, each design file including information of a paving project design for a paving project, the at least two design files including a three-dimensional computer-aided design file and a specification file including information of project design requirements;
receiving, by the computing device of the paver machine of the paving train, a plurality of other machine data inputs from the at least one computing device of the at least one other construction machine of the paving train, wherein the plurality of other machine data inputs includes sensor data and position data associated with one or more particular construction machines of the at least one other construction machine;

receiving, by the computing device of the paver machine of the paving train, a plurality of paver machine data inputs, wherein the plurality of paver machine data inputs includes sensor data of sensors of the paver machine, position data of the paver machine, a first set of elevation data points of an existing surface, a second set of elevation data points of a paved surface, smoothness data points, and slope data points;

updating, by the computing device of the paver machine of the paving train, a paving work state file based at least upon the plurality of other machine data inputs and the plurality of paver machine data inputs, wherein the paving work state file includes as-the-project-is-built information associated with the paving project, wherein the as-the-project-is-built information includes topographical information and in-progress paving information, the topographical information including slope information and elevation information, the in-progress paving information including thickness information and bar location information;

controlling, by the computing device of the paver machine of the paving train, the paver machine of the paving train based at least upon the plurality of other machine data inputs, the plurality of paver machine data inputs, the at least two design files, and the paving work state file;

controlling the at least one other construction machine of the paving train based at least upon the plurality of other machine data inputs, the plurality of paver machine data inputs, the at least two design files, and the paving work state file;

comparing, by the computing device of the paver machine of the paving train, the at least two design files and the updated paving work state file;

determining, by the computing device of the paver machine of the paving train, whether the updated paving work state file matches parameters of the at least two design files within a predetermined level of tolerance upon comparing the at least two design files and the paving work state file;

triggering, by the computing device of the paver machine of the paving train, a machine stop upon a determination that the updated paving work state file fails to match a particular parameter of the at least two design files within the predetermined level of tolerance;

upon completion of the construction project or a stage of the construction project, creating, by the computing device of the paver machine of the paving train, an as-paved or an as-paved portion of the at least two design files based at least upon the updated paving work state file;

determining, by the computing device of the paver machine of the paving train, that the paving project or a particular portion of the paving project has been completed within a predetermined level of tolerance of project specifications upon creating the as-paved file or the as-paved portion of the at least two design files; and generating, by the computing device of the paver machine of the paving train, a certification report upon determining that the paving project or the particular portion of the paving project has been completed within the predetermined level of tolerance of the project specifications, wherein the certification report indicates that the paving project or the particular portion of the paving project has been completed within the predetermined level of tolerance of the project specifications.

\* \* \* \* \*